(12) United States Patent
Nakajima et al.

(10) Patent No.: US 9,143,637 B2
(45) Date of Patent: Sep. 22, 2015

(54) TRANSMISSION DEVICE, VIDEO SIGNAL TRANSMISSION METHOD FOR TRANSMISSION DEVICE, RECEPTION DEVICE, AND VIDEO SIGNAL RECEPTION METHOD FOR RECEPTION DEVICE

(71) Applicant: Sony Corporation, Tokyo (JP)

(72) Inventors: Yasuhisa Nakajima, Kanagawa (JP); Hidekazu Kikuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/142,321

(22) Filed: Dec. 27, 2013

(65) Prior Publication Data

US 2014/0111696 A1    Apr. 24, 2014

Related U.S. Application Data

(63) Continuation of application No. 12/312,340, filed as application No. PCT/JP2007/071650 on Nov. 7, 2007, now abandoned.

(30) Foreign Application Priority Data

Nov. 7, 2006   (JP) ................. P2006-301486
Feb. 28, 2007  (JP) ................. P2007-050426
Sep. 18, 2007  (JP) ................. P2007-240663

(51) Int. Cl.
*H04N 7/16* (2011.01)
*H04N 5/38* (2006.01)
(Continued)

(52) U.S. Cl.
CPC ........... *H04N 1/00299* (2013.01); *G09G 5/003* (2013.01); *H04N 1/00267* (2013.01);
(Continued)

(58) Field of Classification Search
CPC .................... G09G 2370/047; G09G 2370/12; H04N 21/43615
USPC .................. 725/131, 133, 139, 141, 151, 153
See application file for complete search history.

(56) References Cited

U.S. PATENT DOCUMENTS 5,666,302 A   9/1997   Tanaka et al.
7,106,235 B1  9/2006   Yen et al.
(Continued)

FOREIGN PATENT DOCUMENTS

CN   2694652 Y    4/2005
EP   1473695 A2   11/2004
(Continued)

OTHER PUBLICATIONS

Supplementary European Report EP 07831381, dated Oct. 14, 2010.
(Continued)

*Primary Examiner* — Mushfikh Alam
(74) *Attorney, Agent, or Firm* — Lerner, David, Littenberg, Krumholz & Mentlik, LLP

(57) ABSTRACT

Methods and systems for allowing a contents list of a video camera recorder to be smoothly displayed on a television receiver and improve the performance of a selecting operation on video content by a user. A video camera recorder (source device) 10A and a television receiver (sink device) 30A are connected through an HDMI cable 1. The video camera recorder 10A is provided with an HDMI transmission unit (HDMI TX) 28 and a high-speed data line I/F 28A. The television receiver 30A is provided with an HDMI reception unit (HDMI RX) 32 and a high-speed data line I/F 32A. In response to a transmission request from the television receiver 30A side, the video camera recorder 10A transmits, at high speed, additional information (contents list and thumbnail data) to the television receiver 30A by using a high-speed data line constituted by specific lines of the HDMI cable 1.

2 Claims, 33 Drawing Sheets

(51) Int. Cl.
*H04N 5/44* (2011.01)
*H04N 1/00* (2006.01)
*G09G 5/00* (2006.01)
*H04N 1/21* (2006.01)
*H04N 5/76* (2006.01)
*H04N 5/77* (2006.01)
*H04N 21/4363* (2011.01)
*H04N 5/765* (2006.01)
*H04N 9/82* (2006.01)
*H04N 21/41* (2011.01)
*H04N 21/488* (2011.01)

(52) U.S. Cl.
CPC .............. *H04N1/212* (2013.01); *H04N 5/76* (2013.01); *H04N 5/772* (2013.01); *H04N 7/163* (2013.01); *H04N 21/4135* (2013.01); *H04N 21/43632* (2013.01); *G09G 2300/0426* (2013.01); *G09G 2310/061* (2013.01); *G09G 2370/04* (2013.01); *G09G 2370/10* (2013.01); *G09G 2370/12* (2013.01); *H04N 5/765* (2013.01); *H04N 9/8227* (2013.01); *H04N 21/4104* (2013.01); *H04N 21/488* (2013.01)

(56) References Cited

U.S. PATENT DOCUMENTS

| | | | |
|---|---|---|---|
| 7,742,438 | B1* | 6/2010 | Xu et al. .................. 370/278 |
| 8,359,628 | B2 | 1/2013 | Kitaru et al. |
| 2003/0223377 | A1* | 12/2003 | Simmons et al. ............ 370/254 |
| 2004/0095509 | A1 | 5/2004 | Okamoto et al. |
| 2004/0218598 | A1 | 11/2004 | Kobayashi |
| 2005/0182876 | A1 | 8/2005 | Kim et al. |
| 2005/0223411 | A1* | 10/2005 | Jung et al. ................. 725/135 |
| 2006/0036788 | A1 | 2/2006 | Galang et al. |
| 2006/0095401 | A1 | 5/2006 | Krikorian et al. |
| 2006/0140221 | A1 | 6/2006 | Yamada et al. |
| 2006/0210110 | A1 | 9/2006 | Hinkel |
| 2006/0232707 | A1 | 10/2006 | Kimura |
| 2007/0011720 | A1* | 1/2007 | Min ........................ 725/151 |
| 2007/0057931 | A1* | 3/2007 | Takamori ................. 345/204 |
| 2007/0070402 | A1 | 3/2007 | Kitayama et al. |
| 2007/0117533 | A1 | 5/2007 | Han et al. |
| 2007/0139368 | A1 | 6/2007 | Tseng |
| 2007/0186015 | A1 | 8/2007 | Taft et al. |
| 2008/0270632 | A1* | 10/2008 | Hong et al. ................ 710/4 |
| 2009/0089850 | A1 | 4/2009 | Nakajima et al. |
| 2009/0091626 | A1* | 4/2009 | Kaplan et al. ............. 348/207.1 |
| 2009/0157885 | A1* | 6/2009 | Takatsuji et al. ........... 709/228 |
| 2009/0174821 | A1* | 7/2009 | Matsuo et al. ............. 348/725 |
| 2010/0017823 | A1 | 1/2010 | Van De Sluis et al. |
| 2010/0211791 | A1 | 8/2010 | Eckleder et al. |

FOREIGN PATENT DOCUMENTS

| | | |
|---|---|---|
| JP | 62-75653 U | 5/1987 |
| JP | 02-206249 A | 8/1990 |
| JP | H07050657 | 2/1995 |
| JP | H10164239 | 6/1998 |
| JP | 2001057567 A | 2/2001 |
| JP | 2001-320479 A | 11/2001 |
| JP | 2003158724 A | 5/2003 |
| JP | 2003-209775 A | 7/2003 |
| JP | 2003209920 A | 7/2003 |
| JP | 2004254027 A | 9/2004 |
| JP | 2004294437 A | 10/2004 |
| JP | 2004356752 A | 12/2004 |
| JP | 2005135433 A | 5/2005 |
| JP | 2005143033 A | 6/2005 |
| JP | 2006-107292 A | 4/2006 |
| JP | 2006121705 A | 5/2006 |
| JP | 2006-140776 A | 6/2006 |
| JP | 2006163585 A | 6/2006 |
| JP | 2006191161 A | 7/2006 |
| JP | 2006203800 A | 8/2006 |
| JP | 2006245949 A | 9/2006 |
| JP | 2006-295822 A | 10/2006 |
| JP | 2007124552 A | 5/2007 |
| JP | 2007267116 A | 10/2007 |
| JP | 04-245817 B2 | 4/2009 |
| JP | 5218845 B2 | 6/2013 |
| JP | 2014090466 A | 5/2014 |
| WO | 02-078336 A1 | 10/2002 |
| WO | 2005-064982 A1 | 7/2005 |
| WO | 2006-057324 A1 | 6/2006 |
| WO | 20061101801 A2 | 9/2006 |
| WO | 2007-037379 A1 | 4/2007 |
| WO | 2007-049556 A1 | 5/2007 |
| WO | 2008056708 A1 | 5/2008 |

OTHER PUBLICATIONS

MOBOTIX AG: "Network-CCTV & Webcam Part 1: Introduciion" Internet Citation May 1, 2002, XP002279453.
MOBOTIX AG: "M10 Camera Manual Part 1" Internet Citation May 3, 2006 XP002603290.
Hitachi et al: "High Definition Multimedia Interface Specification Version 1.1" Internet Citation May 20, 2004, page Complete, XP007909795.
Office Action from Japanese Application No. 2008-543106, dated Apr. 17, 2012.
"High—Definition Multimedia Interface Specification Version 1.3". Internet Citation, Jun. 22, 2006, XP002391813, Retrieved from the Internet: URL:http://www.hdmi.org/download/HDMI_Spec_1.3_GM1.pdf [retrieved on Jul. 24, 2006].
IEEE Standard for Information Technology Telecommunications, Supplement to Carrier Sense Multiple Access with Collision Detection (CSMA/CD)Access Method and Physical Layer Specifications. Physical Layer Parameters and Specifications for 1000 Mb/s Operation Over 4-Pair of Category 5. Balanced Copper Cabling, Type 1000 BASE-T. Approved Jun. 26, 1999.
Communication pursuant to Article 94 (3) EPC, from European Application No. 07831380.6-2202, dated Jun. 18, 2012.
Communication pursuant to Article 94 (3) EPC, from European Application No. 07831382.2-2202, dated Jun. 21, 2012.
Office Action from Japanese Application No. 2008-543113, dated Jul. 10, 2012.
Office Action from Japanese Application No. 2008-543096, dated Nov. 22, 2012.
Office Action from Japanese Application No. 2008-543112, dated Nov. 27, 2012.
Office Action from Japanese Application No. 2008-543113, dated Jan. 8, 2013.
Office Action from Japanese Application No. 2008-543107, dated Mar. 19, 2013.
Office Action from Japanese Application No. 2012-223329, dated Sep. 24, 2013.
Office Action from Korean Application No. 10-2009-7006203, dated Sep. 12, 2013.
Office Action from Korean Application No. 10-2009-7006504, dated Nov. 14, 2013.
Summons to attend oral proceedings pursuant to Rule 115 (1) EPC, from EP Application No. 07831331.9, dated Jul. 3, 2014.
Hitachi, Ltd., et al, High-Definition Multimedia Interface Specification Version 1.3, Jun. 22, 2006, p. 10-11, 38-54.
Japanese Office Action for Application No. 2013-260691 dated Oct. 7, 2014.
Japanese Office Action for JP Application 2013260695, dated Dec. 2, 2014.
Japanese Office Action for JP Application No. 2014171796, dated Aug. 4, 2015.
Japanese Office Action for JP Application No. 2014171897, dated Aug. 4, 2015.

* cited by examiner

FIG. 7

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

FIG. 10

| ADDRESS | DEVICE |
|---|---|
| 0 | TV |
| 1 | RECORDING DEVICE 1 |
| 2 | RECORDING DEVICE 2 |
| 3 | STB1 |
| 4 | DVD1 |
| 5 | Audio |
| 6 | STB2 |
| 7 | STB3 |
| 8 | DVD2 |
| 9 | RECORDING DEVICE 3 |
| 10 | VIDEO CAMERA |
| 11 | UNDEFINED |
| 12 | UNDEFINED |
| 13 | UNDEFINED |
| 14 | OPEN-USE |
| 15 | BROADCAST |

FIG. 11

| OPERATION CODE | RESPONSE | CONTENTS |
|---|---|---|
| <give Contents List> | <set Contents Number> | REQUEST FOR CONTENTS LIST |
| <set Contents Number> | NULL | NUMBER OF PIECES OF CONTENT |
| <set Contents Info> | NULL | CONTENT INFORMATION |
| <Thumb Nail ID> | NULL | THUMBNAIL ID |
| <Play Content> | <Status> | PLAYBACK INSTRUCTION |
| <Image View On> | NULL | START VIDEO TRANSMISSION |

| | 7 | 6 | 5 | 4 | 3 | 2 | 1 | 0 |
|---|---|---|---|---|---|---|---|---|
| HB0 | PACKET TYPE ||||||||
| HB1 | CONTENT NUMBER ||||||||
| HB2 | PACKET LENGTH ||||||||

FIG. 15
SCENE LIST
10  OUR TAMA
    05/07/2005 (Wed)  07:00PM  (00H54M)
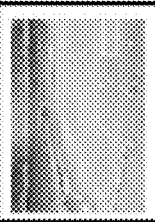
9  TARO'S SOCCER MATCH
   05/07/2005 (Wed)  08:00PM  (02H15M)
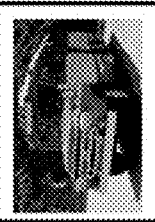
8  FAMILY TRIP
   04/10/2005 (Thu)  00:54AM  (00H06M)
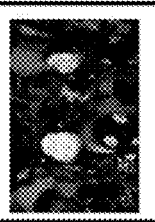
7  HANAKO'S PARENT'S DAY
   03/18/2005 (Sat)  09:00PM  (02H05M)

| Opcode | Length | Data |

| Opcode | Length (Byte) | Data |
|---|---|---|
| Request Contents List: 0x9A | 0 | None |
| Thumb Nail: 0x6B | n | Thumb Nail ID, Picture data |
| Play Content: 0x4A | 1 | Thumb Nail ID |
| Select Input: 0x04 | 1 | HDMI Physical address |

FIG. 26

| Byte# | 7 | 6 | 5 | 4 | 3 | 2 | 1 | 0 |
|---|---|---|---|---|---|---|---|---|
| 0 | Vender-specific tag code (=3) | | | | Length (=N) | | | |
| 1...3 | 24 bit IEEE Registration Identifier (0x000C03) LSB first | | | | | | | |
| 4 | A | | | | | B | | |
| 5 | C | | | | | D | | |
| 6 | Supports-AI | DC_48 bit | DC_36 bit | DC_30 bit | DC_Y444 | Reserved (0) | Reserved (0) | DVI-Dual |
| 7 | Max_TMDS_Clock | | | | | | | |
| 8 | Latency | Full Duplex | Half Duplex | | | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

TRANSMISSION DEVICE, VIDEO SIGNAL TRANSMISSION METHOD FOR TRANSMISSION DEVICE, RECEPTION DEVICE, AND VIDEO SIGNAL RECEPTION METHOD FOR RECEPTION DEVICE

CROSS-REFERENCES TO RELATED APPLICATIONS

The present application is a continuation of U.S. patent application Ser. No. 12/312,340, filed Jul. 9, 2010, which is a national phase entry under 35 U.S.C. §371 of International Application No. PCT/JP2007/071650 filed Nov. 7, 2007, published on May 15, 2008 as WO 2008/056708 A1, which claims priority from Japanese Patent Application No. JP 2006-301486 filed in the Japanese Patent Office on Nov. 7, 2006, Japanese Patent Application No. JP 2007-050426 filed in the Japanese Patent Office on Feb. 28, 2007, and Japanese Patent Application No. JP 2007-240663 filed in the Japanese Patent Office on Sep. 18, 2007, the disclosures of which are hereby incorporated by reference herein.

TECHNICAL FIELD

The present invention relates to a transmission device, a video signal transmission method for the transmission device, a reception device, and a video signal reception method for the reception device that are suitable for application to a system constituted by a device that performs output or input in conformity with digital video/audio input/output interface standards, which are called HDMI (High-Definition Multimedia Interface) standards.

Specifically, the present invention relates to a transmission device that causes, by transmitting, using a bidirectional communication unit, to an external device, additional information on individual video signals that can be transmitted to the external device, the external device side to smoothly display the additional information on the individual video signals, and the performance of a selecting operation on a video signal by a user can thus be improved, and the like.

BACKGROUND ART

In recent years, for example, HDMI (High Definition Multimedia Interface) has been gaining popularity as a communication interface through which digital video signals, that is, uncompressed (baseband) video signals (hereinafter, referred to as "image data"), and digital audio signals associated with the video signals (hereinafter, referred to as "audio data") are transmitted at high speed from a DVD (Digital Versatile Disc) recorder, a set-top box, and other AV sources (Audio Visual sources) to a television receiver, a projector, and other displays. The details of the HDMI standards are described, for example, in Patent Document 1.
Patent Document 1: WO2002/078336

DISCLOSURE OF INVENTION

Technical Problem

In a case where device-to-device connection is performed using HDMI, the definition of audio and video transmission is standardized, whereas no definition of additional information transmission is provided. Thus, in the case of a video camera recorder in which a plurality of scenes are recorded on one medium, a television receiver to which the video camera recorder is connected only recognizes the video camera recorder as a video camera recorder, and it is difficult to start reproduction of a video signal at a scene desired by a user.

An object of the present invention is to improve the performance of a selecting operation on a video signal by a user.

Technical Solution

A concept of the present invention lies in a transmission device characterized by including
 a signal transmission unit that transmits a video signal as a differential signal through a transmission path using a plurality of channels to an external device;
 a communication unit that performs bidirectional communication by using a specific line constituting the transmission path;
 a video signal storage unit that stores individual video signals that can be transmitted, by using the signal transmission unit, to the external device;
 an additional information storage unit that stores additional information on the individual video signals stored in the video signal storage unit; and
 a communication control unit that performs control in such a manner that the additional information on the individual video signals stored in the additional information storage unit is transmitted, by using the communication unit, to the external device.

The transmission device according to the present invention includes the signal transmission unit that transmits a video signal as a differential signal through a transmission path using a plurality of channels to an external device. The transmission device is, for example, an HDMI source device. In the present invention, the communication unit that performs bidirectional communication by using a specific line constituting the transmission channel is provided. By using the communication unit, additional information on individual video signals that can be transmitted to the external device is transmitted to the external device.

Here, the additional information is text information or image information, or text information and image information. In addition, transmission of the additional information to the external device is performed, for example, in a case where the communication unit receives a transmission request for the additional information transmitted from the external device.

In a case where the additional information on the individual video signals is transmitted, by using the communication unit, to the external device as described above and, for example, a transmission request for the additional information is received from the external device, the additional information on the individual video signals is immediately supplied to the external device. Thus, the additional information on the individual video signals is smoothly displayed on the external device side, and the performance of a selecting operation by a user is improved.

In addition, in the present invention, for example, the communication control unit may further perform control, when the communication unit receives selection information on a specific video signal transmitted from the external device, in such a manner that the video signal corresponding to the selection information among the video signals stored in the video signal storage unit is transmitted, by using the signal transmission unit, to the external device. In this case, in a case where the external device side selects a specific video signal, selection information on the specific video signal is immediately supplied to the transmission device, and the video signal corresponding to the selection information can be transmitted from the transmission device to the external device. Thus, the external device side is capable of immediately causing the selecting operation on the video signal by the user to be reflected in image display. Hence, the performance of an operation by the user is improved.

In addition, a concept of the present invention lies in a reception device characterized by including a signal reception unit that receives a video signal as a differential signal through a transmission path using a plurality of channels from an external device;
  a communication unit that performs bidirectional communication by using a specific line constituting the transmission path;
  an image display unit that processes the video signal received at the signal reception unit to display an image; and
  an additional information display unit that displays, when the communication unit receives additional information on individual video signals that can be transmitted from the external device, the additional information being transmitted from the external device, the additional information on the individual video signals.

The reception device according to the present invention includes the signal reception unit that receives a video signal as a differential signal transmitted through a transmission path using a plurality of channels from an external device. The reception device is, for example, an HDMI sink device. In the present invention, the communication unit that performs bidirectional communication by using a specific line constituting the transmission path is provided. By using the communication unit, additional information on individual video signals that can be transmitted from the external device is received, and displaying of the additional information is performed.

Here, the additional information is text information or image information, or text information and image information. In addition, for example, a transmission request for the additional information on the individual video signals is transmitted, by using the communication unit, to the external device.

In a case where the communication unit receives the additional information on the individual video signals as described above and, for example, a transmission request for the additional information is transmitted to the external device, the additional information on the individual video signals can be immediately received from the external device. Thus, the additional information on the individual video signals can be smoothly displayed, and the performance of a selecting operation on a video signal by a user can be improved.

In addition, in the present invention, for example, a user operation unit that allows a user to select a specific video signal in accordance with the additional information on the individual video signals displayed on the additional information display unit, and a communication control unit that performs control in such a manner that selection information on the specific video signal selected by the user operation unit is transmitted, by using the communication unit, to the external device, may further be provided. In this case, in a case where the user has selected a specific video signal, selection information on the specific video signal is immediately supplied to the external device, and the video signal corresponding to the selection information can be transmitted from the external device to the reception device. Thus, the selecting operation on the video signal by the user can be immediately reflected in image display, and the performance of an operation by the user can be improved.

Advantageous Effects

According to the present invention, additional information on individual video signals that can be transmitted to an external device is transmitted, by using a bidirectional communication unit, to the external device, the additional information on the individual video signals can be smoothly displayed on the external device side, and the performance of a selecting operation on a video signal by a user can be improved. In addition, according to the present invention, additional information on individual video signals that can be transmitted from an external device is received, by using a bidirectional communication unit, from the external device, the additional information on the individual video signals can be smoothly displayed, and the performance of a selecting operation on a video signal by a user can be improved.

BRIEF DESCRIPTION OF DRAWINGS

FIG. 7 is an illustration showing a pin arrangement (type A) of HDMI terminals.

FIG. 10 is an illustration showing an example of logical addresses set in accordance with the types of individual devices.

FIG. 11 is an illustration showing an example of the structure of command data.

FIG. 15 is an illustration showing a content display example on the sink device.

FIG. 20 is an illustration showing an example of the data structure of a control command transmitted through a high-speed data line.

FIG. 21 is an illustration showing the definitions of control commands and transmission additional information used for a control sequence.

FIG. 26 is an illustration showing the structure of E-EDID Vendor Specific Data Block.

EXPLANATION OF REFERENCE NUMERALS

1 HDMI cable, 5 and 5V, AV system, 10 and 10A video camera recorder, 11 imager, 12 imager driver, 13 imaging signal processing circuit, 14 camera control CPU, 15 static image signal processing circuit, 16 moving image signal processing circuit, 17 memory card, 18 recording/playback circuit, 19 recording medium, 20 system control CPU, 21 flash ROM, 22 SDRAM, 24 microphone, 25 audio signal processing circuit, 26 LCD controller, 27 LCD panel, 28 HDMI transmission unit (HDMI source), 28A high-speed data line interface, 29 HDMI terminal, 30 and 30A television receiver, 31 HDMI terminal, 32 HDMI reception unit (HDMI sink), 32A high-speed data line interface, 35 antenna terminal, 36 digital tuner, 37 demultiplexer, 38 MPEG decoder, 39 video signal processing circuit, 40 graphic generation circuit, 41 panel driving circuit, 42 display panel, 43 audio signal processing circuit, 44 audio amplifying circuit, 45 speaker, 50 internal bus, 51 CPU, 52 flash ROM, 53 DRAM, 54 Ethernet interface, 55 network terminal, 56 remote control reception unit, 57 remote control transmitter, 81 transmitter, 82 receiver, 83 DDC, 84 CEC line, 85 EDID ROM, 88 reserved line

BEST MODES FOR CARRYING OUT THE INVENTION

Figure 1:
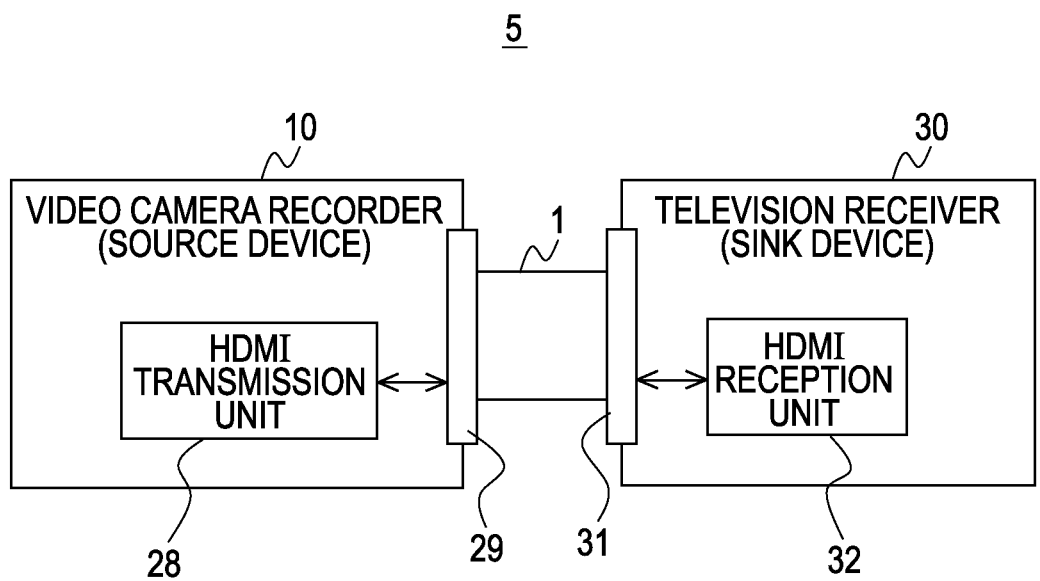
FIG. 1 is a block diagram showing an example of the configuration of an AV system according to an embodiment of the present invention.

Hereinafter, embodiments of the present invention will be explained with reference to the drawings. FIG. 1 shows an example of the configuration of an AV (Audio Visual) system 5 according to an embodiment.

The AV system 5 includes a video camera recorder 10 as a source device and a television receiver 30 as a sink device. The video camera recorder 10 and the television receiver 30 are connected through an HDMI cable 1. An HDMI terminal 29 to which an HDMI transmission unit (HDMI TX) 28 is connected is provided in the video camera recorder 10. An HDMI terminal 31 to which an HDMI reception unit (HDMI RX) 32 is connected is provided in the television receiver 30. One end of the HDMI cable 1 is connected to the HDMI terminal 29 of the video camera recorder 10, and the other end of the HDMI cable 1 is connected to the HDMI terminal 31 of the television receiver 30.

Figure 2:
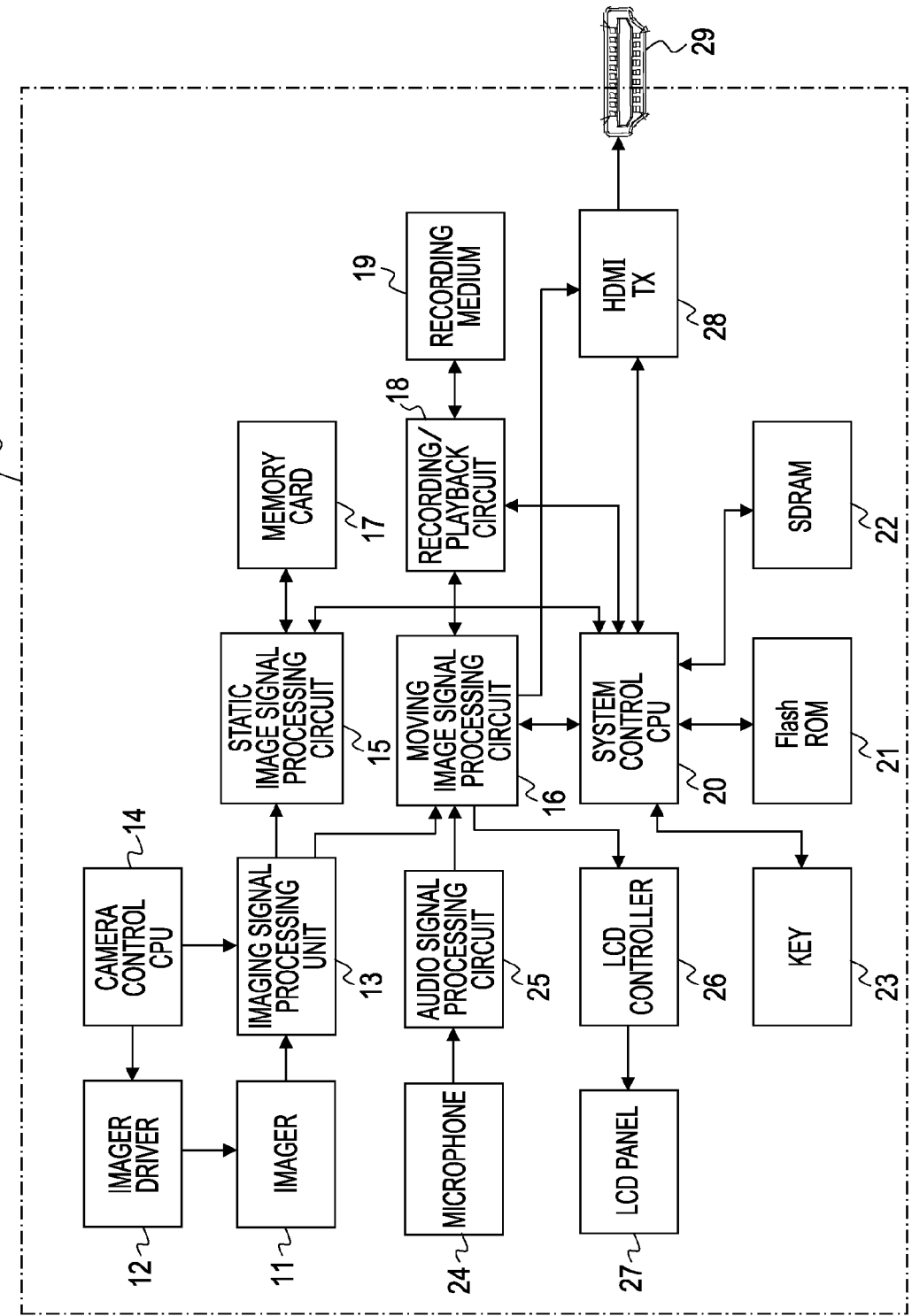
FIG. 2 is a block diagram showing an example of the configuration of a video camera recorder (source device) constituting the AV system.

FIG. 2 shows the configuration of the video camera recorder 10. The video camera recorder 10 includes an imager 11, an imager driver 12, an imaging signal processing circuit 13, a camera control CPU 14, a static image signal processing circuit 15, a moving image signal processing circuit 16, a memory card 17, a recording/playback circuit 18, a recording medium 19, a system control CPU (Central Processing Unit) 20, a flash ROM (Read Only Memory) 21, an SDRAM (Synchronous Dynamic Random Access Memory) 22, a key 23, a microphone 24, an audio signal processing circuit 25, an LCD controller 26, an LCD panel 27, the HDMI transmission unit 28, and the HDMI terminal 29.

The imager 11 is constituted by, for example, a C-MOS imaging element or a CCD imaging element. The imager driver 12 drives the imager 11. The imaging signal processing circuit 13 processes an imaging signal acquired by the imager 11 to generate image data (captured image data) corresponding to an object. The camera control CPU 14 controls the operations of the imager driver 12 and the imaging signal processing circuit 13.

At the time of capturing a static image, the static image signal processing circuit 15 performs compression and encoding processing based on, for example, a JPEG (Joint Photographic Experts Group) method on the image data, which is acquired by the imaging signal processing circuit 13, to generate static image data. Then, the static image signal processing circuit 15 writes the generated static image data to the memory card 17 or writes the generated static image data through the system control CPU 20 to the flash ROM 21.

In addition, the static image signal processing circuit 15 generates thumbnail data, which is static image data for an index, described later, and records the thumbnail data in the memory card 17. A thumbnail is generated in association with each video signal recorded in the recording medium 19, as described later, and constitutes additional information (image information) on the video signal. From this meaning, the memory card 17 constitutes an additional information storage unit.

The audio signal processing circuit 25 performs processing such as A/D conversion on an audio signal acquired by the microphone 24 to obtain audio data associated with captured image data. At the time of capturing a moving image, the moving image signal processing circuit 16 performs processing, such as compression and encoding conforming to a recording medium format, on the image data acquired by the imaging signal processing circuit 13, as well as the audio data acquired by the audio signal processing circuit 25, to generate moving image data including the audio data added thereto.

At the time of capturing a moving image, the recording/playback circuit 18 records the moving image data generated by the moving image signal processing circuit 16, as a video signal of the moving image, on the loaded recording medium 19. From this meaning, the recording medium 19 constitutes a video signal storage unit. The recording medium 19 may constitute an additional information storage unit for a thumbnail, which is index static image data described later. In addition, at the time of playing back a moving image, the recording/playback circuit 18 reads moving image data from the recording medium 35 and performs decoding processing and the like to obtain playback image data.

For example, as the recording medium 19, an optical disc, a hard disk, a magnetic tape, a semiconductor memory, or the like may be used. In addition, additional information (text information), such as a title, a recorded (captured) date and time, a recorded period of time, a recorded mode, and a comment entered by a user, can be recorded, for each unit of video signals recorded, in the recording medium 19. Here, a unit of video signals means video signals for one scene recorded during one period from the start of shooting to the end of shooting, video signals recorded on the same date, a series of video signals created by editing, or the like.

Note that in this embodiment, video signals of moving images recorded in the recording medium 19 are referred to as video content, where necessary. In this case, a piece of video content is constituted by a unit of video signals described above.

The LCD controller 26 drives the LCD (Liquid Crystal Display) panel 27 and displays a captured image (moving image) or a playback image (moving image) on the LCD panel 27, on the basis of the image data output from the imaging signal processing circuit 13 or the playback image data generated by the recording/playback circuit 18. In addition, the LCD controller 26 drives the LCD panel 27 and displays a playback image (static image) on the LCD panel 27, on the basis of the playback image data acquired from the memory card 17 or the like.

The system control CPU 20 controls the operations of the static image signal processing circuit 15, the moving image signal processing circuit 16, the recording/playback circuit 18, and the like. The flash ROM 21, the SDRAM 22, and the key 23 are connected to the system control CPU 20. The flash ROM 21 stores a control program and the like for the system control CPU 20. In addition, the SDRAM 22 is used for temporal storage and the like of data necessary for the control processing by the system control CPU 20. In addition, the flash ROM 21 or the SDRAM 22 stores data of a contents list described later. Note that thumbnail image data may be stored in the flash ROM 21 or the SDRAM 22, instead of being stored in the memory card 17 as described above.

The key 23 constitutes a user operation unit. The system control CPU 20 determines an operation state of the key 23, and controls the operation of the video camera recorder 10. A user is able to perform an operation for inputting various types of additional information and the like, as well as an image capturing (recording) operation and a playback operation.

The system control CPU 20 creates a contents list, which is data of individual pieces of video content, on the basis of additional information (text information or image information) recorded, together with the individual pieces of video content (individual video signals), in the recording medium 19, and stores the contents list in the flash ROM 21 or the SDRAM 22. From this meaning, the flash ROM 21 or the SDRAM 22 constitutes the additional information storage unit. The static image signal processing circuit 15 generates, for a piece of video content, at least a thumbnail as additional information (image information). Each thumbnail is provided with an ID indicating correspondence relative to a piece of video content. In a case where a thumbnail is generated from each piece of video content, various processes which have been conventionally known can be applied. For example, as the easiest process, creating a thumbnail by using image data of a first portion of each piece of video content is performed. The contents list and thumbnails generated described above can be displayed on the LCD panel 27 under the control of the system control CPU 20.

The HDMI transmission unit (HDMI source) 28 transmits baseband image (video) and audio data from the HDMI terminal 29 to the HDMI cable 1 (not illustrated in FIG. 2) in accordance with communication conforming to HDMI. The details of the HDMI transmission unit 28 will be described later.

The operation of the video camera recorder 10 shown in FIG. 2 will be briefly explained.

An imaging signal captured by the imager 11 is supplied to the imaging signal processing circuit 13 and processed, and image data (captured image data) corresponding to an object is acquired from the imaging signal processing circuit 13. At the time of capturing a static image, the static image signal processing circuit 15 performs compression and encoding processing and the like on the image data output from the imaging signal processing circuit 13 to generate static image data. The static image data is recorded in the memory card 17 or the like.

In addition, at the time of capturing a moving image, the moving image signal processing circuit 16 performs processing, such as compression and encoding conforming to a recording medium format, on the image data output from the imaging signal processing circuit 13, as well as audio data output from the audio signal processing circuit 25, to generate moving image data including the audio data added thereto. The moving image data is recorded, by using the recording/playback circuit 18, in the recording medium 19.

For each unit of video signals recorded, additional information (text information), such as a title, a recorded (captured) date and time, a recorded period of time, a recorded mode, and a comment, is recorded in the recording medium 19, in accordance with an operation on the key 23 by the user. Then, a contents list, which is data of individual pieces of video content, is created by the system control CPU 20 on the basis of additional information (text information or image information) on the individual pieces of video content (individual video signals), and the contents list is stored in the flash ROM 21 or the SDRAM 22. The contents list is added and updated every time a new unit of video signals is recorded in the recording medium 19.

In addition, every time a new unit of video signals is recorded in the recording medium 19, the static image signal processing circuit 15 generates a thumbnail, and the thumbnail is recorded in the memory card 17 or the like. The contents list and thumbnails described above are used when the contents list is displayed on the television receiver 30 so that the user can select a specific piece of video content, as described later.

At the time of playing back a static image, static image data is recorded from the memory card 17 or the like, and the static image signal processing circuit 15 performs processing such as decoding to obtain playback image data. The playback image data is supplied through the system control CPU 20 and the moving image signal processing circuit 16 to the LCD controller 26, and a static image is displayed on the LCD panel 27.

At the time of playing back a moving image, moving image data is read, by using the recording/playback circuit 18, from the recording medium 19, and the moving image signal processing circuit 16 performs processing such as decoding to obtain playback image data. The playback image data is supplied to the LCD controller 26, and a moving image is displayed on the LCD panel 27.

In a case where video and audio data related to moving image data recorded in the recording medium 19 is transmitted to the television receiver 30, moving image data is read from the recording medium 19 and supplied to the moving image signal processing circuit 16, processing such as decoding is performed on the moving image data, and baseband image and audio data is obtained. Then, the baseband image and audio data is supplied to the HDMI transmission unit 28, and transmitted through the HDMI cable 1, which is connected to the HDMI terminal 29, to the television receiver 30.

The cable 1 connected to the HDMI terminal 29 is provided for a transmission line (transmission path) for control data, as well as for a transmission line (transmission path) for video data. The transmission line for control data has a configuration that allows data transmission to be performed in a bidirectional manner. Thus, the HDMI transmission unit 28 has a function of transmitting and receiving control data, as well as a function of transmitting video signals. Control data received by the HDMI transmission unit 28 is supplied to the system control CPU 20. In addition, control data transmitted from the HDMI transmission unit 28 is supplied from the system control CPU 20.

In this embodiment, data of the contents list described above is one of a plurality of pieces of control data transmitted from the HDMI transmission unit 28. The system control CPU 20 transmits the data of the contents list in response to a transmission request from the television receiver 30. When transmitting the contents list, the system control CPU 20 also transmits thumbnails. The details of a process for transmitting a contents list and thumbnails will be described later.

Figure 3:
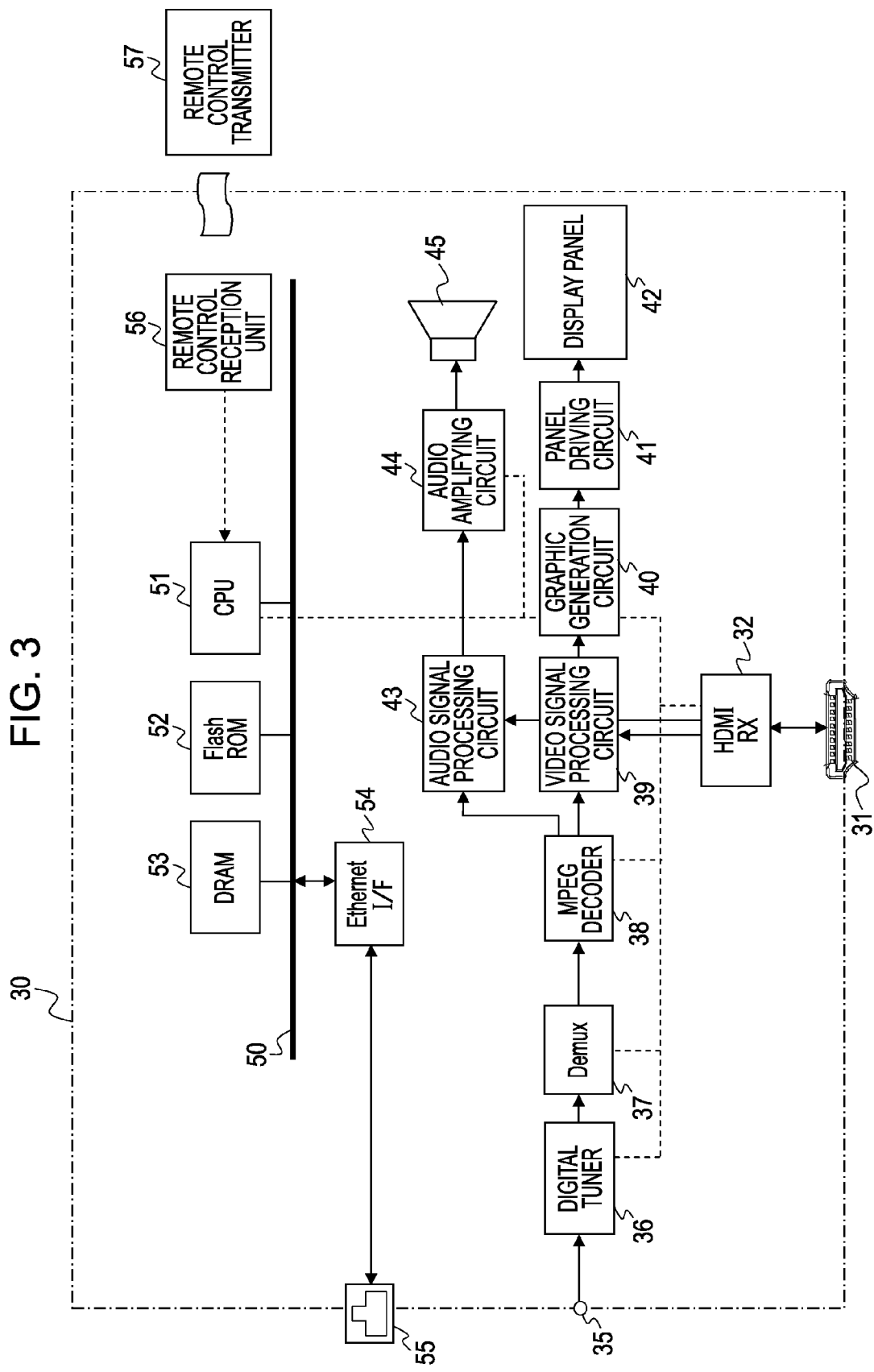
FIG. 3 is a block diagram showing an example of the configuration of a television receiver (sink device) constituting the AV system.

FIG. 3 shows an example of the configuration of the television receiver 30. The television receiver 30 includes the HDMI terminal 31, the HDMI reception unit 32, an antenna terminal 35, a digital tuner 36, a demultiplexer 37, an MPEG (Moving Picture Expert Group) decoder 38, a video signal processing circuit 39, a graphic generation circuit 40, a panel driving circuit 41, a display panel 42, an audio signal processing circuit 43, an audio amplifying circuit 44, a speaker 45, an internal bus 50, a CPU 51, a flash ROM 52, a DRAM (Dynamic Random Access Memory) 53, an Ethernet interface (Ethernet I/F) 54, a network terminal 55, a remote control reception unit 56, and a remote control transmitter 57. Note that "Ethernet (in Japanese)" and "Ethernet" are registered trademarks.

The antenna terminal 35 is a terminal which receives a television broadcast signal received at a reception antenna (not illustrated). The digital tuner 36 processes the television broadcast signal input to the antenna terminal 35, and outputs a specific transport stream corresponding to a channel selected by a user. The demultiplexer 37 extracts, from the transport stream obtained by the digital tuner 36, a partial TS (Transport Stream) (a TS packet of video data and a TS packet of audio data) corresponding to the channel selected by the user.

In addition, the demultiplexer 37 extracts, from the transport stream obtained by the digital tuner 36, PSI/SI (Program Specific Information/Service Information), and outputs the PSI/SI to the CPU 51. A plurality of channels are multiplexed together in the transport stream obtained by the digital tuner 36. The process performed by the demultiplexer 37 for extracting a partial TS of a desired channel from the transport stream is achieved by acquiring information on a packet ID (PID) of the desired channel from PSI/SI (PAT/PMT).

The MPEG decoder 38 performs decoding processing on a video PES (Packetized Elementary Stream) packet constituted by the TS packet of video data obtained by the demultiplexer 37 to obtain video data. In addition, the MPEG decoder 38 performs decoding processing on an audio PES packet constituted by the TS packet of audio data obtained by the demultiplexer 37 to obtain audio data.

The video signal processing circuit 39 and the graphic generation circuit 40 perform, where necessary, multi-screen processing, graphics data superimposition processing, and the like on the video data obtained by the MPEG decoder 38. The graphic generation circuit 40 creates, for example, a user interface screen for a contents list and the like described later. The panel driving circuit 41 drives the display panel 42 in accordance with video data output from the graphic generation circuit 40. The display panel 42 is constituted by, for example, an LCD (Liquid Crystal Display), a PDP (Plasma Display Panel), or the like. The audio signal processing circuit 43 performs necessary processing, such as D/A conversion, on the audio data obtained by the MPEG decoder 38. The audio amplifying circuit 44 amplifies an audio signal output from the audio signal processing circuit 43 and supplies the amplified audio signal to the speaker 45.

The CPU 51 controls the operation of each unit of the television receiver 30. The flash ROM 52 stores control software and holds data. The DRAM 53 forms a work area of the CPU 51. The CPU 51 loads, to the DRAM 53, software and data read from the flash ROM 52, starts the software, and controls each unit of the television receiver 30.

The remote control reception unit 56 receives a remote control signal (remote control code) transmitted from the remote control transmitter 57, and supplies the remote control code to the CPU 51. The CPU 51 controls each unit of the television receiver 30 in accordance with the remote control code. The network terminal 55 is a terminal which is connected to a network and is connected to the Ethernet interface 54. The CPU 51, the flash ROM 52, the DRAM 53, and the Ethernet interface 54 are connected to the internal bus 50.

In addition, the DRAM 53 or the flash ROM 52 stores additional information (contents list and thumbnails) of individual video signals transmitted from the video camera recorder 10. As described above, additional information on individual video signals stored in the DRAM 53 or the flash ROM 52 is read and supplied to the graphic generation circuit when necessary, and is used for creation of a user interface screen on which the contents list is displayed.

The HDMI reception unit (HDMI sink) 32 receives baseband video (image) and audio data supplied through the HDMI cable 1 to the HDMI terminal 31 in accordance with communication conforming to HDMI. The details of the HDMI reception unit 32 will be described later.

The operation of the television receiver 30 shown in FIG. 3 will be briefly explained.

A television broadcast signal input to the antenna terminal 35 is supplied to the digital tuner 36. The digital tuner 36 processes the television broadcast signal, outputs a specific transport stream corresponding to a channel selected by a user, and supplies the specific transport stream to the demultiplexer 37. The demultiplexer 37 extracts, from the transport stream, a partial TS (a TS packet of video data and a TS packet of audio data) corresponding to the channel selected by the user, and supplies the partial TS to the MPEG decoder 38.

The MPEG decoder 38 performs decoding processing on a video PES packet constituted by the TS packet of video data to obtain video data. After the video data is subjected to, where necessary, multi-screen processing, graphics data superimposition processing, and the like in the video signal processing circuit 39 and the graphic generation circuit 40, the processed video data is supplied to the panel driving circuit 41. Thus, an image corresponding to the channel selected by the user is displayed on the display panel 42.

In addition, the MPEG decoder 38 performs decoding processing on an audio PES packet constituted by the TS packet of audio data to obtain audio data. After the audio data is subjected to necessary processing, such as D/A conversion, in the audio signal processing circuit 43, and is further amplified in the audio amplifying circuit 44, the audio data is supplied to the speaker 45. Thus, sound corresponding to the channel selected by the user is output from the speaker 45.

In addition, the HDMI reception unit 32 acquires video (image) data and audio data transmitted from the video camera recorder 10, which is connected through the HDMI cable 1 to the HDMI terminal 31. The video data and the audio data are supplied to the video signal processing circuit 39 and the audio signal processing circuit 43, respectively. Subsequently, operations similar to those at the time of receiving a television broadcast signal described above are performed. An image is displayed on the display panel 42, and sound is output from the speaker 45.

As described above, the HDMI cable 1 connected to the HDMI terminal 31 is provided for a transmission line (transmission path) for control data, as well as for a transmission line (transmission path) for video data. The transmission line for control data has a configuration that allows data transmission to be performed in a bidirectional manner. Thus, the HDMI reception unit 32 has a function of transmitting and receiving control data, as well as a function of receiving video signals. Control data received by the HDMI reception unit 32 is supplied to the CPU 51. In addition, control data transmitted from the HDMI reception unit 32 is supplied from the CPU 51. In this embodiment, data of the contents list described above is one of a plurality of pieces of control data received by the HDMI reception unit 32.

Figure 4:
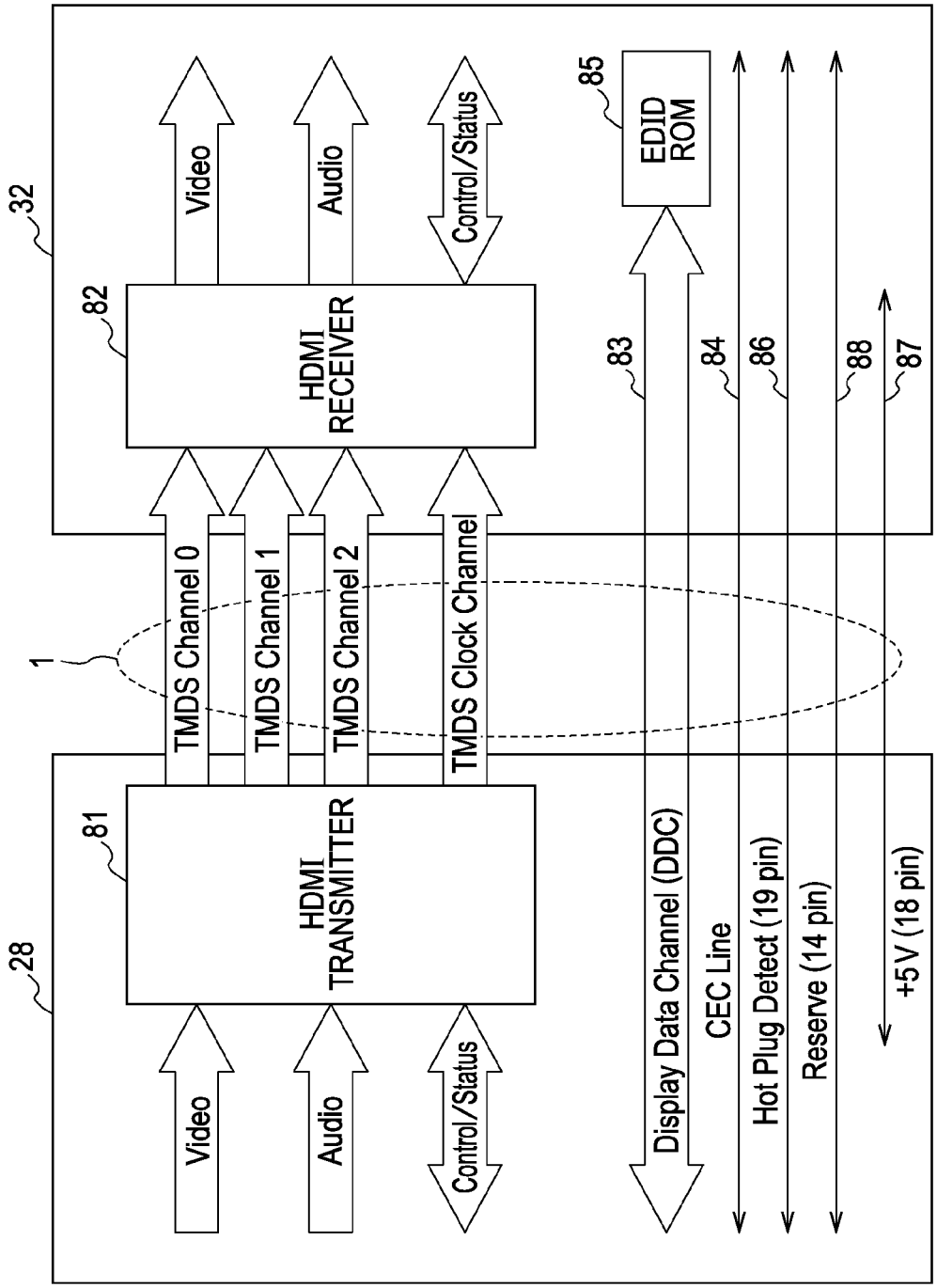
FIG. 4 is a block diagram showing an example of the configurations of an HDMI transmission unit (HDMI source) and an HDMI reception unit (HDMI sink).

FIG. 4 shows an example of the configurations of the HDMI transmission unit (HDMI source) 28 of the video camera recorder 10 and the HDMI reception unit (HDMI sink) 32 of the television receiver 30 in the AV system 5 in FIG. 1.

The HDMI source 28 transmits, in a unidirectional manner, a differential signal corresponding to pixel data of an uncompressed image for one screen through a plurality of channels to the HDMI sink 32, during an effective image period (hereinafter, where necessary, also referred to as an active video period), which is a period obtained by removing a horizontal blanking period and a vertical blanking period from a period from a certain vertical synchronizing signal to the next vertical synchronizing signal, and transmits, in a unidirectional manner, a differential signal corresponding to at least audio data associated with the image, control data, other auxiliary data, and the like through a plurality of channels to the HDMI sink 32, during the horizontal blanking period and the vertical blanking period.

That is, the HDMI source 28 includes a transmitter 81. For example, the transmitter 81 converts pixel data of an uncompressed image into a corresponding differential signal, and serially transmits, in a unidirectional manner, the differential signal, through three TMDS channels, #0, #1, and #2, which are a plurality of channels, to the HDMI sink 32, which is connected through the HDMI cable 1.

In addition, the transmitter 81 converts audio data associated with the uncompressed image, and furthermore, necessary control data, other auxiliary data, and the like into a corresponding differential signal, and serially transmits, in a unidirectional manner, the differential signal through the three TMDS channels #0, #1, and #2 to the HDMI sink 32, which is connected through the HDMI cable 1.

Moreover, the transmitter 81 transmits, through a TMDS clock channel to the HDMI sink 32, which is connected through the HDMI cable 1, a pixel clock which is synchronized with the pixel data transmitted through the three TMDS channels #0, #1, and #2. Here, 10-bit pixel data is transmitted through one TMDS channel #i (i=0, 1, 2) during one pixel clock.

The HDMI sink 32 receives a differential signal corresponding to pixel data which is transmitted, in a unidirectional manner, through the plurality channels from the HDMI source 28 during the active video period, and receives a differential signal corresponding to audio data and control data which is transmitted, in a unidirectional manner, through the plurality of channels from the HDMI source 28 during the horizontal blanking period or the vertical blanking period.

That is, the HDMI sink 32 includes a receiver 82. The receiver 82 receives a differential signal corresponding to pixel data and a differential signal corresponding to audio data and control data which are transmitted, in a unidirectional manner, through the TMDS channels #0, #1, and #2 from the HDMI source 28, which is connected through the HDMI cable 1, in synchronization with a pixel clock which is also transmitted from the HDMI source 28 through the TMDS clock channel.

Transmission channels for the HDMI system constituted by the HDMI source 28 and the HDMI sink 32 include transmission channels called a DDC (Display Data Channel) 83 and a CEC line 84, as well as the three TMDS channels #0 to #2 as transmission channels through which pixel data and audio data are serially transmitted in a unidirectional manner from the HDMI source 28 to the HDMI sink 32 in synchronization with a pixel clock and the TMDS clock channel as a transmission channel through which the pixel clock is transmitted.

The DDC 83 is formed by two signal lines, which are not illustrated, contained in the HDMI cable 1. The DDC 83 is used by the HDMI source 28 to read E-EDID (Enhanced Extended Display Identification Data) from the HDMI sink 32, which is connected through the HDMI cable 1.

That is, the HDMI sink 32 includes an EDID ROM (Read Only Memory) 85 which stores E-EDID, which is performance information on the performance (Configuration/capability) of the HDMI sink 32 itself, as well as the HDMI receiver 81. The HDMI source 28 reads E-EDID of the HDMI sink 32 through the DDC 83 from the HDMI sink 32, which is connected to through the HDMI cable 1, and identifies, in accordance with the E-EDID, settings of the performance of the HDMI sink 32, that is, for example, an image format (profile), such as RGB, YCbCr4:4:4, and YCbCr4:4:2, supported by an electronic device including the HDMI sink 32.

The CEC line 84 is formed by a single signal line, which is not illustrated, contained in the HDMI cable 1. The CEC line 84 is used for bidirectional communication of control data performed between the HDMI source 28 and the HDMI sink 32.

In addition, a line 86 connected to a pin called HPD (Hot Plug Detect) is contained in the HDMI cable 1. With the use of the line 86, a source device is capable of detecting connection of a sink device. In addition, a line 87 used for power supply from the source device to the sink device is also contained in the HDMI cable 1. Furthermore, a reserved line 88 is contained the HDMI cable 1.

Figure 5:
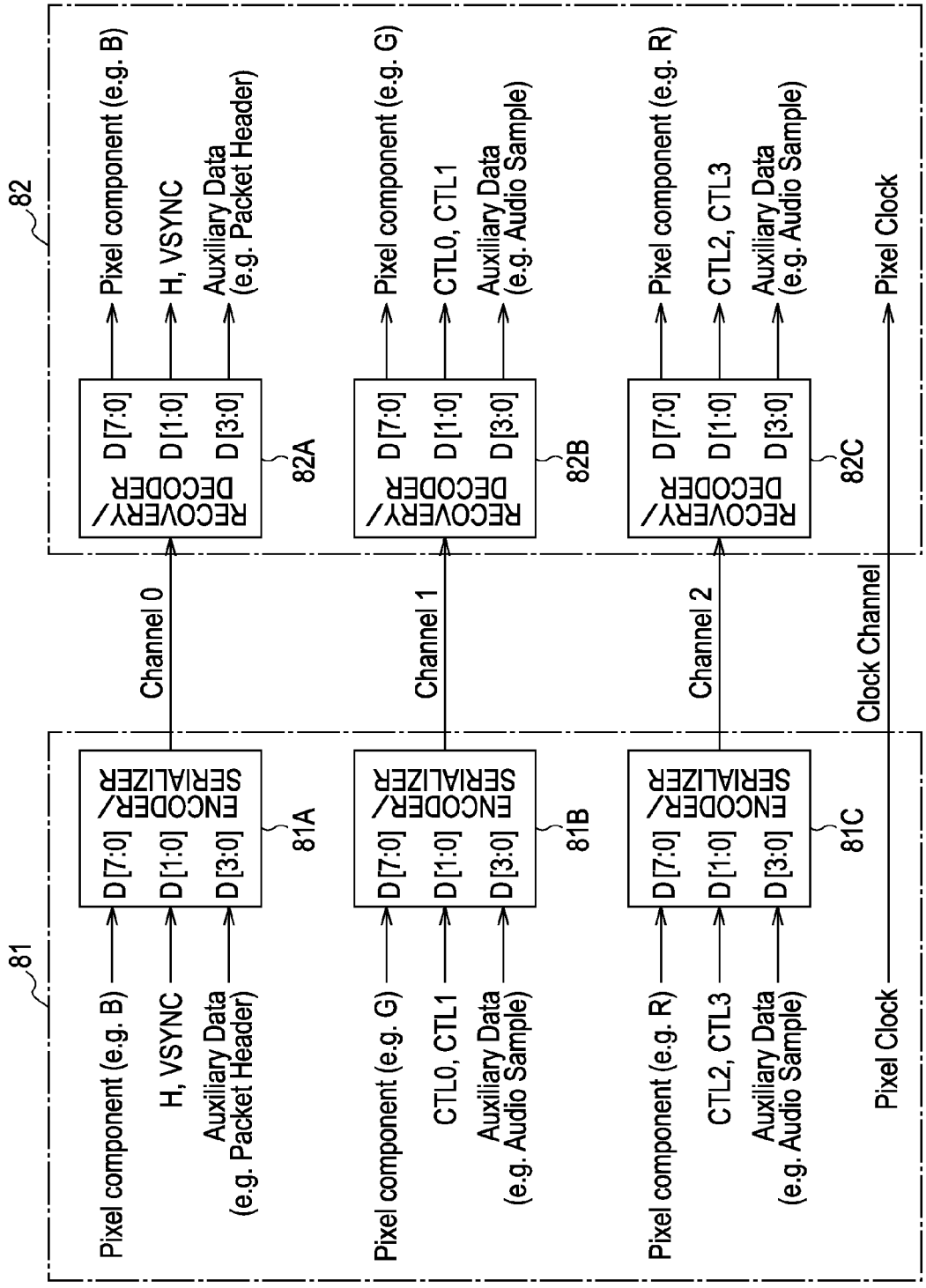
FIG. 5 is a block diagram showing an example of the configurations of an HDMI transmitter and an HDMI receiver.

FIG. 5 shows an example of the configurations of the HDMI transmitter 81 and the HDMI receiver 82 in FIG. 4.

The transmitter 81 includes three encoders/serializers 81A, 81B, and 81C corresponding to the three TMDS channels #0, #1, and #2, respectively. The encoders/serializers 81A, 81B, and 81C individually encode image data, auxiliary data, and control data supplied to the encoders/serializers 81A, 81B, and 81C, convert parallel data into serial data, and transmit the converted data as differential signals. Here, in a case where image data includes three components, such as R (red), G (green), and B (blue), the B component is supplied to the encoder/serializer 81A, the G component is supplied to the encoder/serializer 81B, and the R component is supplied to the encoder/serializer 81C.

In addition, the auxiliary data includes, for example, audio data and a control packet. The control packet is supplied, for example, to the encoder/serializer 81A, and the audio data is supplied to the encoders/serializers 81B and 81C.

Furthermore, the control data includes a 1-bit vertical synchronizing signal (VSYNC), a 1-bit horizontal synchronizing signal (HSYNC), and control bits CTL0, CTL1, CTL2, and CTL3, each of which is one bit. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits, in a time division manner, the B component of the image data, the vertical synchronizing signal, the horizontal synchronizing signal, and the auxiliary data supplied to the encoder/serializer 81A. That is, the encoder/serializer 81A converts the B component of the image data supplied to the encoder/serializer 81A into parallel data of a unit of 8 bits, which corresponds to the fixed number of bits. Furthermore, the encoder/serializer 81A encodes the parallel data, converts the encoded data into serial data, and transmits the converted data through the TMDS channel #0.

In addition, the encoder/serializer 81A encodes the 2-bit parallel data of the vertical synchronizing signal and the horizontal synchronizing signal supplied to the encoder/serializer 81A, converts the encoded data into serial data, and transmits the converted data through the TMDS channel #0. Furthermore, the encoder/serializer 81A converts the auxiliary data supplied to the encoder/serializer 81A into parallel data of a unit of 4 bits. Then, the encoder/serializer 81A encodes the parallel data, converts the encoded data into serial data, and transmits the converted data through the TMDS channel #0.

The encoder/serializer 81B transmits, in a time division manner, the G component of the image data, the control bits CTL0 and CTL1, and the auxiliary data supplied to the encoder/serializer 81B. That is, the encoder/serializer 81B converts the G component of the image data supplied to the encoder/serializer 81B into parallel data of a unit of 8 bits, which corresponds to the fixed number of bits. Furthermore, the encoder/serializer 81B encodes the parallel data, converts the encoded data into serial data, and transmits the converted data through the TMDS channel #1.

In addition, the encoder/serializer 81B encodes the 2-bit parallel data of the control bits CTL0 and CTL1 supplied to the encoder/serializer 81B, converts the encoded data into serial data, and transmits the converted data through the TMDS channel #1. Furthermore, the encoder/serializer 81B converts the auxiliary data supplied to the encoder/serializer 81B into parallel data of a unit of 4 bits. Then, the encoder/serializer 81B encodes the parallel data, converts the encoded data into serial data, and transmits the converted data through the TMDS channel #1.

The encoder/serializer 81C transmits, in a time division manner, the R component of the image data, the control bits CTL2 and CTL3, and the auxiliary data supplied to the encoder/serializer 81C. That is, the encoder/serializer 81C converts the R component of the image data supplied to the encoder/serializer 81C into parallel data of a unit of 8 bits, which corresponds to the fixed number of bits. Furthermore, the encoder/serializer 81C encodes the parallel data, converts the encoded data into serial data, and transmits the converted data through the TMDS channel #2.

In addition, the encoder/serializer 81C encodes the 2-bit parallel data of the control bits CTL2 and CTL3 supplied to the encoder/serializer 81C, converts the encoded data into serial data, and transmits the converted data through the TMDS channel #2. Furthermore, the encoder/serializer 81C converts the auxiliary data supplied to the encoder/serializer 81C into parallel data of a unit of 4 bits. Then, the encoder/serializer 81C encodes the parallel data, converts the encoded data into serial data, and transmits the converted data through the TMDS channel #2.

The receiver 82 includes three recovery/decoders 82A, 82B, and 82C corresponding to the three TMDS channels #0, #1, and, #2, respectively. The recovery/decoders 82A, 82B, and 82C individually receive image data, auxiliary data, and control data transmitted as differential signals through the TMDS channels #0, #1, and #2. Furthermore, the recovery/decoders 82A, 82B, and 82C individually convert the image data, the auxiliary data, and the control data from serial data to parallel data, decode the converted data, and output the decoded data.

That is, the recovery/decoder 82A receives the B component of the image data, the vertical synchronizing signal, the horizontal synchronizing signal, and the auxiliary data transmitted as a differential signal through the TMDS channel #0. Then, the recovery/decoder 82A converts the B component of the image data, the vertical synchronizing signal, the horizontal synchronizing signal, and the auxiliary data from serial data into parallel data, decodes the converted data, and outputs the decoded data.

The recovery/decoder 82B receives the G component of the image data, the control bits CTL0 and CTL1, and the auxiliary data transmitted as a differential signal through the TMDS channel #1. Then, the recovery/decoder 82B converts the G component of the image data, the control bits CTL0 and CTL1, and the auxiliary data from serial data into parallel data, decodes the converted data, and outputs the decoded data.

The recovery/decoder 82C receives the R component of the image data, the control bits CTL2 and CTL3, and the auxiliary data transmitted as a differential signal through the TMDS channel #2. Then, the recovery/decoder 82C converts the R component of the image data, the control bits CTL2 and CTL3, and the auxiliary data from serial data into parallel data, decodes the converted data, and outputs the decoded data.

Figure 6:
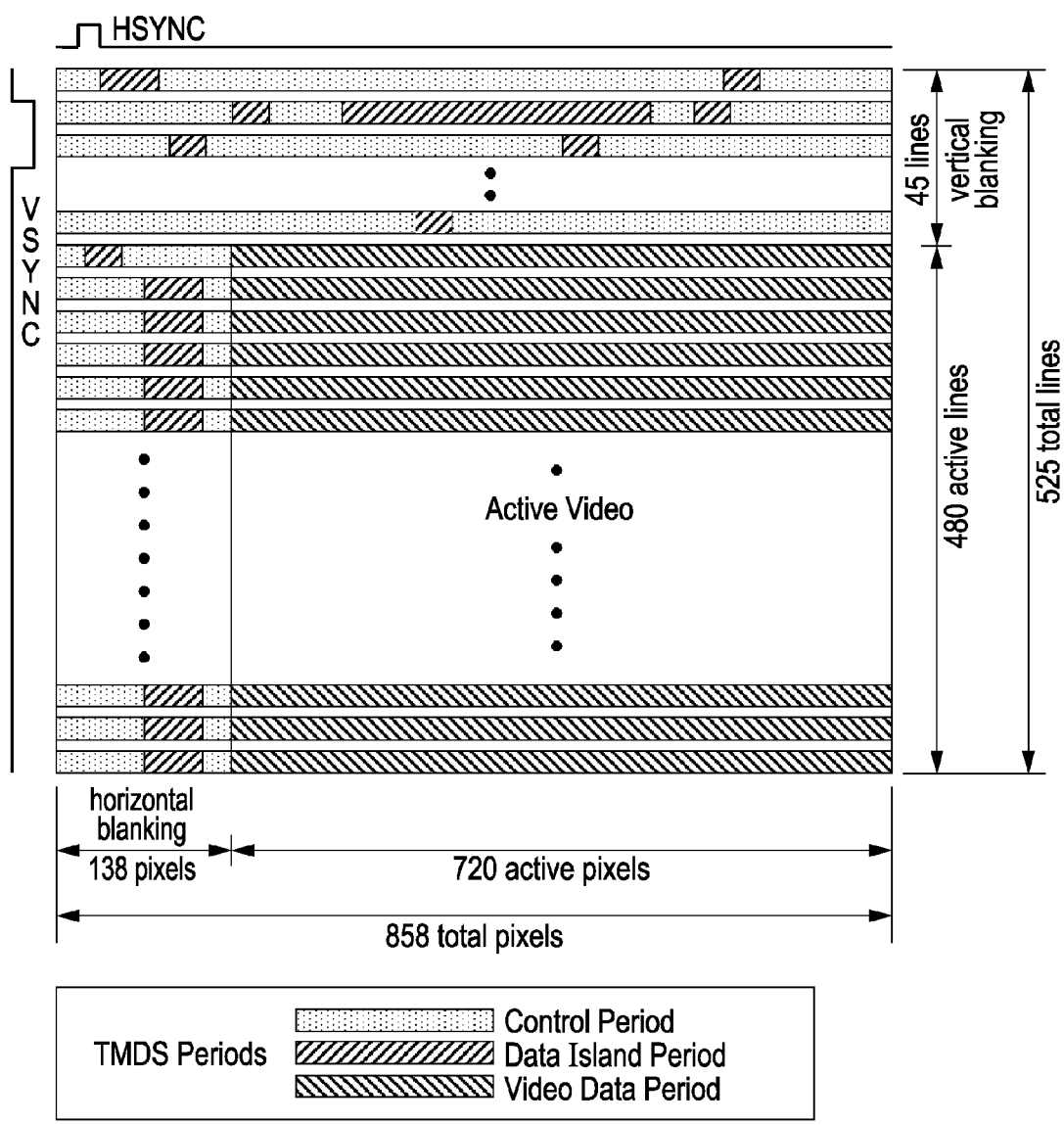
FIG. 6 is an illustration showing the structure of TMDS transmission data.

FIG. 6 shows an example of transmission periods (durations) during which various transmission data are transmitted through the three TMDS channels #0, #1, and #2 of HDMI. Note that FIG. 6 shows periods of various transmission data in a case where a progressive image having 720 horizontal pixels and 480 vertical pixels is transmitted through the TMDS channels #0, #1, and #2.

In a Video Field in which transmission data is transmitted through the three TMDS channels #0, #1, and #2 of HDMI, three types of periods, a Video Data period, a Data Island period, and a Control period, exist, in accordance with the type of transmission data.

Here, the Video Field period is a period from a rising edge (active edge) of a certain vertical synchronizing signal to a rising edge of the next vertical synchronizing signal. The Video Field period is divided into a horizontal blanking time (horizontal blanking), a vertical blanking time (vertical blanking), and an active video period (Active Video), which is a period obtained by removing the horizontal blanking time and the vertical blanking time from the Video Field period.

The Video Data period is allocated to the active video period. During the Video Data period, data of effective pixels (Active pixels) for 720 pixels×480 lines constituting uncompressed image data for one screen is transmitted.

The Data Island period and the Control period are applied to the horizontal blanking time and the vertical blanking time. During the Data Island period and the Control period, Auxiliary data is transmitted.

That is, the Data Island period corresponds to one part of the horizontal blanking time and the vertical blanking time. During the Data Island period, among the auxiliary data, data not relating to control, such as, for example, a packet of audio data, is transmitted.

The Control period is allocated to the other part of the horizontal blanking time and the vertical blanking time. During the Control period, among the auxiliary data, data relating to control, such as, for example, the vertical synchronizing signal, the horizontal synchronizing signal, and the control packet, is transmitted.

Here, according to the current HDMI, the frequency of a pixel clock transmitted through a TMDS clock channel is, for example, 165 MHz. In this case, the transmission rate in the Data Island period is about 500 Mbps. In this embodiment, by using the Data Island period, thumbnail data, which is index video data, is transmitted from the video camera recorder 10 to the television receiver 30.

FIG. 7 shows the pin arrangement of the HDMI terminals 29 and 31. This pin arrangement is called type-A.

Two lines serving as differential lines through which TMDS Data#i+ and TMDS Data#i−, which are differential signals for a TMDS channel #i, are transmitted, are connected to a pin (a pin whose pin number is 1, 4, or 7) to which TMDS Data#i+ is allocated and a pin (a pin whose pin number is 3, 6, or 9) to which TMDS Data#i− is allocated.

In addition, the CEC line 84 through which a CEC signal, which is control data, is transmitted, is connected to a pin whose pin number is 13, and a pin whose pin number is 14 is an empty (reserved) pin. In addition, a line through which an SDA (Serial Data) signal such as E-EDID is transmitted, is connected to a pin whose pin number is 16. A line through which an SCL (Serial Clock) signal, which is a clock signal used for synchronization at the time of transmission and reception of the SDA signal, is connected to a pin whose pin number is 15. The DDC 83 described above is constituted by the line through which the SDA signal is transmitted and the line through which the SCL signal is transmitted.

In addition, the line 86, which is used by a source device to detect connection of a sink device as described above, is connected to a pin whose pin number is 19. In addition, the line 87, which is used for supplying power as described above, is connected to a pin whose pin number is 18.

Figure 8:
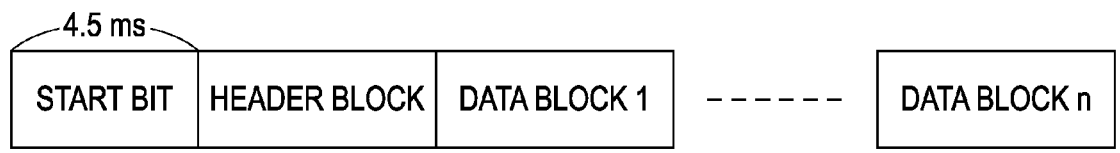
FIG. 8 is an illustration showing the block structure of data transmitted through a CEC channel.

The structure of data transmitted through the CEC channel shown in FIG. 4 will be explained with reference to FIGS. 8 to 11. FIG. 8 is an illustration showing the block structure of data transmitted through the CEC channel. The CEC channel is configured in such a manner that one block is transmitted in 4.5 milliseconds. At the start of data transmission, a start bit is arranged. Then, a header block is arranged subsequent to the start bit. After the header block, a desired number (n) of data blocks containing data that is actually desired to be transmitted are arranged.

Figure 9:
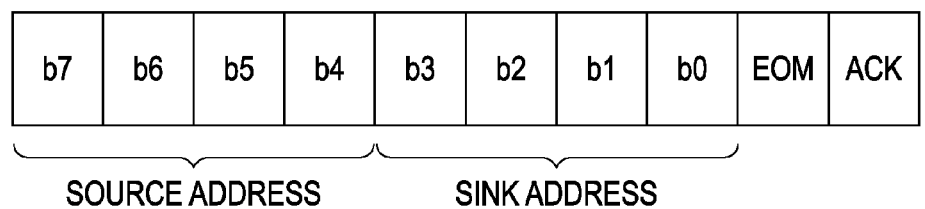
FIG. 9 is an illustration showing an example of the data structure of a header block.

FIG. 9 is an illustration showing an example of the data structure of the header block. In the header block, the address of a source device (source address) and the address of a sink device (sink address) are arranged. Each of the addresses is set in accordance with the type of device.

FIG. 10 shows an example of logical addresses set in accordance with the types of individual devices. As shown in FIG. 10, for individual types of devices, sixteen types of address values, from "0" to "15", are set. In the source address and the sink address constituting the header block shown in FIG. 9, corresponding address values are arranged as 4-bit data in accordance with the source device and the sink device. For example, in the case of the AV system 5 shown in FIG. 1, in which the video camera recorder 10 and the television receiver 30 are connected through the HDMI cable 1, the source address represents an address value "10" for video cameras and the sink address represents an address value "0 for television receivers (TVs).

In addition, for transmission of control commands using the CEC channel, commands shown in FIG. 11 are provided. Although omitted in FIG. 11, values are determined for individual commands. A receiving side determines an instruction of a command by determining a transmitted value. Here, only control commands relating to control of the video camera recorder 10 are shown.

A <give Contents List> command is a command for issuing a request for transmission of a contents list. A receiving side which has received this command sends back, as a response, a <set Content Number> command, which will be described next. The <set Content Number> command is a command for issuing a notification indicating the number of pieces of content shown in the contents list stored in the own device. A <set Content Info> command is a command for transmitting data of the contents list.

A <Thumb Nail ID> command is a command for issuing a notification indicating an ID (identification number) for transmission of thumbnail data. A <Play Content> command is a command for issuing an instruction to play back content. When this command is received, a response indicating the status of a device (whether or not entering a playback state) is sent back. An <Image View On> command is a command for issuing a notification indicating that the device has entered the playback state.

Figures 12, 13:
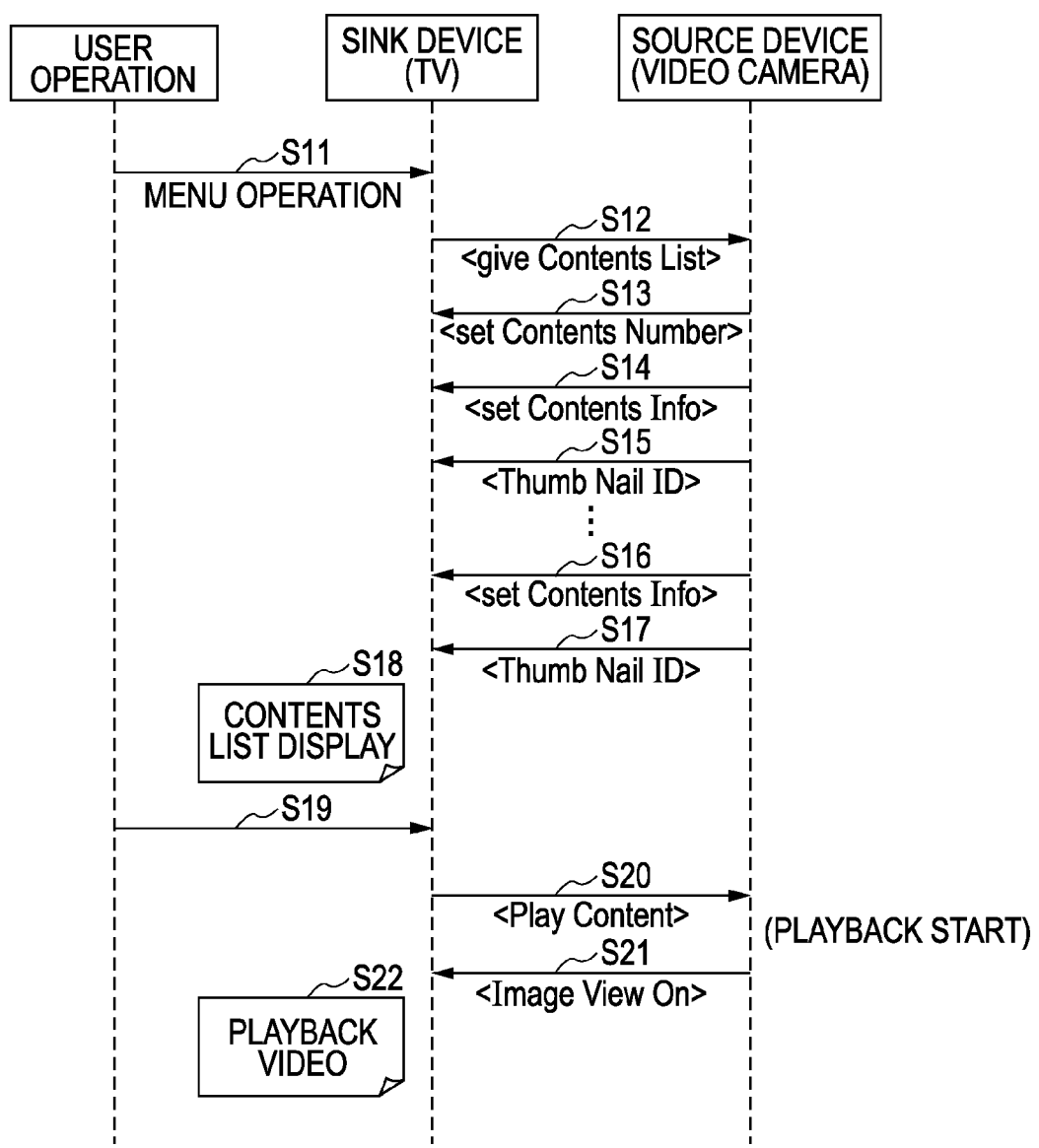
FIG. 12 is an illustration showing an example of the data structure of a header when thumbnail data is transmitted.
FIG. 13 is a sequence diagram for explaining an example of data transmission performed between an HDMI terminal of the video camera recorder and an HDMI terminal of the television receiver through an HDMI cable.

FIG. 12 shows an example of the data structure of a header in the case of transmitting data of a thumbnail. In FIG. 12, 8 bits are shown as one unit. Packet-type data indicating thumbnail data is arranged in the first 8 bits. Data of a content number indicating the content to which the thumbnail belongs is arranged in the next 8 bits. Data indicating the data length of the thumbnail data is arranged in the next 8 bits. Then, thumbnail data is arranged after the header.

The thumbnail data may be image data (static image data) on which some compression processing has been performed. A plurality of pieces of thumbnail data are arranged in order, for example, in the Data Island period arranged between the vertical blanking time and the horizontal blanking time of the video data shown in FIG. 6.

Next, an example of data transmission performed between the HDMI terminal 29 of the video camera recorder 10 and the HDMI terminal 31 of the television receiver 30 through the HDMI cable 1 in this embodiment will be explained with reference to FIG. 13.

This data transmission example is an example of a case where processing is performed in which a user operates the remote control transmitter 57 (see FIG. 3) on the television receiver 30 side to acquire a list (contents list) of individual pieces of video content recorded in the recording medium 19 in the video camera recorder 10, a piece of video content selected by the user in accordance with the display is played back by the video camera recorder 10, and the video content is displayed on the television receiver 30.

First, the user operates a key arranged on the remote control transmitter 57 to cause a menu screen to be displayed on the display panel 42 of the television receiver (step S11). This menu screen is generated by the graphic generation circuit 40 under the control of the CPU 51 of the television receiver 30. Then, when the user performs an operation for acquiring a contents list from a device connected to the HDMI terminal 31 in accordance with the menu screen, the CPU 51 transmits a command through the CEC channel to the video camera recorder 10, which is the device connected through the HDMI terminal 31 (step S12). The command transmitted here is a <give Contents List> command for issuing a request to transmit a contents list.

When the system control CPU 20 of the video camera recorder 10 determines that the command has been received, the system control CPU 20 sends back the number of pieces of content shown in the contents list prepared inside the video camera recorder 10 (step S13). The command transmitted here is obtained by adding data of the number of pieces of content to the <set Content Number> command for issuing a notification indicating the number of pieces of content.

After the transmission of the number of pieces of content, the CPU 20 transmits a <set Content Info> command for transmitting data of the contents list (step S14). After the command, the CPU 20 transmits data obtained by adding an ID to <Thumb Nail ID> for issuing a notification indicating the ID of a thumbnail (step S15). While the <set Content Info> command and the <Thumb Nail ID> command are transmitted through the CEC channel, data of the thumbnail with which the ID is provided is arranged in a Data Island period arranged in each blanking time and is transmitted through the transmission channels for video data (TMDS channels #0, #1, and #2).

Figure 14:
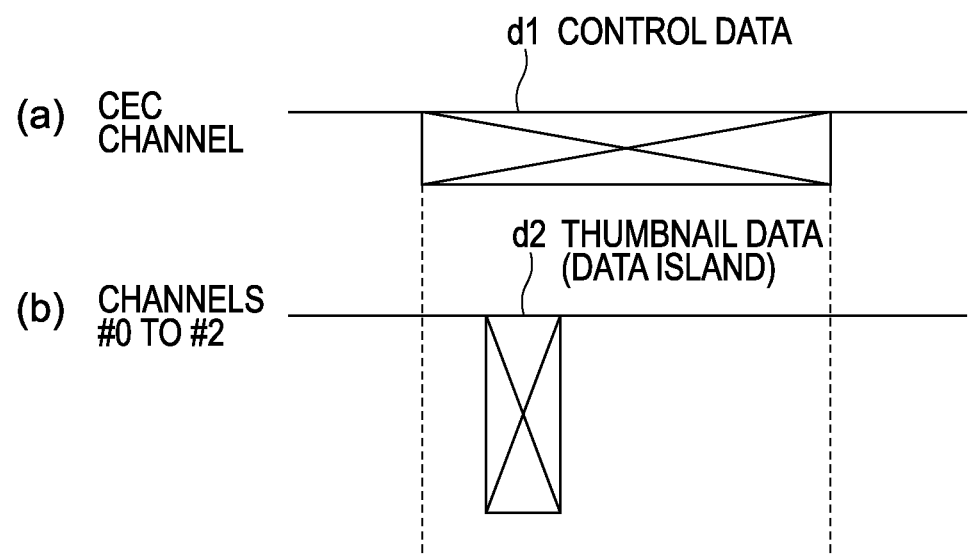
FIG. 14 is an illustration for explaining an example of transmission of thumbnail data.

That is, for example, while control data d1 containing the <set Content Info> command and the <Thumb Nail ID> command is transmitted through the CEC line as shown in FIG. 14(*a*), data d2 of a thumbnail with which an ID is provided is arranged in a Data Island period of the transmission channels for video data and is transmitted.

Note that in the video camera recorder 10 according to this embodiment, even in a case where a recording operation or a content playback operation is not performed, if a sink device is connected to the HDMI terminal 29, video data for full-screen white display or the like is output from the HDMI terminal 29. Thumbnail data is provided for a blanking time of the video data and is transmitted.

Referring back to the explanation of FIG. 13, data transmission units, the number of which is equal to the number of pieces of content notified by the <set Content Number> command, are repeated, where the <set Content Info> command, the <Thumb Nail ID> command, and thumbnail data for a Data Island period are set as a data transmission unit, and thumbnail videos of individual pieces of video content or the like are transmitted. That is, in the example of FIG. 13, the last unit of content data is transmitted as steps S16 and S17.

The CPU 51 of the television receiver 30 stores, in the DRAM 53 or the like, data of a contents list and thumbnail data of individual pieces of video content in the list transmitted from the video camera recorder 10. Then, the CPU causes the graphic generation circuit 40 to generate a display screen of the contents list in accordance with the contents list and the thumbnail data, and causes the display panel 42 to display the display screen (step S18).

When the user operates the remote control transmitter 57 and selects a specific piece of video content from the contents list displayed on the display panel 42 (step S19), the CPU 51 of the television receiver 30 adds the number of the selected piece of video content to a <Play Content> command for issuing an instruction to play back a piece of video content, and transmits, to the video camera recorder 10, the <Play Content> command including the number of the selected piece of video content added thereto (step S20).

The system control CPU 20 of the video camera recorder 10, which has received the playback instruction command, plays back the corresponding piece of video content from the recording medium 19, outputs data of the played-back video content via the HDMI terminal 29, and transmits the data to the television receiver 30 (step S21). Transmission of the data of the video content is performed by using the transmission channels for video data (TMDS channels #0, #1, and #2).

As described above, when transmission of the data of the played-back video content starts, the television receiver 30 performs output processing for video (image) and audio data received via the HDMI terminal 31, and performs playback processing for video content (step S22).

FIG. 15 shows an example of display of a contents list on the television receiver 30. In this example, four titles are displayed on a screen, and thumbnails are displayed on a side of the titles. For example, by a scroll operation on a screen, display titles can be scrolled through. In addition to a thumbnail, additional information, such as a recorded date and time and the length of content (a recorded period of time), is displayed in a display portion of each title. The user is able to select a piece of video content to be played back while referring to titles and thumbnails from the display of such a contents list and to perform a playback operation for the selected video.

As described above, in the AV system 5 shown in FIG. 1, only by connecting the video camera recorder 10 and the television receiver 30 through a single HDMI cable 1, a contents list and thumbnail data prepared in the video camera recorder 10 side can be transmitted to the television receiver 30, and the contents list can be displayed on the television receiver 30 side. Hence, the user is able to understand the details of video content recorded in the recording medium 19 in the video camera recorder 10 without operating the video camera recorder 10, a necessary piece of video content can be easily played back from the video camera recorder 10, and display of the played-back video content and the like can be performed.

In this case, since the screen for displaying a list shown in FIG. 15 is generated on the television receiver side, the video camera recorder 10 side only needs to create a contents list and the like. Thus, a heavy burden is not imposed on the video camera recorder 10. In addition, the operation itself can be performed by using the remote control transmitter 57 attached to the television receiver 30. Thus, user friendliness can be achieved.

Note that the command configuration explained in the embodiment described above is shown as an example, and the present invention is not limited to this. In addition, although a thumbnail (index video) is arranged in a blanking time of a transmission line for video data and is transmitted in the embodiment described above, the thumbnail may be arranged in a different time and be transmitted. For example, the thumbnail may be transmitted by using the CEC line or the DDC line prepared in conformity with the HDMI standards.

Figure 16:
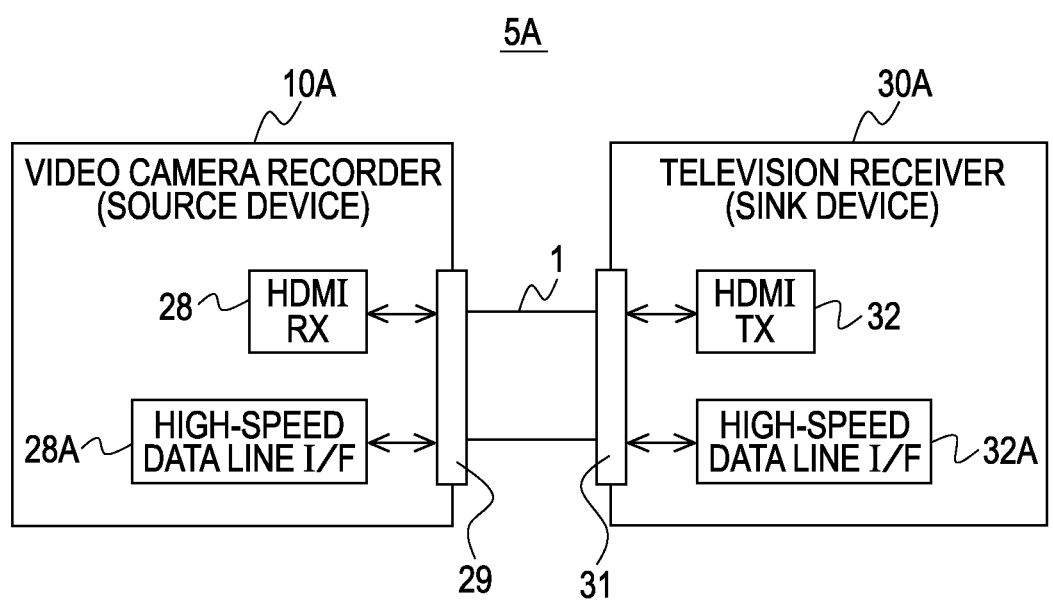
FIG. 16 is a block diagram showing an example of the configuration of an AV system according to another embodiment of the present invention.

Next, another embodiment of the present invention will be described. FIG. 16 shows an example of the configuration of an AV (Audio Visual) system 5A according to another embodiment of the present invention.

The AV system 5A includes a video camera recorder 10A as a source device and a television receiver 30A as a sink device. The video camera recorder 10A and the television receiver 30A are connected through the HDMI cable 1. The HDMI terminal 29 to which the HDMI transmission unit (HDMI TX) 28 and a high-speed data line interface (I/F) 28A constituting a communication unit are connected is provided in the video camera recorder 10A.

In addition, the HDMI terminal 31 to which the HDMI reception unit (HDMI RX) 32 and a high-speed data line interface (I/F) 32A constituting a communication unit are connected is provided in the television receiver 30A. One end of the HDMI cable 1 is connected to the HDMI terminal 29 of the video camera recorder 10A and the other end of the HDMI cable 1 is connected to the HDMI terminal 31 of the television receiver 30A.

In the AV system 5 shown in FIG. 1 described above, when a contents list and thumbnail data are transmitted from the video camera recorder 10 to the television receiver 30, the CEC channel and the transmission channels for video data (TMDS channels #0, #1, and #2) are used. In the AV system 5A shown in FIG. 16, by using a high-speed data line formed by specific lines constituting the HDMI cable 1, a contents list and thumbnail data are transmitted at high speed from the video camera recorder 10A to the television receiver 30A.

Figure 17:
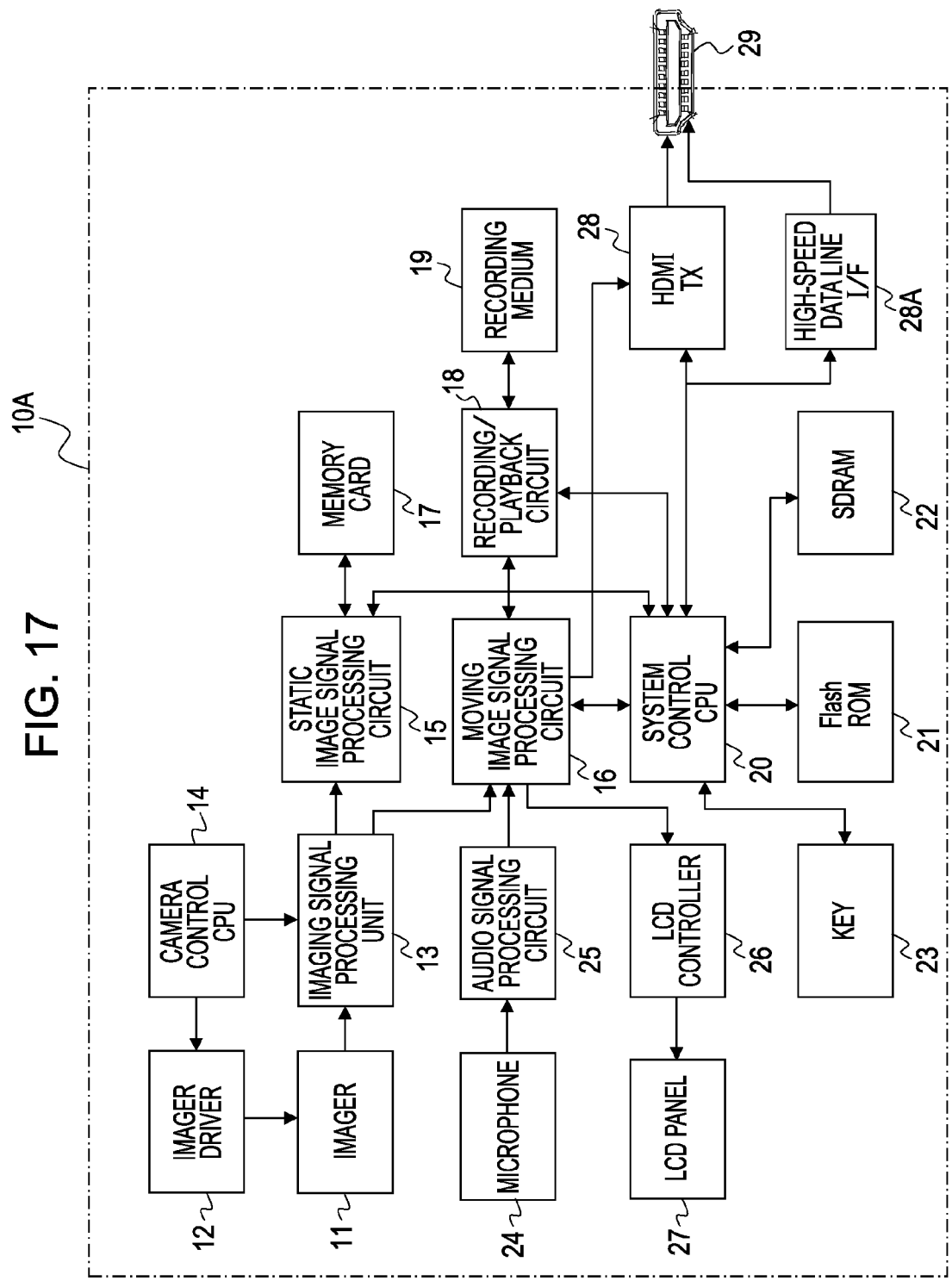
FIG. 17 is a block diagram showing an example of the configuration of a video camera recorder (source device) constituting the AV system.

FIG. 17 shows an example of the configuration of the video camera recorder 10A. In FIG. 17, parts corresponding to those in FIG. 2 are denoted by the same signs, and the detailed description of those parts will be omitted in an appropriate manner.

The video camera recorder 10A includes the imager 11, the imager driver 12, the imaging signal processing circuit 13, the camera control CPU 14, the static image signal processing circuit 15, the moving image signal processing circuit 16, the memory card 17, the recording/playback circuit 18, the recording medium 19, the system control CPU 20, the flash ROM 21, the SDRAM 22, the key 23, the microphone 24, the audio signal processing circuit 25, the LCD controller 26, the LCD panel 27, the HDMI transmission unit 28, the high-speed data line interface (I/F) 28A, and the HDMI terminal 29.

The high-speed data line interface 28A is an interface for bidirectional communication using a specific line constituting the HDMI cable 1. The high-speed data line interface 28A is inserted between the system control CPU 20 and the HDMI terminal 29. The high-speed data line interface 28A transmits, via the HDMI terminal 29 through the HDMI cable 1 to an opposite device, transmission data supplied from the system control CPU 20. In addition, the high-speed data line interface 28A supplies, to the system control CPU 20, reception data received via the HDMI terminal 29 through the HDMI cable 1 from the opposite device. The details of the high-speed data line interface 28A will be described later.

Although a detailed description will be omitted, other configuration and operation of the video camera recorder 10A shown in FIG. 17 are similar to those of the video camera recorder 10 shown in FIG. 2 described above.

Figure 18:
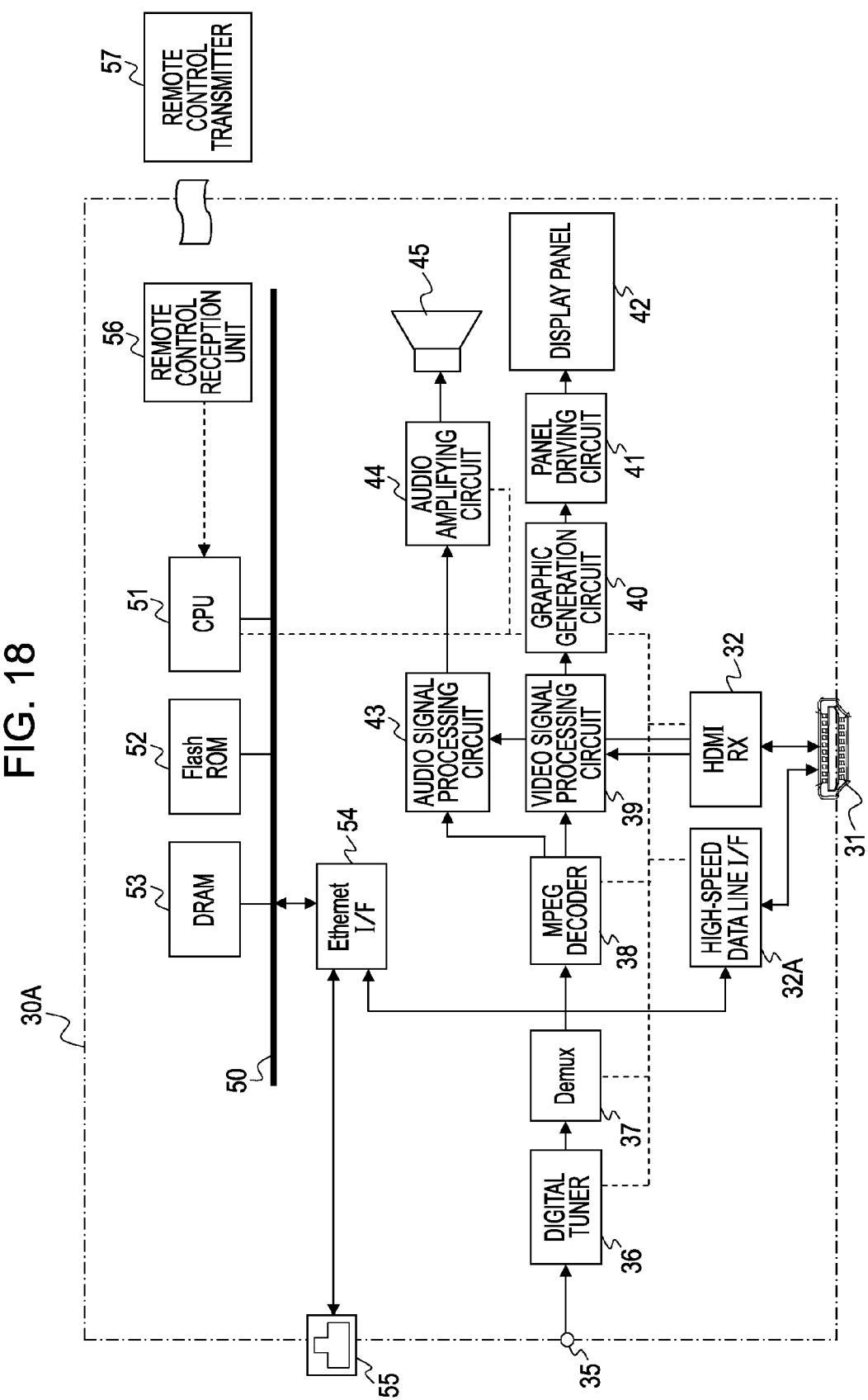
FIG. 18 is a block diagram showing an example of the configuration of a television receiver (sink device) constituting the AV system.

FIG. 18 shows an example of the configuration of the television receiver 30A. The television receiver 30A includes the HDMI terminal 31, the HDMI reception unit 32, the high-speed data line interface (I/F) 32A, the antenna terminal 35, the digital tuner 36, the demultiplexer 37, the MPEG (Moving Picture Expert Group) decoder 38, the video signal processing circuit 39, the graphic generation circuit 40, the panel driving circuit 41, the display panel 42, the audio signal processing circuit 43, the audio amplifying circuit 44, the speaker 45, the internal bus 50, the CPU (Central Processing Unit) 51, the Flash ROM (Read Only Memory) 52, the DRAM (Dynamic Random Access Memory) 53, the Ethernet interface (Ethernet I/F) 54, the network terminal 55, the remote control reception unit 56, and the remote control transmitter 57.

The high-speed data line interface 32A is an interface for bidirectional communication using a specific line constituting the HDMI cable 1, similarly to the high-speed data line interface 28A of the video camera recorder 10A described above. The high-speed data line interface 32A is inserted between the Ethernet interface 54 and the HDMI terminal 31. The high-speed data line interface 32A transmits, via the HDMI terminal 31 through the HDMI cable 1 to an opposite device, transmission data supplied via the Ethernet interface 54 from the CPU 51. In addition, the high-speed data line interface 32A supplies, via the Ethernet interface 54 to the CPU 51, reception data received via the HDMI terminal 31 through the HDMI cable 1 from the opposite device. The details of the high-speed data line interface 32A will be described later.

Although a detailed description will be omitted, other configuration and operation of the television receiver 30A shown in FIG. 18 are similar to those of the television receiver 30 shown in FIG. 3 described above.

Figure 19:
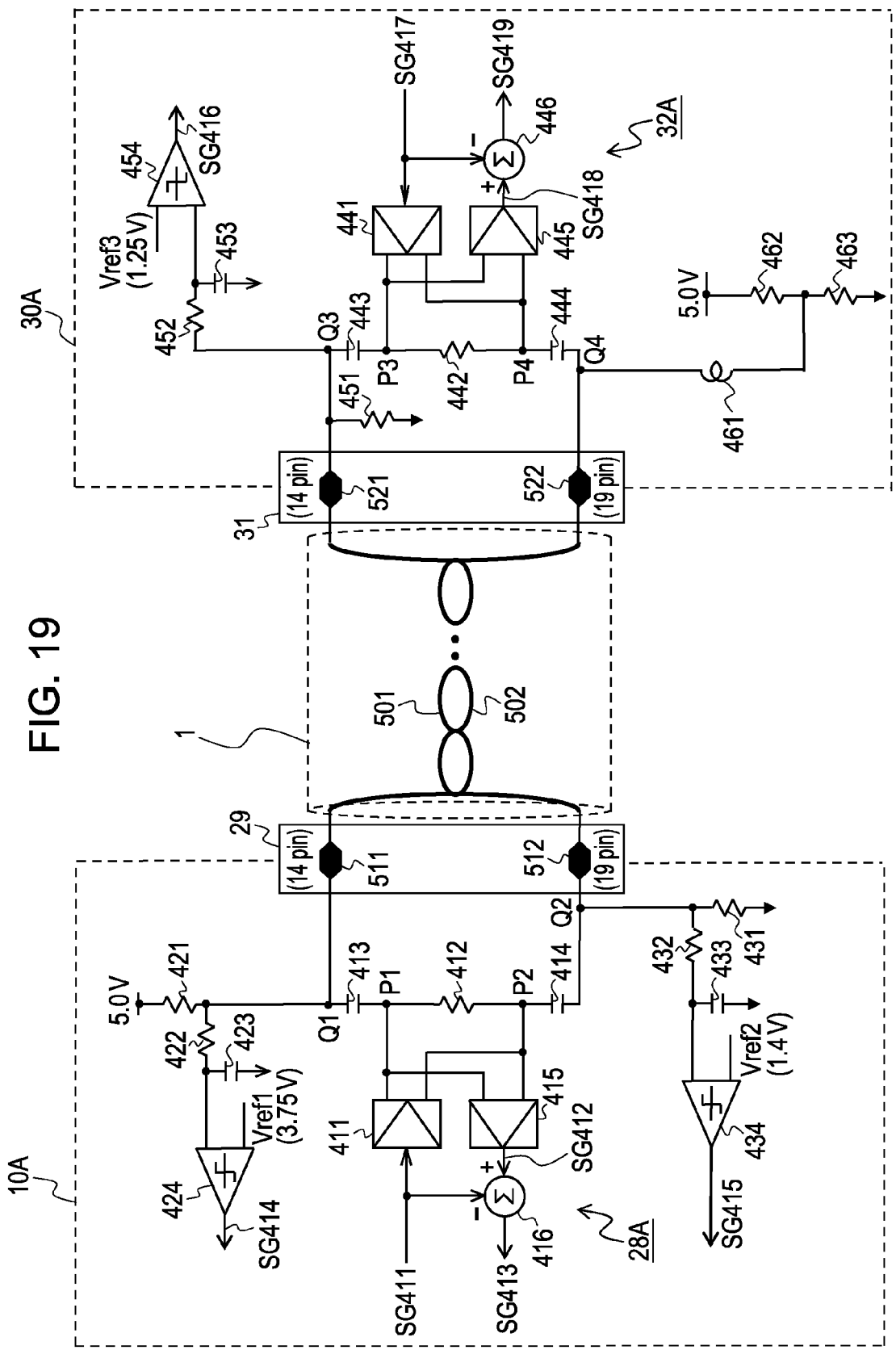
FIG. 19 is a connection diagram showing an example of the configuration of high-speed data line interfaces of the video camera recorder and the television receiver.

FIG. 19 shows an example of the configurations of the high-speed data line interface 28A of the video camera recorder 10A and the high-speed data line interface 32A of the television receiver 30A in the AV system 5A of FIG. 16. The interfaces 28A and 32A constitute communication units which perform LAN (Local Area Network) communications. The communication units perform communications by using, among a plurality of lines constituting the HDMI cable 1, a pair of differential lines, in this embodiment, a reserved line (Ether– line) corresponding to an empty (Reserve) pin (14-pin) and an HPD line (Ether+ line) corresponding to an HPD pin (19-pin).

The video camera recorder 10A includes a LAN signal transmission circuit 411, a terminating resistor 412, AC coupling capacitors 413 and 414, a LAN signal reception circuit 415, a subtracting circuit 416, a pull-up resistor 421, a resistor 422 and a capacitor 423 constituting a low-pass filter, a comparator 424, a pull-down resistor 431, a resistor 432 and a capacitor 433 forming a low-pass filter, and a comparator 434. Here, the high-speed data line interface 28A is constituted by the LAN signal transmission circuit 411, the terminating resistor 412, the AC coupling capacitors 413 and 414, the LAN signal reception circuit 415, and the subtracting circuit 416.

A series circuit of the pull-up resistor 421, the AC coupling capacitor 413, the terminating resistor 412, the AC coupling capacitor 414, and the pull-down resistor 431 is connected between a power supply line (+5.0 V) and a ground wire. A connection point P1 between the AC coupling capacitor 413 and the terminating resistor 412 is connected to a positive output side of the LAN signal transmission circuit 411 and connected to a positive input side of the LAN signal reception circuit 415. In addition, a connection point P2 between the AC coupling capacitor 414 and the terminating resistor 412 is connected to a negative output side of the LAN signal transmission circuit 411 and connected to a negative input side of the LAN signal reception circuit 415. A transmission signal (transmission data) SG411 is supplied from the CPU 20 to an input side of the LAN signal transmission circuit 411.

In addition, an output signal SG412 of the LAN signal reception circuit 415 is supplied to a positive-side terminal of the subtracting circuit 416, and the transmission signal (transmission data) SG411 is supplied from the CPU 20 to a negative-side terminal of the subtracting circuit 416. In the subtracting circuit 416, the transmission signal SG411 is subtracted from the output signal SG412 of the LAN signal reception circuit 415, and a reception signal (reception data) SG413 is obtained. The reception signal SG413 is supplied to the CPU 20.

In addition, a connection point Q1 between the pull-up resistor 421 and the AC coupling capacitor 413 is connected to a ground wire through a series circuit of the resistor 422 and the capacitor 423. An output signal of the low-pass filter obtained at a connection point between the resistor 422 and the capacitor 423 is supplied to one input terminal of the comparator 424. In the comparator 424, the output signal of the low-pass filter is compared with a reference voltage Vref1 (+3.75 V) supplied to the other input terminal. An output signal SG414 of the comparator 424 is supplied to the CPU 20.

In addition, a connection point Q2 between the AC coupling capacitor 414 and the pull-down resistor 431 is connected to a ground wire through a series circuit of the resistor 432 and the capacitor 433. An output signal of the low-pass filter obtained at a connection point between the resistor 432 and the capacitor 433 is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to the CPU 20.

The television receiver 30A includes a LAN signal transmission circuit 441, a terminating resistor 442, AC coupling capacitors 443 and 444, a LAN signal reception circuit 445, a subtracting circuit 446, a pull-down resistor 451, a resistor 452 and a capacitor 453 constituting a low-pass filter, a comparator 454, a choke coil 461, a resistor 462, and a resistor 463. Here, the high-speed data line interface 32A is constituted by the LAN signal transmission circuit 441, the terminating resistor 442, the AC coupling capacitors 443 and 444, the LAN signal reception circuit 445, and the subtracting circuit 446.

A series circuit of the resistor 462 and the resistor 463 is connected between a power supply line (+5.0 V) and a ground wire. A series circuit of the choke coil 461, the AC coupling capacitor 444, the terminating resistor 442, the AC coupling capacitor 443, and the pull-down resistor 451 is connected between a connection point between the resistor 462 and the resistor 463, and a ground wire.

A connection point P3 between the AC coupling capacitor 443 and the terminating resistor 442 is connected to a positive output side of the LAN signal transmission circuit 441 and connected to a positive input side of the LAN signal reception circuit 445. In addition, a connection point P4 between the AC coupling capacitor 444 and the terminating resistor 442 is connected to a negative output side of the LAN signal transmission circuit 441 and connected to a negative input side of the LAN signal reception circuit 445. A transmission signal (transmission data) SG417 is supplied from the Ethernet interface 54 to an input side of the LAN signal transmission circuit 441.

In addition, an output signal SG418 of the LAN signal reception circuit 445 is supplied to a positive-side terminal of the subtracting circuit 446, and a transmission signal SG417 is supplied from the Ethernet interface 54 to a negative-side terminal of the subtracting circuit 446. In the subtracting circuit 446, the transmission signal SG417 is subtracted from the output signal SG418 of the LAN signal reception circuit 445, and a reception signal (reception data) SG419 is obtained. The reception signal (reception data) SG419 is supplied to the Ethernet interface 54.

In addition, a connection point Q3 between the pull-down resistor 451 and the AC coupling capacitor 443 is connected to a ground wire through a series circuit of the resistor 452 and the capacitor 453. An output signal of the low-pass filter obtained at a connection point between the resistor 452 and the capacitor 453 is supplied to one input terminal of the comparator 454. In the comparator 454, the output signal of the low-pass filter is compared with a reference voltage Vref3 (+1.25 V) supplied to the other input terminal. An output signal SG416 of the comparator 454 is supplied to the CPU 51 (not illustrated).

A reserved line 501 and an HPD line 502 contained in the HDMI cable 1 constitute a differential twisted pair. A source-side end S11 of the reserved line 501 is connected to a 14-pin of the HDMI terminal 29, and a sink-side end 521 of the reserved line 501 is connected to a 14-pin of the HDMI terminal 31. In addition, a source-side end 512 of the HPD line 502 is connected to a 19-pin of the HDMI terminal 29, and a sink-side end 522 of the HPD line 502 is connected to a 19-pin of the HDMI terminal 31.

In the video camera recorder 10A, the connection point Q1 between the pull-up resistor 421 and the AC coupling capacitor 413 described above is connected to the 14-pin of the HDMI terminal 29. In addition, the connection point Q2 between the pull-down resistor 431 and the AC coupling capacitor 414 described above is connected to the 19-pin of the HDMI terminal 29. Meanwhile, in the television receiver 30A, the connection point Q3 between the pull-down resistor 451 and the AC coupling capacitor 443 described above is connected to the 14-pin of the HDMI terminal 31. In addition, the connection point Q4 between the choke coil 461 and the AC coupling capacitor 444 described above is connected to the 19-pin of the HDMI terminal 31.

Next, the operation of LAN communication by the high-speed data line interfaces 28A and 32A configured as described above will be explained.

In the video camera recorder 10A, the transmission signal (transmission data) SG411 output from the system control CPU 20 is supplied to the input side of the LAN signal transmission circuit 411, and a differential signal (a positive output signal and a negative output signal) corresponding to the transmission signal SG411 is output from the LAN signal transmission circuit 411. The differential signal output from the LAN signal transmission circuit 411 is supplied to the connection points P1 and P2, and transmitted, through a pair of lines (the reserved line 501 and the HPD line 502) of the HDMI cable 1, to the television receiver 30A.

In addition, in the television receiver 30A, the transmission signal (transmission data) SG417 output from the CPU 51 through the Ethernet interface 54 is supplied to the input side of the LAN signal transmission circuit 441, and a differential signal (a positive output signal and a negative output signal) corresponding to the transmission signal SG417 is output from the LAN signal transmission circuit 441. The differential signal output from the LAN signal transmission circuit 441 is supplied to the connection points P3 and P4, and transmitted, through a pair of lines (the reserved line 501 and the HPD line 502) of the HDMI cable 1, to the video camera recorder 10A.

In addition, in the video camera recorder 10A, since the input side of the LAN signal reception circuit 415 is connected to the connection points P1 and P2, an addition signal obtained by adding a transmission signal corresponding to the differential signal (current signal) output from the LAN signal transmission circuit 411 to a reception signal corresponding to the differential signal transmitted from the television receiver 30A as described above is obtained as the output signal SG412 of the LAN signal reception circuit 415. In the subtracting circuit 416, the transmission signal SG411 is subtracted from the output signal SG412 of the LAN signal reception circuit 415. Hence, the output signal SG413 of the subtracting circuit 416 corresponds to the transmission signal (transmission data) SG417 of the television receiver 30A.

In addition, in the television receiver 30A, since the input side of the LAN signal reception circuit 445 is connected to the connection points P3 and P4, an addition signal obtained by adding a transmission signal corresponding to the differential signal (current signal) output from the LAN signal transmission circuit 441 to a reception signal corresponding to the differential signal transmitted from the video camera recorder 10A as described above is obtained as the output signal SG418 of the LAN signal reception circuit 445. In the subtracting circuit 446, the transmission signal SG417 is subtracted from the output signal SG418 of the LAN signal reception circuit 445. Hence, the output signal SG419 of the subtracting circuit 446 corresponds to the transmission signal (transmission data) SG411 of the video camera recorder 10A.

As described above, bidirectional LAN communication can be performed between the high-speed data line interface 28A of the video camera recorder 10A and the high-speed data line interface 32A of the television receiver 30A.

According to the configuration example shown in FIG. 19, in the interface implementing transmission of video and audio data, exchange and authentication of connected device information, communication of device control data, and LAN communication by using a single HDMI cable 1, since LAN communication is performed as bidirectional communication through a pair of differential transmission paths and notification of the connection state of the interface is issued in accordance with the DC bias potential of at least one of the transmission paths, spatial separation in which neither an SCL line nor an SDA line are physically used for LAN communication can be attained. As a result, due to such division, a circuit for LAN communication can be formed independent of the electrical specification defined for DDC. Thus, stable and reliable LAN communications can be realized with low cost.

In addition, in FIG. 19, apart from LAN communication described above, the fact that the HDMI cable 1 is connected to the television receiver 30A is transmitted through the HPD line 502 to the video camera recorder 10A, in accordance with a DC bias level. That is, when the HDMI cable 1 is connected to the television receiver 30A, the resistors 462 and 463 and the choke coil 461 in the television receiver 30A cause the HPD line 502 to be biased at about 4 V through the 19-pin of the HDMI terminal 31. The video camera recorder 10A extracts the DC bias of the HPD line 502 by using the low-pass filter formed by the resistor 432 and the capacitor 433, and compares, by using the comparator 434, the DC bias with the reference voltage Vref2 (for example, 1.4 V).

Since the pull-down resistor 431 exists, when the HDMI cable 1 is not connected to the television receiver 30A, the voltage of the 19-pin of the HDMI terminal 29 is lower than the reference voltage Vref2. Meanwhile, when the HDMI cable 1 is connected to the television receiver 30A, the voltage of the 19-pin is higher than the reference voltage Vref2. Hence, when the HDMI cable 1 is connected to the television receiver 30A, the output signal SG415 of the comparator 434 is at high level. Meanwhile, when the HDMI cable 1 is not connected to the television receiver 30A, the output signal SG415 is at low level. Accordingly, the CPU 20 of the video camera recorder 10A is capable of identifying, in accordance with the output signal SG415 of the comparator 434, whether or not the HDMI cable 1 is connected to the television receiver 30A.

In addition, in FIG. 19, a function of mutually identifying, in accordance with the DC bias potential of the reserved line 501, whether devices connected at ends of the HDMI cable 1 are devices that are capable of performing LAN communication (hereinafter, referred to as "e-HDMI compatible devices") or devices that are not capable of performing LAN communication (hereinafter, referred to as "e-HDMI incompatible devices"), is provided.

As described above, the video camera recorder 10A pulls up (+5V), by using the resistor 421, the reserved line 501, and the television receiver 30A pulls down, by using the pull-down resistor 451, the reserved line 501. The resistors 421 and 451 do not exist in e-HDMI incompatible devices.

The video camera recorder 10A compares, as described above, by using the comparator 424, the DC potential of the reserved line 501 passing through the low-pass filter constituted by the resistor 422 and the capacitor 423 with the reference voltage Vref1. In a case where the television receiver 30A is an e-HDMI compatible device and the pull-down resistor 451 exists, the voltage of the reserved line 501 is 2.5 V. However, in a case where the television receiver 30A is an e-HDMI incompatible device and the pull-down resistor 451 does not exist, the voltage of the reserved line 501 is 5 V, due to the presence of the pull-up resistor 421.

Thus, by setting the reference voltage Vref1 to, for example, 3.75 V, the output signal SG414 of the comparator 424 is at low level in a case where the television receiver 30A is an e-HDMI compatible device, whereas the output signal SG414 is at high level in a case where the television receiver 30A is not an e-HDMI compatible device. Accordingly, the CPU 20 of the video camera recorder 10A is capable of identifying, in accordance with the output signal SG414 of the comparator 424, whether or not the television receiver 30A is an e-HDMI compatible device.

Similarly, the television receiver 30A compares, as described above, by using the comparator 454, the DC potential of the reserved line 501 passing through the low-pass filter constituted by the resistor 452 and the capacitor 453 with the reference voltage Vref3. In a case where the video camera recorder 10A is an e-HDMI compatible device and the pull-up resistor 421 exists, the voltage of the reserved line 501 is 2.5 V. However, in a case where the video camera recorder 10A is an e-HDMI incompatible device and the pull-up resistor 421 does not exist, the voltage of the reserved line 501 is 0 V, due to the presence of the pull-down resistor 451.

Thus, by setting the reference voltage Vref3 to, for example, 1.25 V, the output signal SG416 of the comparator 454 is at high level in a case where the video camera recorder 10A is an e-HDMI compatible device, whereas the output signal SG416 is at low level in a case where the video camera recorder 10A is not an e-HDMI compatible device. Accordingly, the CPU 51 of the television receiver 30A is capable of identifying, in accordance with the output signal SG416 of the comparator 454, whether or not the video camera recorder 10A is an e-HDMI compatible device.

Note that the pull-up resistor 421 shown in FIG. 19 may be provided in the HDMI cable 1, instead of being provided in the video camera recorder 10A. In such a case, individual terminals of the pull-up resistor 421 are connected to, among lines provided in the HDMI cable 1, the reserved line 501 and a line (signal line) connected to a power source (power supply potential).

Furthermore, the pull-down resistor 451 and the resistor 463 shown in FIG. 19 may be provided in the HDMI cable 1, instead of being provided in the television receiver 30A. In such a case, individual terminals of the pull-down resistor 451 are connected to, among lines provided in the HDMI cable 1, the reserved line 501 and a line (ground wire) connected to the ground (reference potential). In addition, individual terminals of the resistor 463 are connected to, among lines provided in the HDMI cable 1, the HPD line 502 and a line (ground wire) connected to the ground (reference potential).

Figure 20:
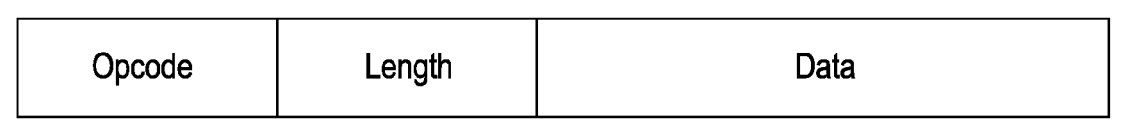

FIG. 20 shows an example of the data structure of a control command transmitted through the high-speed data line described above. With the high-speed data line, control can be performed for any data structure. However, it is desirable to have a data structure conforming to IP (Internet Protocol), which has been the standards for network communications in recent years. To this end, the control command shown in FIG. 20 is configured so as to meet the data structure of a payload part of an IP packet. That is, a control command is constituted of "Opcode" representing a control command, "Length" representing the entire length of data, and "Data", which is data itself.

FIG. 21 shows the definitions of control commands and transmission additional information used for a control sequence in this embodiment described later. A "Request Contents List" command indicates a command for issuing a request for a contents list, the command being transmitted from the television receiver (sink device) 30A to the video camera recorder (source device) 10A. In a case where additional information to be transmitted exists relative to the "Request Contents List" command, a "Thumb Nail" command is transmitted from the video camera recorder (source device) 10A to the television receiver (sink device) 30A.

As the "Thumb Nail" command, the ID number of Thumb Nail and additional information (a contents list and thumbnail data) are transmitted as a data portion. A "Play Content" command issues an instruction to play back a piece of content selected by the user, and the number of the piece of content is transmitted as a data portion. A "Select Input" command is a command for switching to the HDMI terminal 31 to which the video camera recorder (source device) 10A that outputs the piece of content selected by the user is connected, and an HDMI physical address is transmitted as a data portion. The television receiver (sink device) 30A identifies the HDMI terminal in accordance with the transmitted HDMI physical address and the physical address read when HDMI connection is performed, and switching to HDMI input is performed.

Figure 22:
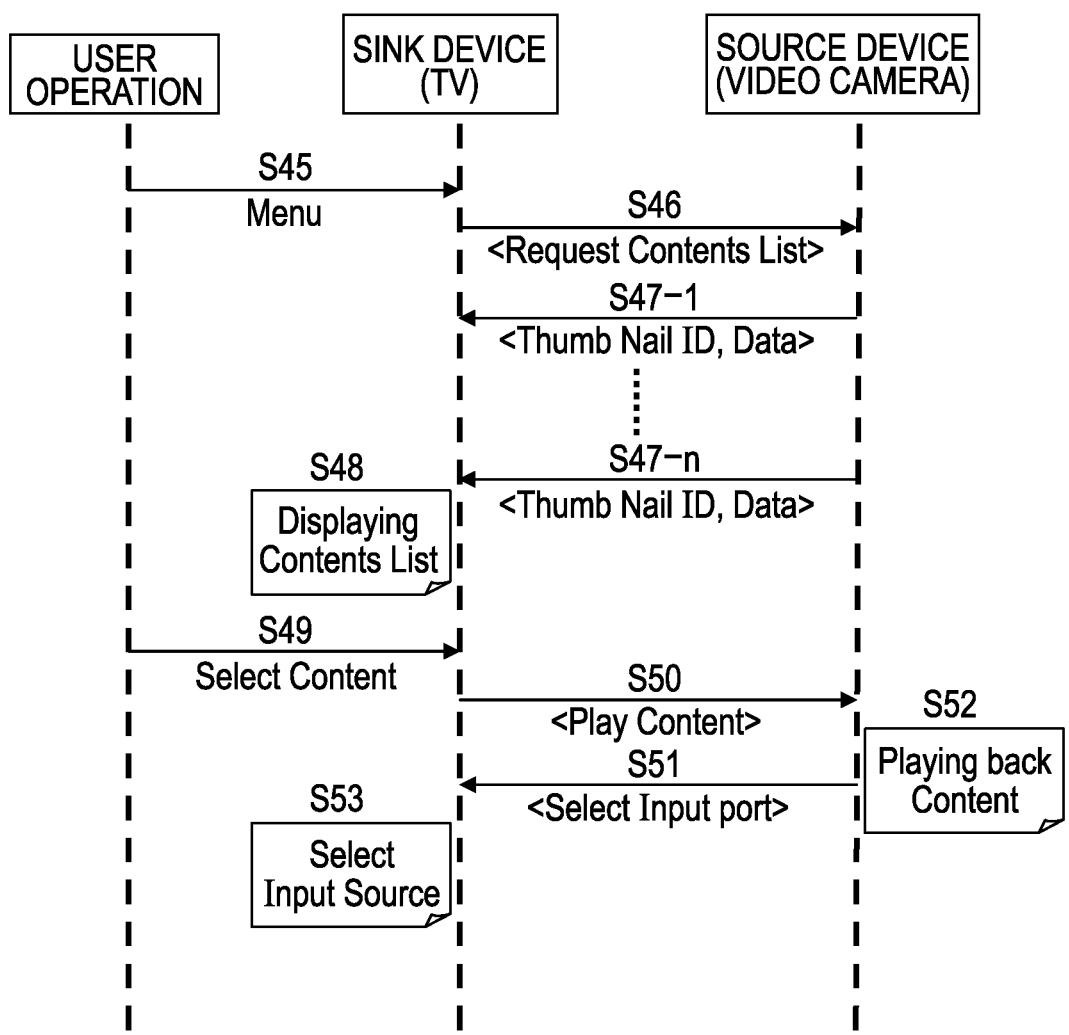
FIG. 22 is a sequence diagram for explaining an example of data transmission performed between an HDMI terminal of the video camera recorder and an HDMI terminal of the television receiver through an HDMI cable.

Next, an example of data transmission performed between the HDMI terminal 29 of the video camera recorder 10A and the HDMI terminal 31 of the television receiver 30A through the HDMI cable 1 in this embodiment will be explained with reference to FIG. 22.

This data transmission example is an example of a case where processing is performed in which the user operates the remote control transmitter 57 (see FIG. 18) on the television receiver 30A side to acquire a list of individual pieces of video content recorded in the recording medium 19 in the video camera recorder 10A, a piece of video content selected by the user in accordance with the display is played back by the video camera recorder 10A, and the video content is displayed on the television receiver 30A.

First, the user operates a key arranged on the remote control transmitter 57 to cause a menu screen to be displayed on the display panel 42 of the television receiver 30A (step S45). This menu screen is generated by the graphic generation circuit 40 under the control of the CPU 51 of the television receiver 30A. When the user performs an operation for acquiring a contents list from a device connected to the HDMI terminal 31 in accordance with the menu screen, the CPU 51 transmits to the video camera recorder 10A, which is the device connected through the HDMI terminal 31, by using the high-speed data line, a "Request Contents List" command for issuing a request to transmit a contents list (step S46).

When the system control CPU 20 of the video camera recorder 10A determines that the "Request Contents List" command has been received, the system control CPU 20 creates, for each piece of video content recorded in the recording medium 19 of the video camera recorder 10A, a "Thumb Nail" command in which a data portion includes the ID number of a thumbnail and additional information (the contents list and thumbnail data), and repeatedly transmits to the television receiver 30A, by using the high-speed data line, the "Thumb Nail" commands (step S47-1 to step S47-$n$).

The CPU 51 of the television receiver 30A stores, in the DRAM 53 or the like, data of the contents list transmitted from the video camera recorder 10A and thumbnail data of individual pieces of video content in the list. Then, the CPU 51 generates, by using the graphic generation circuit 40, a display screen for the contents list in accordance with the contents list and the thumbnail data, and displays the contents list on the display panel 41 (step S48). In this case, display that is similar to the display of the contents list in the television receiver 30 of the AV system 5 of FIG. 1 described above is performed on the display panel 42 of the television receiver 30A (see FIG. 15).

When the user operates the remote control transmitter 57 to select a specific piece of video content from the contents list displayed on the display panel 42 (step S49), the CPU 51 of the television receiver 30A transmits to the video camera recorder 10A, by using the high-speed data line, a "Play Content" command for issuing an instruction to play back video content (step ST50). In the "Play Content" command, a data portion includes the ID number of a thumbnail corresponding to the piece of video content selected by the user.

The system control CPU 20 of the video camera recorder 10A, which has received the "Play Content" command, transmits to the television receiver 30A, by using the high-speed data line, a "Select Input" command (step S51), plays back the corresponding piece of video content from the recording medium 19, outputs data of the played-back video content through the HDMI terminal 29, and transmits the data to the television receiver 30A (step S52). Transmission of the data of the video content is performed by using the transmission channels for video data (TMDS channels #0, #1, and #2).

The television receiver 30A, which has received the "Select Input" command, performs input switching to the HDMI terminal 31 to which the video camera recorder 10A is connected (step S53). Accordingly, the television receiver 30A performs output processing for video (image) and audio data received via the HDMI terminal 31, and performs playback processing for the specific piece of video content selected by the user.

As described above, as in the AV system 5 shown in FIG. 1 described above, in the AV system 5A shown in FIG. 16, only by connecting the video camera recorder 10A and the television receiver 30A through a single HDMI cable 1, a contents list and thumbnail data prepared in the video camera recorder 10A side can be transmitted to the television receiver 30A, and the contents list can be displayed on the television receiver 30 side. Hence, the user is able to understand the details of video content recorded in the recording medium 19 in the video camera recorder 10 without operating the video camera recorder 10A, a necessary piece of video content can be easily played back from the video camera recorder 10A, and display of the played-back video content and the like can be performed.

In addition, in the AV system 5A shown in FIG. 16, by using the high-speed data line constituted of the reserved line (Ether−line) and the HPD line (Ether+ line) forming the HDMI cable 1, transmission of a contents list and thumbnail data from the video camera recorder 10A to the television receiver 30A, moreover, transmission and reception of commands between the video camera recorder 10A and the television receiver 30A are performed.

Thus, for example, in a case where the user issues a request for a contents list from the television receiver 30A side, the television receiver 30A side is capable of immediately receiving the contents list and thumbnail data from the video camera recorder 10A. Thus, display of the contents list can be smoothly performed, and the performance of a selecting operation by the user can be improved.

In addition, for example, in a case where the user has selected a specific piece of video content from the displayed contents list, selection information on the specific piece of video content is immediately supplied to the video camera recorder 10A and the piece of video content corresponding to the selection information is transmitted from the video camera recorder 10A to the television receiver 30A. Thus, the user operation of selecting a piece of video content can be immediately reflected in the image display, and the performance of a user operation can be improved.

Note that although a case where the communication units that perform bidirectional communication are constituted by using the reserved line (Ether− line) and the HPD line (Ether+ line) of the HDMI cable 1 is shown in the AV system 5A shown in FIG. 16, the configuration of the communication units that perform bidirectional communication is not limited to this. Hereinafter, another configuration example will be explained. In the example below, an explanation will be provided in which the video camera recorder 10A serves as a source device and the television receiver 30A serves as a sink device.

Figure 23:
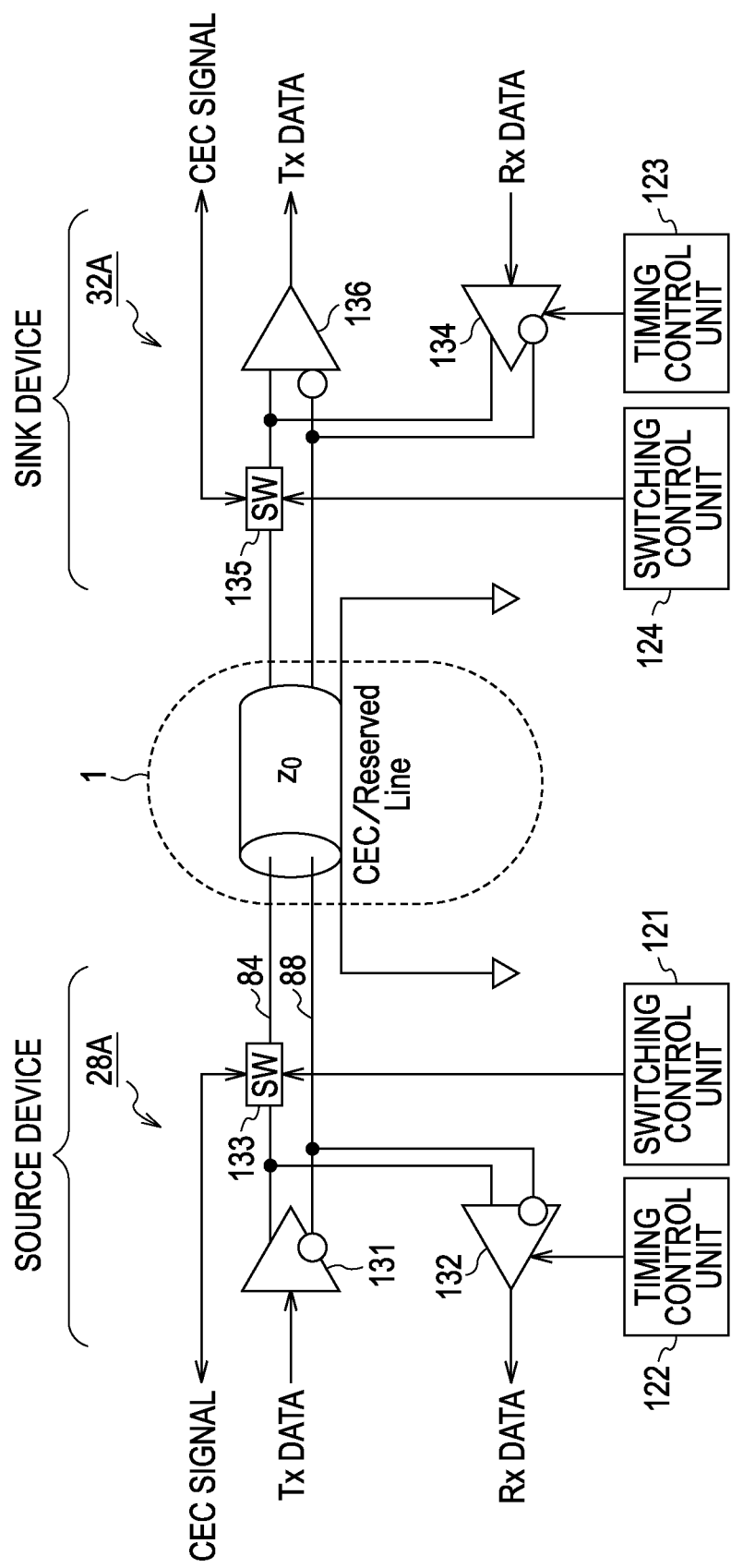
FIG. 23 is a connection diagram showing another example of the configuration of high-speed data line interfaces of the video camera recorder and the television receiver.

FIG. 23 shows an example in which IP communication based on a half-duplex communication method is performed by using the CEC line 84 and the reserved line 88. Note that in FIG. 23, parts corresponding to those in FIG. 4 are denoted by the same signs, and the explanation of those parts will be omitted in an appropriate manner.

The high-speed data line interface 28A of the source device includes a conversion unit 131, a decoding unit 132, a switch 133, a switching control unit 121, and a timing control unit 122. Through bidirectional IP communication between the source device and the sink device, TX data, which is data transmitted from the source device to the sink device, is supplied to the conversion unit 131.

The conversion unit 131 is constituted by, for example, a differential amplifier. The conversion unit 131 converts the supplied Tx data into a differential signal constituted of two partial signals. In addition, the conversion unit 131 transmits, through the CEC line 84 and the reserved line 88 to the sink device, the differential signal obtained by conversion. That is, the conversion unit 131 supplies one partial signal constituting the differential signal obtained by conversion through the CEC line 84, more specifically, a signal line provided in the source device and connected to the CEC line 84 of the HDMI cable 1, to the switch 133. The conversion unit 131 also supplies the other partial signal constituting the differential signal through the reserved line 88, more specifically, a signal line provided in the source device and connected to the reserved line 88 of the HDMI cable 1, and the reserved line 88, to the sink device.

The decoding unit 132 is constituted by, for example, a differential amplifier. Input terminals of the differential amplifier are connected to the CEC line 84 and the reserved line 88. The decoding unit 132 receives, under the control of the timing control unit 122, a differential signal transmitted from the sink device through the CEC line 84 and the reserved line 88, that is, a differential signal constituted of a partial signal on the CEC line 84 and a partial signal on the reserved line 88, decodes the differential signal into Rx data, which is the original data, and outputs the Rx data. Here, the Rx data is data transmitted from the sink device to the source device through bidirectional IP communication between the source device and the sink device.

At a timing of data transmission, a CEC signal from a control unit (CPU) of the source device or a partial signal constituting a differential signal that corresponds to Tx data from the conversion unit 131 is supplied to the switch 133. At a timing of data reception, a CEC signal from the sink device or a partial signal constituting a differential signal that corresponds to Rx data from the sink device is supplied to the switch 133. Under the control of the switching control unit 121, the switch 133 selects the CEC signal from the control unit (CPU), the CEC signal from the sink device, the partial signal constituting the differential signal that corresponds to the Tx data, or the partial signal constituting the differential signal that corresponds to the Rx data, and outputs the selected signal.

That is, at a timing when the source device transmits data to the sink device, the switch 133 selects the CEC signal supplied from the control unit (CPU) or the partial signal supplied from the conversion unit 131, and transmits the selected CEC signal or partial signal through the CEC line 84 to the sink device.

In addition, at a timing when the source device receives data transmitted from the sink device, the switch 133 receives the CEC signal transmitted through the CEC line 84 from the sink device or the partial signal of the differential signal that corresponds to the Rx data, and supplies the received CEC signal or partial signal to the control unit (CPU) or the decoding unit 132.

The switching control unit 121 controls the switch 133 and performs switching of the switch 133 in such a manner that any one of the signals supplied to the switch 133 is selected. The timing control unit 122 controls the timing of reception of a differential signal by the decoding unit 132.

In addition, the high-speed data line interface 32A of the sink device includes a conversion unit 134, a decoding unit 136, a switch 135, a switching control unit 124, and a timing control unit 123. The conversion unit 134 is constituted by, for example, a differential amplifier. Rx data is supplied to the conversion unit 134. Under the control of the timing control unit 123, the conversion unit 134 converts the supplied Rx data into a differential signal constituted of two partial signals, and transmits, through the CEC line 84 and the reserved line 88 to the source device, the differential signal obtained by conversion.

That is, the conversion unit 134 supplies one partial signal constituting the differential signal obtained by conversion through the CEC line 84, more specifically, a signal line provided in the sink device and connected to the CEC line 84 of the HDMI cable 1, to the switch 135. The conversion unit 134 also supplies the other partial signal constituting the differential signal through the reserved line 88, more specifically, a signal line provided in the sink device and connected to the reserved line 88 of the HDMI cable 1, and the reserved line 88, to the source device.

At a timing of data reception, a CEC signal from the source device or a partial signal constituting a differential signal that corresponds to Tx data from the source device is supplied to the switch 135. At a timing of data transmission, a partial signal constituting a differential signal that corresponds to Rx data from the conversion unit 134 or a CEC signal from the control unit (CPU) of the sink device is supplied to the switch 135. Under the control of the switching control unit 124, the switch 135 selects the CEC signal from the source device, the CEC signal from the control unit (CPU), the partial signal constituting the differential signal that corresponds to the Tx data, or the partial signal constituting the differential signal that corresponds to the Rx data, and outputs the selected signal.

That is, at a timing when the sink device transmits data to the source device, the switch 135 selects the CEC signal supplied from the control unit (CPU) of the sink device or the partial signal supplied from the conversion unit 134, and transmits the selected CEC signal or partial signal through the CEC line 84 to the source device.

In addition, at a timing when the sink device receives data transmitted from the source device, the switch 135 receives the CEC signal transmitted through the CEC line from the source device or the partial signal of the differential signal that corresponds to the Tx data, and supplies the received CEC signal or partial signal to the control unit (CPU) or the decoding unit 136.

The decoding unit 136 is constituted by, for example, a differential amplifier. Input terminals of the differential amplifier are connected to the CEC line 84 and the reserved line 88. The decoding unit 136 receives the differential signal transmitted through the CEC line 84 and the reserved line 88 from the source device, that is, the differential signal constituted of the partial signal on the CEC line 84 and the partial signal on the reserved line 88, decodes the differential signal into Tx data, which is the original data, and outputs the Tx data.

The switching control unit 124 controls the switch 135 and performs switching of the switch 135 in such a manner that any one of the signals supplied to the switch 135 is selected. The timing control unit 123 controls the timing of transmission of a differential signal by the conversion unit 134.

Figure 24:
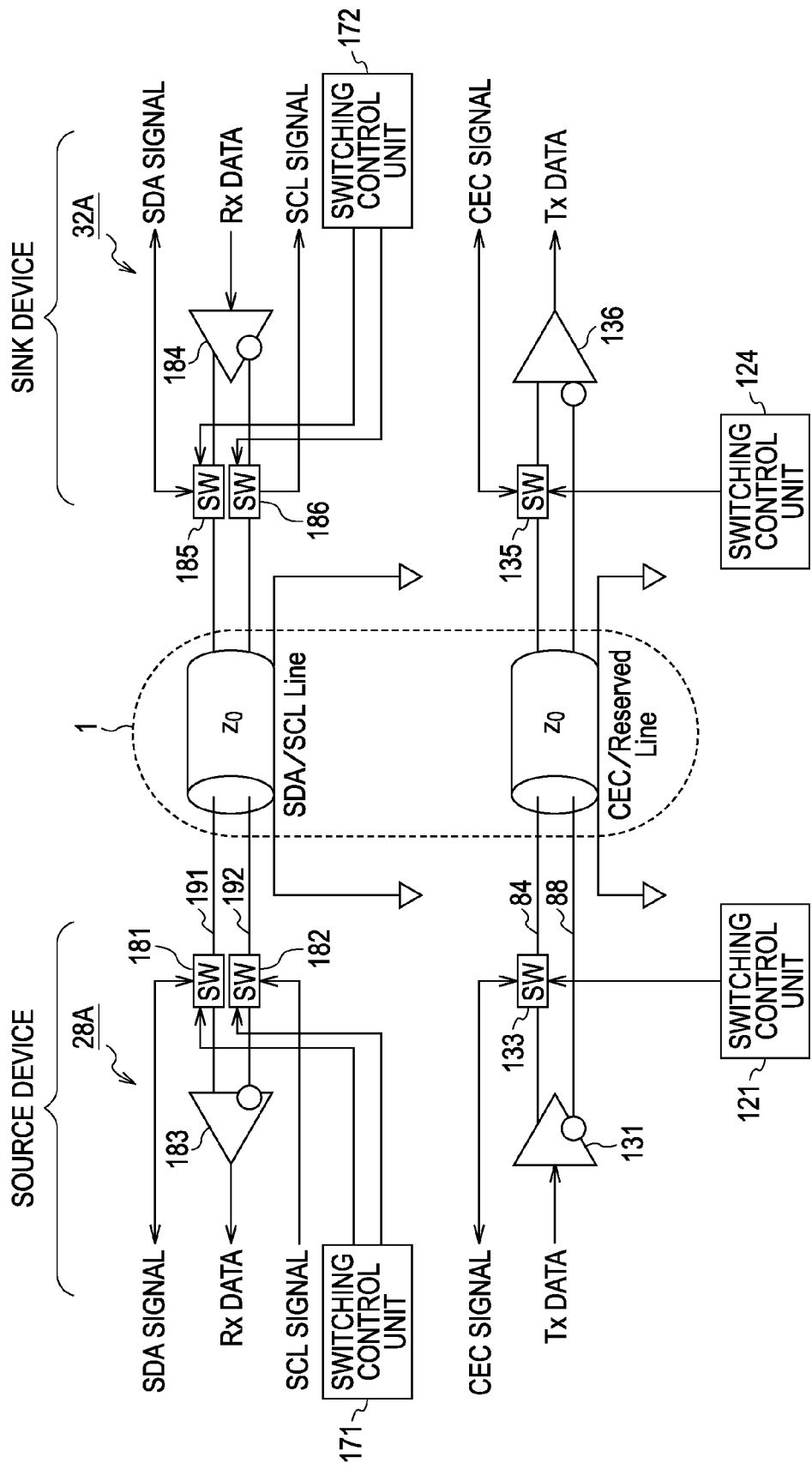
FIG. 24 is a connection diagram showing still another example of the configuration of high-speed data line interfaces of the video camera recorder and the television receiver.

FIG. 24 shows an example in which IP communication based on a full-duplex communication method is performed by using the CEC line 84, the reserved line 88, a signal line (SDA line) through which an SDA signal is transmitted, and a signal line (SCL line) through which an SCL signal is transmitted. Note that in FIG. 24, parts corresponding to those in FIG. 23 are denoted by the same signs, and the explanation of those parts will be omitted in an appropriate manner.

The high-speed data line interface 28A of the source device includes the conversion unit 131, the switch 133, a switch 181, a switch 182, a decoding unit 183, the switching control unit 121, and a switching control unit 171.

At a timing of data transmission, an SDA signal from the control unit (CPU) of the source device is supplied to the switch 181. At a timing of data reception, an SDA signal from the sink device or a partial signal constituting a differential signal that corresponds to Rx data from the sink device is supplied to the switch 181. Under the control of the switching control unit 171, the switch 181 selects the SDA signal from the control unit (CPU), the SDA signal from the sink device, or the partial signal constituting the differential signal that corresponds to the Rx data, and outputs the selected signal.

That is, at a timing when the source device receives data transmitted from the sink device, the switch 181 receives the SDA signal transmitted from the sink device through an SDA line 191, which is a signal line through which an SDA signal is transmitted, or the partial signal of the differential signal that corresponds to the Rx data, and supplies the received SDA signal or partial signal to the control unit (CPU) or the decoding unit 183.

In addition, at a timing when the source device transmits data to the sink device, the switch 181 transmits, through the SDA line 191 to the sink device, the SDA signal supplied from the control unit (CPU), or transmits no signal to the sink device.

At a timing of data transmission, an SCL signal from the control unit (CPU) of the source device is supplied to the switch 182. At a timing of data reception, a partial signal constituting a differential signal that corresponds to Rx data from the sink device is supplied to the switch 182. Under the control of the switching control unit 171, the switch 182 selects the SCL signal or the partial signal constituting the differential signal that corresponds to the Rx data, and outputs the selected signal.

That is, at a timing when the source device receives data transmitted from the sink device, the switch 182 receives the partial signal of the differential signal that corresponds to the Rx data, the partial signal being transmitted from the sink device through an SCL line 192, which is a signal line through which an SCL signal is transmitted, and supplies the received partial signal to the decoding unit 183, or receives no signal.

In addition, at a timing when the source device transmits data to the sink device, the switch 182 transmits, through the SCL line 192 to the sink device, the SCL signal supplied from the control unit (CPU) of the source device, or transmits no signal.

The decoding unit 183 is constituted by, for example, a differential amplifier. Input terminals of the differential amplifier are connected to the SDA line 191 and the SCL line 192. The decoding unit 183 receives the differential signal transmitted from the sink device through the SDA line 191 and the SCL line 192, that is, the differential signal constituted of the partial signal on the SDA line 191 and the partial signal on the SCL line 192, decodes the differential signal into RX data, which is the original data, and outputs the Rx data.

The switching control unit 171 controls the switch 181 and the switch 182 and performs switching of the switch 181 and the switch 182 in such a manner that each of the switch 181 and the switch 182 selects any one of the supplied signals.

In addition, the high-speed data line interface 32A constituting the sink device includes a conversion unit 184, the switch 135, a switch 185, a switch 186, the decoding unit 136, a switching control unit 172, and the switching control unit 124.

The conversion unit 184 is constituted by, for example, a differential amplifier. Rx data is supplied to the conversion unit 184. The conversion unit 184 converts the supplied Rx data into a differential signal constituted of two partial signals, and transmits, through the SDA line 191 and the SCL line 192 to the source device, the differential signal obtained by conversion. That is, the conversion unit 184 transmits, through the switch 185 to the source device, one partial signal constituting the differential signal obtained by conversion, and transmits, through the switch 186 to the source device, the other partial signal constituting the differential signal.

At a timing of data transmission, a partial signal constituting a differential signal that corresponds to Rx data from the conversion unit 184 or an SDA signal from the control unit (CPU) of the sink device is supplied to the switch 185. At a timing of data reception, an SDA signal from the source device is supplied to the switch 185. Under the control of the switching control unit 172, the switch 185 selects the SDA signal from the control unit (CPU), the SDA signal from the source device, or the partial signal constituting the differential signal that corresponds to the Rx data, and outputs the selected signal.

That is, at a timing when the sink device receives data transmitted from the source device, the switch 185 receives the SDA signal transmitted through the SDA line 191 from the source device and supplies the received SDA signal to the control unit (CPU), or receives no signal.

In addition, at a timing when the sink device transmits data to the source device, the switch 185 transmits, through the SDA line 191 to the source device, the SDA signal supplied from the control unit (CPU) or the partial signal supplied from the conversion unit 184.

At a timing of data transmission, a partial signal constituting a differential signal that corresponds to Rx data from the conversion unit 184 is supplied to the switch 186. At a timing of data reception, an SCL signal from the source device is supplied to the switch 186. Under the control of the switching control unit 172, the switch 186 selects the partial signal constituting the differential signal that corresponds to the Rx data or the SCL signal, and outputs the selected signal.

That is, at a timing when the sink device receives data transmitted from the source device, the switch 186 receives the SCL signal transmitted through the SCL line 192 from the source device and supplies the received SCL signal to the control unit (CPU), or receives no signal.

In addition, at a timing when the sink device transmits data to the source device, the switch 186 transmits, through the SCL line 192 to the source device, the partial signal supplied from the conversion unit 184, or transmits no signal.

The switching control unit 172 controls the switch 185 and the switch 186 and performs switching of the switch 185 and the switch 186 in such a manner that each of the switch 185 and the switch 186 selects any one of the supplied signals.

By the way, in a case where a source device and a sink device perform IP communication, determination of whether or not half-duplex communication can be performed and determination of whether or not full-duplex communication can be performed are made in accordance with the configuration of each of the source device and the sink device. Thus, by referring to E-EDID received from the sink device, the source device performs determination of whether to perform half-duplex communication, full-duplex communication, or bidirectional communication based on transmission and reception of a CEC signal.

Figure 25:
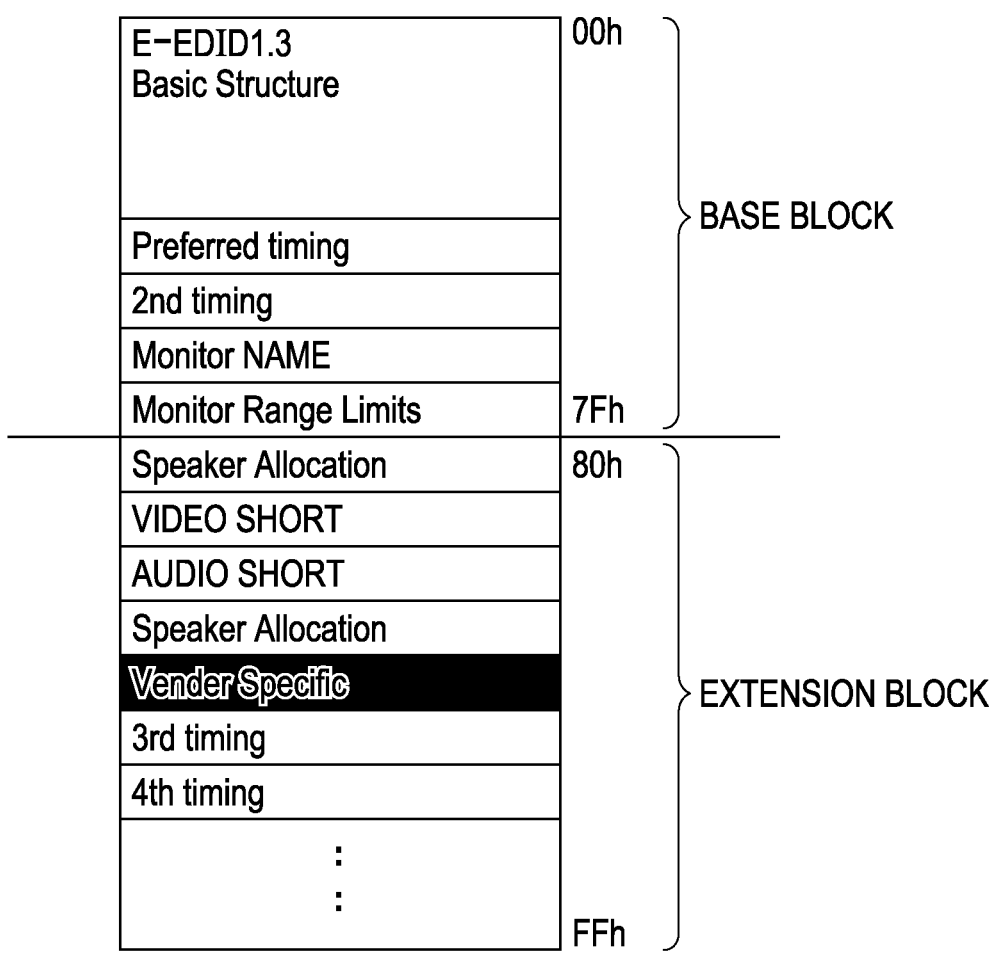
FIG. 25 is an illustration showing the structure of E-EDID received by the source device.

E-EDID received by the source device is constituted by a base block and an extension block, for example, as shown in FIG. 25.

In a first portion of the base block of E-EDID, data defined by the standards for E-EDID1.3 represented as "E-EDID1.3 Basic Structure" is arranged. Then, timing information represented by "Preferred timing" for maintaining the compatibility with conventional EDID and timing information represented by "2nd timing", which is different from "Preferred timing", for maintaining the compatibility with conventional EDID are arranged.

In addition, in the base block, after "2nd timing", information represented by "Monitor NAME" for indicating the name of a display device and information represented by "Monitor Range Limits" for indicating the number of pixels that can be displayed in a case where the aspect ratio is 4:3 and 16:9 are arranged in order.

Meanwhile, in a first portion of the extension block, information represented by "Speaker Allocation" regarding left and right speakers is arranged. Then, data represented by "VIDEO SHORT" describing information on the size of an image that can be displayed, the frame rate, and interlace or progressive, and information on the aspect ratio and the like, data represented by "AUDIO SHORT" describing information on an audio codec method that can be played back, a sampling frequency, a cutoff frequency, the number codec bits, and the like, and information represented by "Speaker Allocation" on left and right speakers are arranged in order.

In addition, in the extension block, after "Speaker Allocation", data represented by "Vender Specific" defined uniquely for each manufacturer, timing information represented by "3rd timing" for maintaining the compatibility with conventional EDID, and timing information represented by "4th timing" for maintaining the compatibility with conventional EDID are arranged.

Furthermore, the data represented by "Vender Specific" has a data structure shown in FIG. 26. That is, in the data represented by "Vender Specific", 0th to Nth blocks, each of which is a 1-byte block, are provided.

In the 0th block placed in the first portion of the data represented by "Vender Specific", a header represented by "Vendor-Specific tag code (=3)" for indicating a data region of the data "Vender Specific" and information represented by "Length (=N)" for indicating the length of the data "Vender Specific" are arranged.

In addition, in the 1st to 3rd blocks, information represented by "24 bit IEEE Registration Identifier (0x000003) LSB first" for indicating the number "0x000003" registered for HDMI(R) is arranged. Furthermore, in the 4th to 5th blocks, information individually represented by "A", "B", "C", and "D" for indicating the 24-bit physical address of the sink device is arranged.

In the 6th block, a flag represented by "Supports-AI" for indicating a function supported by the sink device, information individually represented by "DC-48 bit", "DC-36 bit", and "DC-30 bit" for specifying the number of bits per pixel, a flag represented by "DC-Y444" for indicating whether or not the sink device supports transmission of an image of YCbCr4:4:4, and a flag represented by "DVI-Dual" for indicating whether or not the sink device supports dual DVI (Digital Visual Interface) are arranged.

In addition, in the 7th block, information represented by "Max-TMDS-Clock" for indicating the maximum frequency of a pixel clock of TMDS is arranged. Furthermore, in the 8th block, a flag represented by "Latency" for indicating the presence or absence of video and audio delay information, a full-duplex flag represented by "Full Duplex" for indicating whether or not full-duplex communication can be performed, and a half-duplex flag represented by "Half Duplex" for indicating whether or not half-duplex communication can be performed are arranged.

performing full-duplex communication, that is, the sink device has the configuration shown in FIG. 24. A reset full-duplex flag (for example, set to "0") indicates that the sink device does not have a function of performing full-duplex communication.

Similarly, a set half-duplex flag (for example, set to "1") indicates that the sink device has a function of performing half-duplex communication, that is, the sink device has the configuration shown in FIG. 23. A reset half-duplex flag (for example, set to "0") indicates that the sink device does not have a function of performing half-duplex communication.

Here, for example, a set full-duplex flag (for example, set to "1") indicates that the sink device has a function of In addition, in the 9th block of the data represented by "Vender Specific", delay time data of progressive video represented by "Video Latency" is arranged. In the 10th block, delay time data of audio associated with progressive video represented by "Audio Latency" is arranged. Furthermore, in the 11th block, delay time data of interlaced video represented by "interlaced Video Latency" is arranged. In the 12th block, delay time data of audio associated with interlaced video represented by "Interlaced Audio Latency" is arranged.

The source device performs determination of whether to perform half-duplex communication, full-duplex communication, or bidirectional communication based on transmission and reception of a CEC signal, in accordance with the full-duplex flag and the half-duplex flag contained in E-EDID received from the sink device. Then, in accordance with the determination result, the source device performs bidirectional communication with the sink device.

For example, in a case where the source device has the configuration shown in FIG. 23, the source device is capable of performing half-duplex communication with the sink device shown in FIG. 23, whereas the source device is not capable of performing half-duplex communication with the sink device shown in FIG. 24. Thus, when the power of a source device is turned on, the source device starts a communication process, and performs bidirectional communication corresponding to a function of a sink device connected to the source device.

Figure 27:
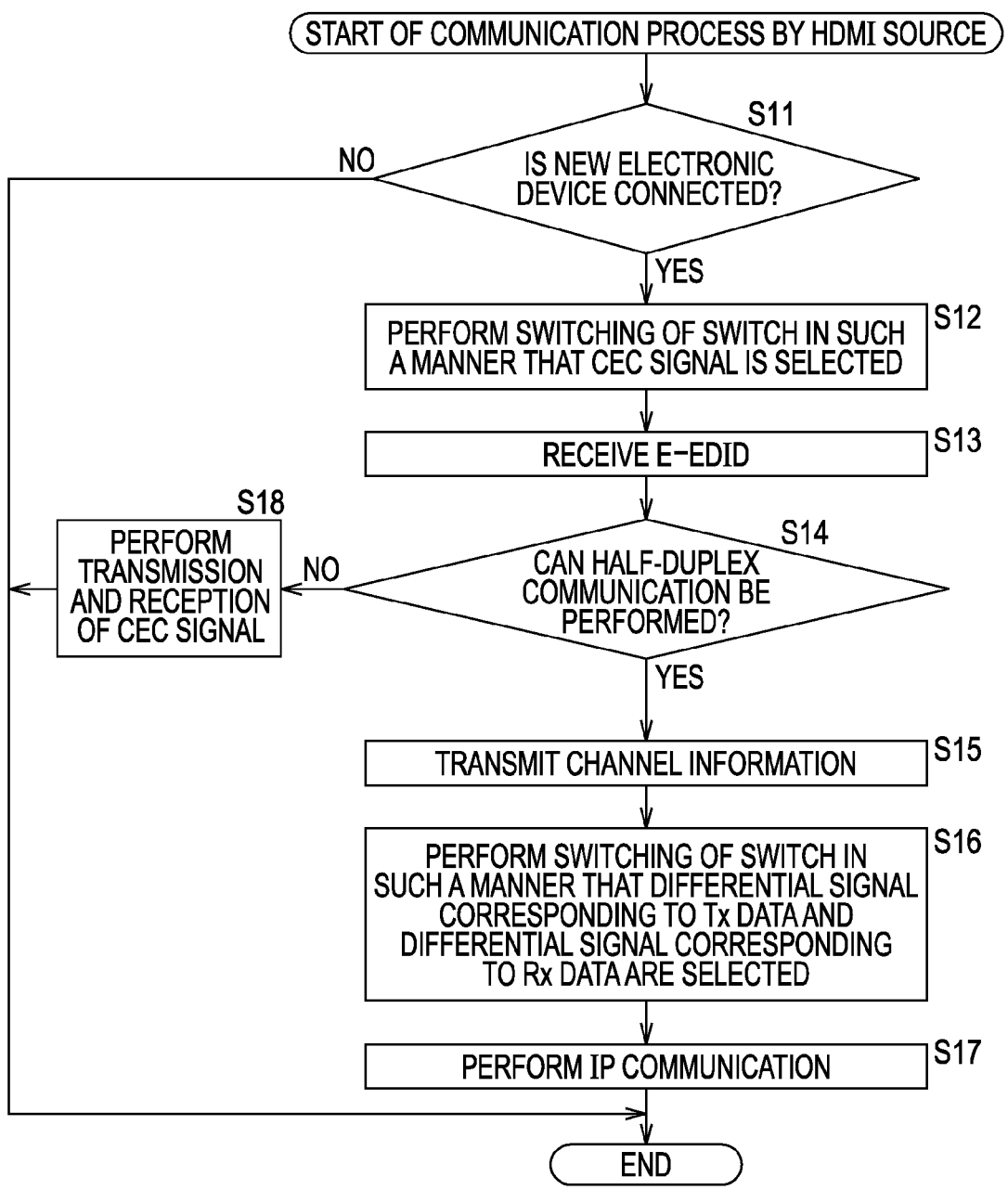
FIG. 27 is a flowchart for explaining a communication process by the source device.

Hereinafter, a communication process by the source device shown in FIG. 23 will be explained with reference to a flowchart of FIG. 27.

In step S11, the source device determines whether or not a new electronic device is connected to the source device. For example, the source device determines, in accordance with the magnitude of a voltage applied to a pin called Hot Plug Detect to which the HPD line 86 is connected, whether or not a new electronic device (sink device) is connected.

In a case where it is determined in step S11 that a new electronic device is not connected, since communication is not performed, the communication process ends. Meanwhile, in a case where it is determined in step S11 that a new electronic device is connected, the switching control unit 121 controls the switch 133 and performs switching of the switch 133 in such a manner that a CEC signal from the control unit (CPU) of the source device is selected at the time of data transmission and that a CEC signal from the sink device is selected at the time of data reception, in step S12.

In step S13, the source device receives E-EDID transmitted through the DDC 83 from the sink device. That is, when detecting connection of the source device, the sink device reads E-EDID from the EDID ROM 85, and transmits the read E-EDID through the DDC 83 to the source device. Accordingly, the source device receives the E-EDID transmitted from the sink device.

In step S14, the source device determines whether or not half-duplex communication with the sink device can be performed. That is, by referring to the E-EDID received from the sink device, the source device determines whether or not the half-duplex flag "Half Duplex" shown in FIG. 26 is set. For example, in a case where the half-duplex flag is set, the source device determines that bidirectional IP communication based on the half-duplex communication method, that is, half-duplex communication, can be performed.

In a case where it is determined in step S14 that half-duplex communication can be performed, the source device transmits, through the switch 133 and the CEC line 84 to the sink device, a signal indicating that IP communication based on the half-duplex communication method using the CEC line 84 and the reserved line 88 will be performed, as channel information indicating channels to be used for bidirectional communication, in step S15.

That is, in a case where the half-duplex flag is set, the source device understands that the sink device has the configuration shown in FIG. 23 and is capable of performing half-duplex communication using the CEC line 84 and the reserved line 88. Thus, the source device transmits channel information to the sink device and notifies the sink device that half-duplex communication will be performed.

In step S16, the switching control unit 121 controls the switch 133 and performs switching of the switch 133 in such a manner that a differential signal corresponding to Tx data from the conversion unit 131 is selected at the time of data transmission and that a differential signal corresponding to Rx data from the sink device is selected at the time of data reception.

In step S17, each unit of the source device performs bidirectional IP communication with the sink device in accordance with the half-duplex communication method. Then, the communication process ends. That is, at the time of data transmission, the conversion unit 131 converts Tx data supplied from the control unit (CPU) into a differential signal, supplies one partial signal constituting the differential signal obtained by conversion to the switch 133, and supplies the other partial signal through the reserved line 88 to the sink device. The switch 133 transmits, through the CEC line 84 to the sink device, the partial signal supplied from the conversion unit 131. Accordingly, the differential signal corresponding to the Tx data is transmitted from the source device to the sink device.

In addition, at the time of data reception, the decoding unit 132 receives a differential signal corresponding to Rx data transmitted from the sink device. That is, the switch 133 receives a partial signal of the differential signal that corresponds to the Rx data, the partial signal being transmitted through the CEC line 84 from the sink device, and supplies the received partial signal to the decoding unit 132. Under the control of the timing control unit 122, the decoding unit 132 decodes the differential signal constituted of the partial signal supplied from the switch 133 and the partial signal supplied through the reserved line 88 from the sink device into Rx data, which is the original data, and outputs the Rx data to the control unit (CPU).

Accordingly, the source device transmits and receives various data, such as control data, pixel data, and audio data, to and from the sink device.

Meanwhile, in a case where it is determined in step S14 that half-duplex communication cannot be performed, the source device performs bidirectional communication with the sink device by performing transmission and reception of a CEC signal, in step S18. Then, the communication process ends. That is, the source device performs transmission and reception of control data to and from the sink device by transmitting a CEC signal through the switch 133 and the CEC line 84 to the sink device at the time of data transmission and by receiving a CEC signal transmitted through the switch 133 and the CEC line 84 from the sink device at the time of data reception.

Accordingly, the source device refers to the half-duplex flag, and performs half-duplex communication with the sink device that is capable of performing half-duplex communication by using the CEC line 84 and the reserved line 88.

As described above, since switching of the switch 133 is performed in such a manner that data to be transmitted and data to be received are selected, and half-duplex communication, that is, IP communication based on the half-duplex communication method, with the sink device is performed by using the CEC line 84 and the reserved line, high-speed bidirectional communication can be performed while the compatibility with conventional HDMI is maintained.

In addition, as in the source device, when the power of the sink device is turned on, the sink device starts a communication process and performs bidirectional communication with the source device.

Figure 28:
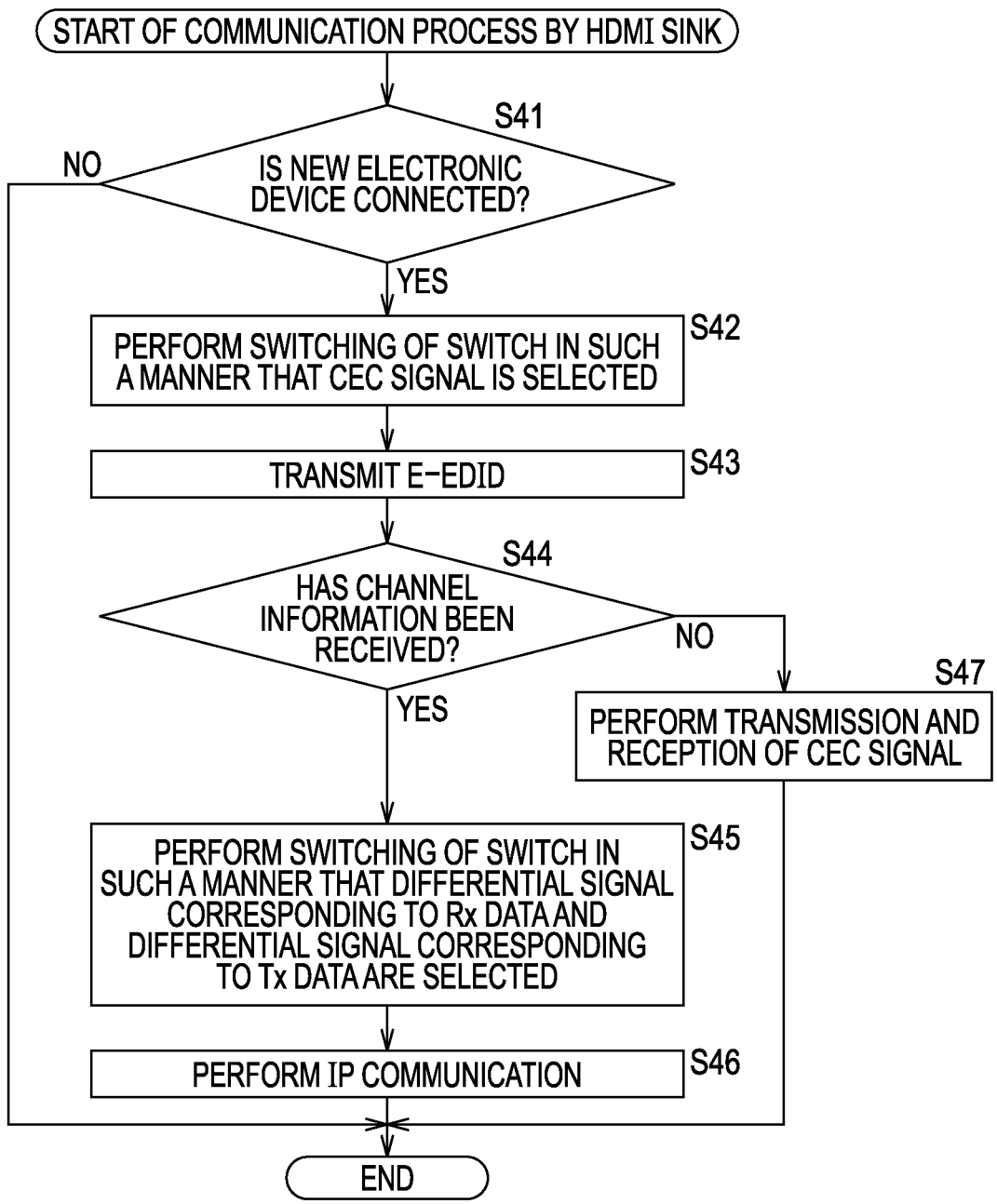
FIG. 28 is a flowchart for explaining a communication process by the sink device.

Hereinafter, a communication process by the sink device shown in FIG. 23 will be explained with reference to a flowchart of FIG. 28.

In step S41, the sink device determines whether or not a new electronic device (source device) is connected to the sink device. For example, the sink device determines, in accordance with the magnitude of a voltage applied to a pin called Hot Plug Detect to which the HPD line 86 is connected, whether or not a new electronic device is connected.

In a case where it is determined in step S41 that a new electronic device is not connected, since communication is not performed, the communication process ends. Meanwhile, in a case where it is determined in step S41 that a new electronic device is connected, the switching control unit 124 controls the switch 135 and performs switching of the switch 135 in such a manner that a CEC signal from the control unit (CPU) of the sink device is selected at the time of data transmission and that a CEC signal from the source device is selected at the time of data reception, in step S42.

In step S43, the sink device reads E-EDID from the EDID ROM 85, and transmits the read E-EDID through the DDC 83 to the source device.

In step S44, the sink device determines whether or not channel information transmitted from the source device has been received.

That is, channel information indicating channels for bidirectional communication is transmitted from the source device in accordance with functions of the source device and the sink device. For example, in a case where the source device is configured as shown in FIG. 23, the source device and the sink device are capable of performing half-duplex communication using the CEC line 84 and the reserved line 88. Thus, channel information indicating that IP communication using the CEC line 84 and the reserved line 88 will be performed is transmitted from the source device to the sink device. The sink device receives the channel information transmitted through the switch 135 and the CEC line 84 from the source device, and determines that channel information has been received.

Meanwhile, in a case where the source device does not have a function of performing half-duplex communication, since channel information is not transmitted from the source device to the sink device, the sink device determines that channel information has not been received.

In a case where it is determined in step S44 that channel information has been received, the process proceeds to step S45. The switching control unit 124 controls the switch 135 and performs switching of the switch 135 in such a manner that a differential signal corresponding to Rx data from the conversion unit 134 is selected at the time of data transmission and that a differential signal corresponding to Tx data from the source device is selected at the time of data reception.

In step S46, the sink device performs bidirectional IP communication with the source device in accordance with the half-duplex communication method. Then, the communication process ends. That is, under the control of the timing control unit 123, at the time of data transmission, the conversion unit 134 converts Rx data supplied from the control unit (CPU) of the sink device into a differential signal, supplies one partial signal constituting the differential signal obtained by conversion to the switch 135, and supplies the other partial signal through the reserved line 88 to the source device. The switch 135 transmits, through the CEC line 84 to the source device, the partial signal supplied from the conversion unit 134. Accordingly, the differential signal corresponding to the Rx data is transmitted from the sink device to the source device.

In addition, at the time of data reception, the decoding unit 136 receives a differential signal corresponding to Tx data transmitted from the source device. That is, the switch 135 receives a partial signal of the differential signal that corresponds to the Tx data, the partial signal being transmitted through the CEC line 84 from the source device, and supplies the received partial signal to the decoding unit 136. The decoding unit 136 decodes the differential signal constituted of the partial signal supplied from the switch 135 and the partial signal supplied through the reserved line 88 from the source device into Tx data, which is the original data, and outputs the Tx data to the control unit (CPU).

Accordingly, the sink device transmits and receives various data, such as control data, pixel data, and audio data, to and from the sink device.

Meanwhile, in a case where it is determined in step S44 that channel information has not been received, the sink device performs bidirectional communication with the source device by performing transmission and reception of a CEC signal, in step S47. Then, the communication process ends.

That is, the sink device performs transmission and reception of control data to and from the source device by transmitting a CEC signal through the switch 135 and the CEC line 84 to the source device at the time of data transmission and by receiving a CEC signal transmitted through the switch 135 and the CEC line 84 from the source device at the time of data reception.

Accordingly, when receiving channel information, the sink device performs half-duplex communication with the sink device by using the CEC line 84 and the reserved line 88.

As described above, since the sink device performs switching of the switch 135 in such a manner that data to be transmitted and data to be received are selected, and performs half-duplex communication with the source device by using the CEC line 84 and the reserved line 88, high-speed bidirectional communication can be performed while the compatibility with conventional HDMI is maintained.

In addition, in a case where a source device is configured as shown in FIG. 24, in the communication process, the source device determines, in accordance with the full-duplex flag contained in E-EDID, whether or not a sink device has a function of performing full-duplex communication, and performs bidirectional communication corresponding to the determination result.

Figure 29:
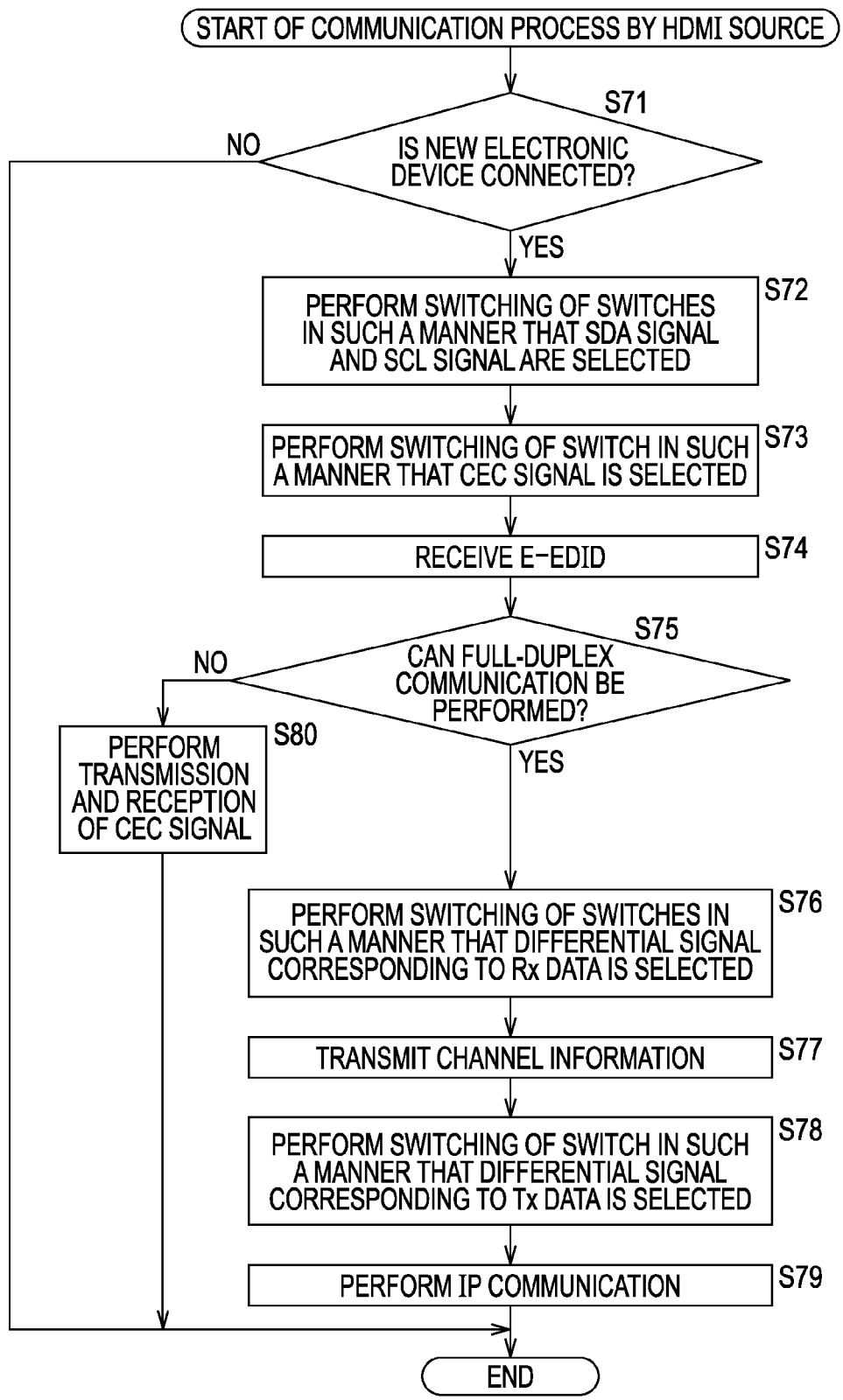
FIG. 29 is a flowchart for explaining a communication process by the source device.

Hereinafter, a communication process by the source device shown in FIG. 24 will be explained with reference to a flowchart of FIG. 29.

In step S71, the source device determines whether or not a new electronic device is connected to the source device. In a case where it is determined in step S71 that a new electronic device is not connected, since communication is not performed, the communication process ends.

Meanwhile, in a case where it is determined in step S71 that a new electronic device is connected, the switching control unit 171 controls the switch 181 and the switch 182 and performs switching of the switch 181 and the switch 182 in such a manner that an SDA signal from the control unit (CPU) of the source device is selected by the switch 181 and an SCL signal from the control unit (CPU) of the source device is selected by the switch 182 at the time of data transmission and that an SDA signal from the sink device is selected by the switch 181 at the time of data reception, in step S72.

In step S73, the switching control unit 121 controls the switch 133 and performs switching of the switch 133 in such a manner that a CEC signal from the control unit (CPU) of the source device is selected at the time of data transmission and that a CEC signal from the sink device is selected at the time of data reception.

In step S74, the source device receives E-EDID transmitted through the SDA line 191 of the DDC 83 from the sink device. That is, when detecting connection of a source device, the sink device reads E-EDID from the EDID ROM 85, and transmits the read E-EDID through the SDA line 191 of the DDC to the source device. Accordingly, the source device receives the E-EDID transmitted from the sink device.

In step S75, the source device determines whether or not full-duplex communication with the sink device can be performed. That is, the source device refers to the E-EDID received from the sink device, and determines whether or not the full-duplex flag "Full Duplex" in FIG. 26 is set. For example, in a case where the full-duplex flag is set, the source device determines that bidirectional IP communication based on the full-duplex communication method, that is, full-duplex communication, can be performed.

In a case where it is determined in step S75 that full-duplex communication can be performed, the switching control unit 171 controls of the switch 181 and the switch 182 and performs switching of the switch 181 and the switch 182 in such a manner that a differential signal corresponding to Rx data from the sink device is selected at the time of data reception, in step S76.

That is, the switching control unit 171 performs switching of the switch 181 and the switch 182 in such a manner that, from partial signals constituting the differential signal that corresponds to the Rx data, a partial signal transmitted through the SDA line 191 is selected by the switch 181 and a partial signal transmitted through the SCL line 192 is selected by the switch 182 at the time of data reception.

Since the SDA line 191 and the SCL line 192 constituting the DDC 83 are not used after E-EDID is transmitted from the sink device to the source device, that is, since transmission and reception of an SDA signal and an SCL signal through the SDA line 191 and the SCL line 192 are not performed, switching of the switch 181 and the switch 182 is performed so that the SDA line 191 and the SCL line 192 can be used as transmission paths for Rx data in full-duplex communication.

In step S77, the source device transmits, through the switch 133 and the CEC line 84 to the sink device, a signal indicating that IP communication based on the full-duplex communication method using the CEC line 84 and the reserved line 88; and the SDA line 191 and the SCL line 192 will be performed, as channel information indicating channels for bidirectional communication.

That is, in a case where the full-duplex flag is set, the source device understands that the sink device has the configuration shown in FIG. 24 and is capable of performing full-duplex communication using the CEC line 84 and the reserved line 88; and the SDA line 191 and the SCL line 192. Thus, the source device transmits channel information to the sink device and notifies the sink device that full-duplex communication will be performed.

In step S78, the switching control unit 121 controls the switch 133 and performs switching of the switch 133 in such a manner that a differential signal corresponding to Tx data from the conversion unit 131 is selected at the time of data transmission. That is, the switching control unit 121 performs switching of the switch 133 in such a manner that the partial signal of the differential signal that corresponds to the Tx data, the partial signal being supplied from the conversion unit 131 to the switch 133, is selected.

In step S79, the source device performs bidirectional IP communication with the sink device in accordance with the full-duplex communication method. Then, the communication process ends. That is, at the time of data transmission, the conversion unit 131 converts Tx data supplied from the control unit (CPU) of the source device into a differential signal, supplies one partial signal constituting the differential signal obtained by conversion to the switch 133, and supplies the other partial signal through the reserved line 88 to the sink device. The switch 133 transmits, through the CEC line 84 to the sink device, the partial signal supplied from the conversion unit 131. Accordingly, the differential signal corresponding to the Tx data is transmitted from the source device to the sink device.

In addition, at the time of data reception, the decoding unit 183 receives a differential signal corresponding to Rx data transmitted from the sink device. That is, the switch 181 receives one partial signal of the differential signal that corresponds to the Rx data, the partial signal being transmitted through the SDA line 191 from the sink device, and supplies the received partial signal to the decoding unit 183. In addition, the switch 182 receives the other partial signal of the differential signal that corresponds to the Rx data, the partial signal being transmitted through the SCL line 192 from the sink device, and supplies the received partial signal to the decoding unit 183. The decoding unit 183 decodes the differential signal constituted of the partial signals supplied from the switch 181 and the switch 182 into Rx data, which is the original data, and outputs the Rx data to the control unit (CPU).

Accordingly, the source device transmits and receives various data, such as control data, pixel data, and audio data, to and from the sink device.

In addition, in a case where it is determined in step S75 that full-duplex communication cannot be performed, the source device performs bidirectional communication with the sink device by performing transmission and reception of a CEC signal, in step S80. Then, the communication process ends.

That is, the source device performs transmission and reception of control data to and from the sink device by transmitting a CEC signal through the switch 133 and the CEC line 84 to the sink device at the time of data transmission and by receiving a CEC signal transmitted through the switch 133 and the CEC line 84 from the sink device at the time of data reception.

Accordingly, the source device refers to the full-duplex flag, and performs full-duplex communication with the sink device that is capable of performing full-duplex communication by using the CEC line 84 and the reserved line 88; and the SDA line 191 and the SCL line 192.

As described above, switching of the switch 133, the switch 181, and the switch 182 is performed in such a manner that data to be transmitted and data to be received are selected, and full-duplex communication with the sink device is performed by using the CEC line 84 and the reserved line 88; and the SDA line 191 and the SCL line 192. Thus, high-speed bidirectional communication can be performed while the compatibility with conventional HDMI is maintained.

In addition, also in a case where a sink device has the configuration shown in FIG. 24, the sink device performs a communication process and performs bidirectional communication with a source device, as in the sink device shown in FIG. 23.

Figure 30:
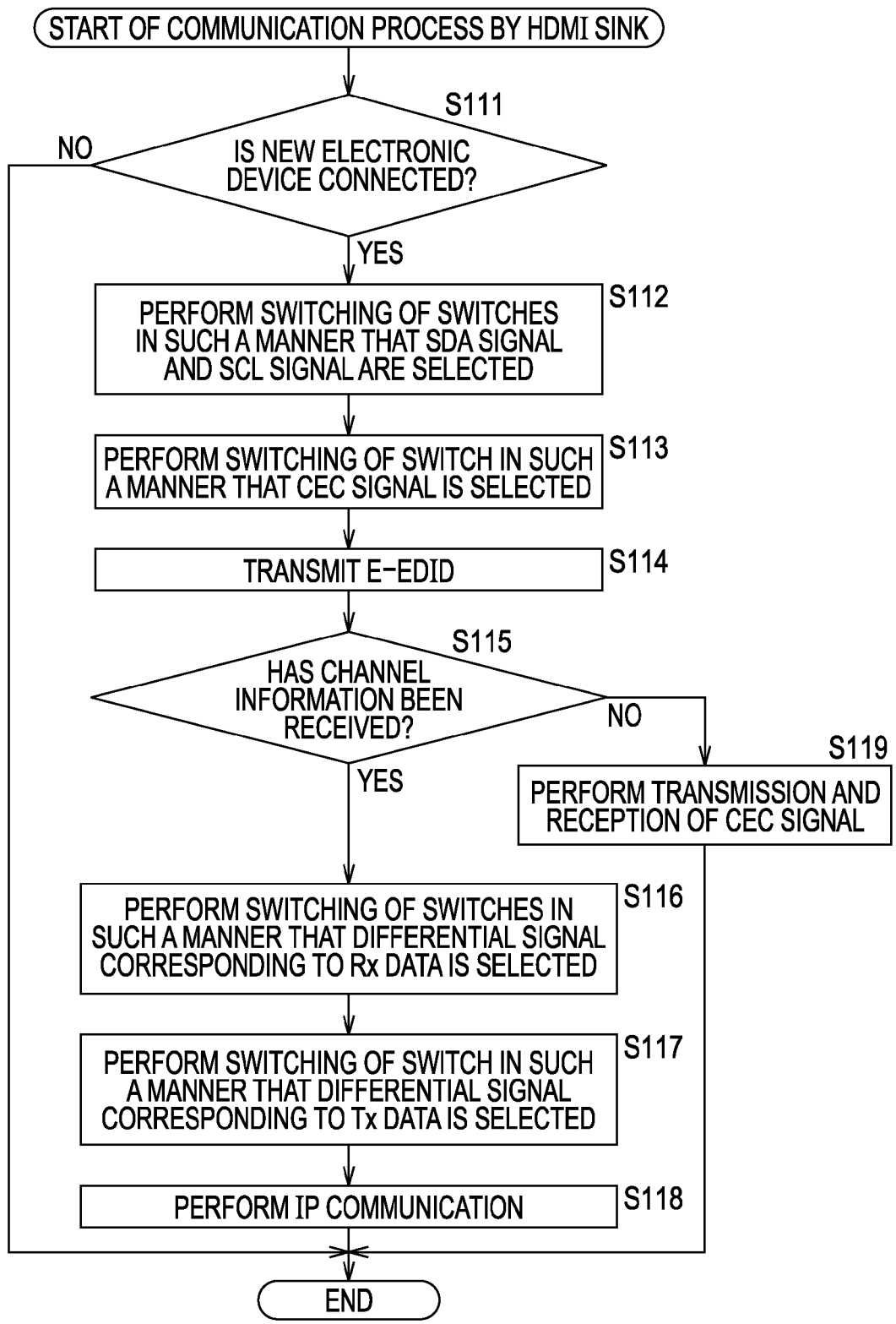
FIG. 30 is a flowchart for explaining a communication process by the sink device.

Hereinafter, a communication process by the sink device shown in FIG. 24 will be explained with reference to a flowchart of FIG. 30.

In step S111, the sink device determines whether or not a new electronic device (source device) is connected to the sink device. In a case where it is determined in step S111 that a new electronic device is not connected, since communication is not performed, the communication process ends.

Meanwhile, in a case where it is determined in step S111 that a new electronic device is connected, the switching control unit 172 controls the switch 185 and the switch 186 and performs switching of the switch 185 and the switch 186 in such a manner that an SDA signal from the control unit (CPU) of the sink device is selected by the switch 185 at the time of data transmission and that an SDA signal from the source device is selected by the switch 185 and an SCL signal from the source device is selected by the switch 186 at the time of data reception, in step S112.

In step S113, the switching control unit 124 controls the switch 135 and performs switching of the switch 135 in such a manner that a CEC signal from the control unit (CPU) of the sink device is selected at the time of data transmission and that a CEC signal from the source device is selected at the time of data reception.

In step S114, the sink device reads E-EDID from the EDID ROM 85, and transmits the read E-EDID through the switch 185 and the SDA line 191 of the DDC 83 to the source device.

In step S115, the sink device determines whether or not channel information transmitted from the source device has been received.

That is, channel information indicating channels for bidirectional communication is transmitted from the source device in accordance with functions of the source device and the sink device. For example, in a case where the source device is configured as shown in FIG. 24, the source device and the sink device are capable of performing full-duplex communication. Thus, channel information indicating that IP communication based on the full-duplex communication method using the CEC line 84 and the reserved line 88; and the SDA line 191 and the SCL line 192 will be performed is transmitted from the source device to the sink device. Hence, the sink device receives the channel information transmitted through the switch 135 and the CEC line 84 from the source device, and determines that channel information has been received.

Meanwhile, in a case where the source device does not have a function of performing full-duplex communication, channel information is not transmitted from the source device to the sink device. Thus, the sink device determines that channel information has not been received.

In a case where it is determined in step S115 that channel information has been received, the process proceeds to step S116. The switching control unit 172 controls the switch 185 and the switch 186 and performs switching of the switch 185 and the switch 186 in such a manner that a differential signal corresponding to the Rx data from the conversion unit 184 is selected at the time of data transmission.

In step S117, the switching control unit 124 controls the switch 135 and performs switching of the switch 135 in such a manner that a differential signal corresponding to Tx data from the source device is selected at the time of data reception.

In step S118, the sink device performs bidirectional IP communication with the source device in accordance with the full-duplex communication method. Then, the communication process ends. That is, at the time of data transmission, the conversion unit 184 converts Rx data supplied from the control unit (CPU) of the sink device into a differential signal, supplies one partial signal constituting the differential signal obtained by conversion to the switch 185, and supplies the other partial signal to the switch 186. The switch 185 and the switch 186 transmit, through the SDA line 191 and the SDA line 191 to the source device, the partial signals supplied from the conversion unit 184. Accordingly, the differential signal corresponding to the Rx data is transmitted from the sink device to the source device.

In addition, at the time of data reception, the decoding unit 136 receives a differential signal corresponding to Tx data transmitted from the source device. That is, the switch 135 receives a partial signal of the differential signal that corresponds to the Tx data, the partial signal being transmitted through the CEC line 84 from the source device, and supplies the received partial signal to the decoding unit 136. The decoding unit 136 decodes the differential signal constituted of the partial signal supplied from the switch 135 and the partial signal supplied through the reserved line 88 from the source device into Tx data, which is the original data, and outputs the Tx data to the control unit (CPU).

Accordingly, the sink device transmits and receives various data, such as control data, pixel data, and audio data, to and from the source device.

Meanwhile, in a case where it is determined in step S115 that channel information has not been received, the sink device performs bidirectional communication with the source device by performing transmission and reception of a CEC signal, in step S119. Then, the communication process ends.

Accordingly, when receiving channel information, the sink device performs full-duplex communication with the sink device by using the CEC line 84 and the reserved line 88; and the SDA line 191 and the SCL line 192.

As described above, the sink device performs switching of the switch 135, the switch 185, and the switch 186 in such a manner that data to be transmitted and data to be received are selected, and performs full-duplex communication with the source device by using the CEC line 84 and the reserved line 88; and the SDA line 191 and the SCL line 192. Thus, high-speed bidirectional communication can be performed while the compatibility with conventional HDMI is maintained.

Note that although the source device in the example of FIG. 24 has a configuration in which the conversion unit 131 is connected to the CEC line 84 and the reserved line 88 and the decoding unit 183 is connected to the SDA line 191 and the SCL line 192, the source device may have a configuration in which the decoding unit 183 is connected to the CEC line 84 and the reserved line 88 and the conversion unit 131 is connected to the SDA line 191 and the SCL line 192.

In such a case, the switch 181 and the switch 182 are connected to the decoding unit 183 as well as the CEC line 84 and the reserved line 88, and the switch 133 is connected to the conversion unit 131 as well as the SDA line 191.

In addition, similarly, the sink device of FIG. 24 may have a configuration in which the conversion unit 184 is connected to the CEC line 84 and the reserved line 88 and the decoding unit 136 is connected to the SDA line 191 and the SCL line 192. In such a case, the switch 185 and the switch 186 are connected to the conversion unit 184 as well as the CEC line 84 and the reserved line 88, and the switch 135 is connected to the decoding unit 136 as well as the SDA line 191.

Furthermore, in FIG. 23, the CEC line 84 and the reserved line 88 may be the SDA line 191 and the SCL line 192. That is, the conversion unit 131 and the decoding unit 132 of the source device and the conversion unit 134 and the decoding unit 136 of the sink device may be connected to the SDA line 191 and the SCL line 192 so that the source device and the sink device can perform IP communication based on the half-duplex communication method. Furthermore, in this case, connection of an electronic device may be detected by using the reserved line 88.

Furthermore, each of the source device and the sink device may have both the function of performing half-duplex communication and the function of performing full-duplex communication. In such a case, the source device and the sink device are capable of performing IP communication based on the half-duplex communication method or the full-duplex communication method in accordance with a function of a connected electronic device.

Figure 31:
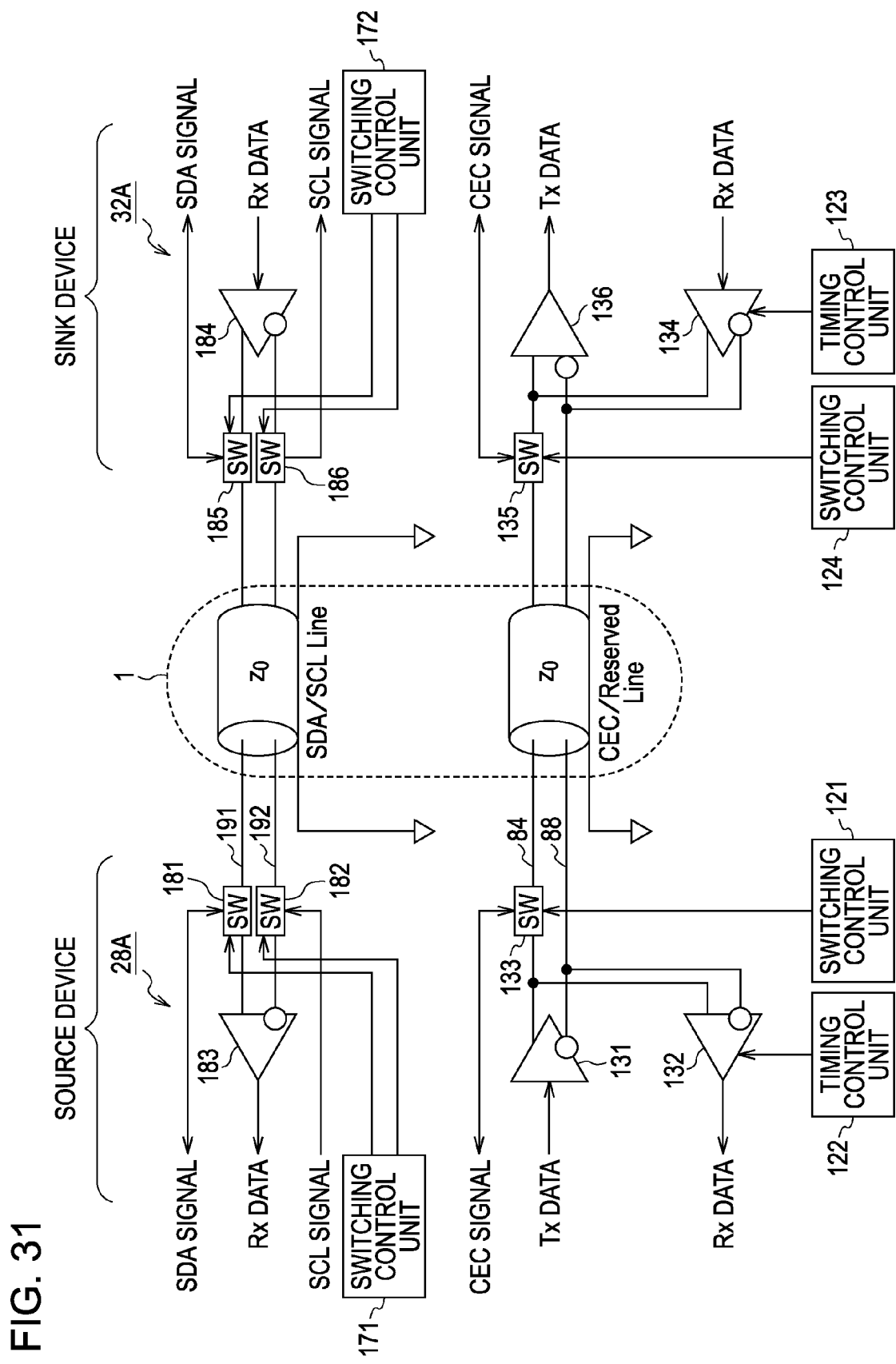
FIG. 31 is a connection diagram showing another example of the configuration of high-speed data line interfaces of the video camera recorder and the television receiver.

In a case where a source device and a sink device each have both the function of performing half-duplex communication and the function of performing full-duplex communication, the source device and the sink device are configured, for example, as shown in FIG. 31. Note that in FIG. 31, parts corresponding to those in FIG. 23 or FIG. 24 are denoted by the same signs, and the explanation of those parts will be omitted in an appropriate manner.

The high-speed data line interface 28A of the source device includes the conversion unit 131, the decoding unit 132, the switch 133, the switch 181, the switch 182, the decoding unit 183, the switching control unit 121, the timing control unit 122, and the switching control unit 171. That is, the high-speed data line interface 28A of the source device in FIG. 31 has a configuration in which the timing control unit 122 and the decoding unit 132 in FIG. 23 are further provided in the high-speed data line interface 28A of the source device shown in FIG. 24.

In addition, the high-speed data line interface 28A of the sink device shown in FIG. 31 includes the conversion unit 134, the switch 135, the decoding unit 136, the conversion unit 184, the switch 185, the switch 186, the timing control unit 123, the switching control unit 124, and the switching control unit 172. That is, the sink device shown in FIG. 31 has a configuration in which the timing control unit 123 and the conversion unit 134 in FIG. 23 are further provided in the sink device shown in FIG. 24.

Next, communication processes by the source device and the sink device in FIG. 31 will be explained.

Figure 32:
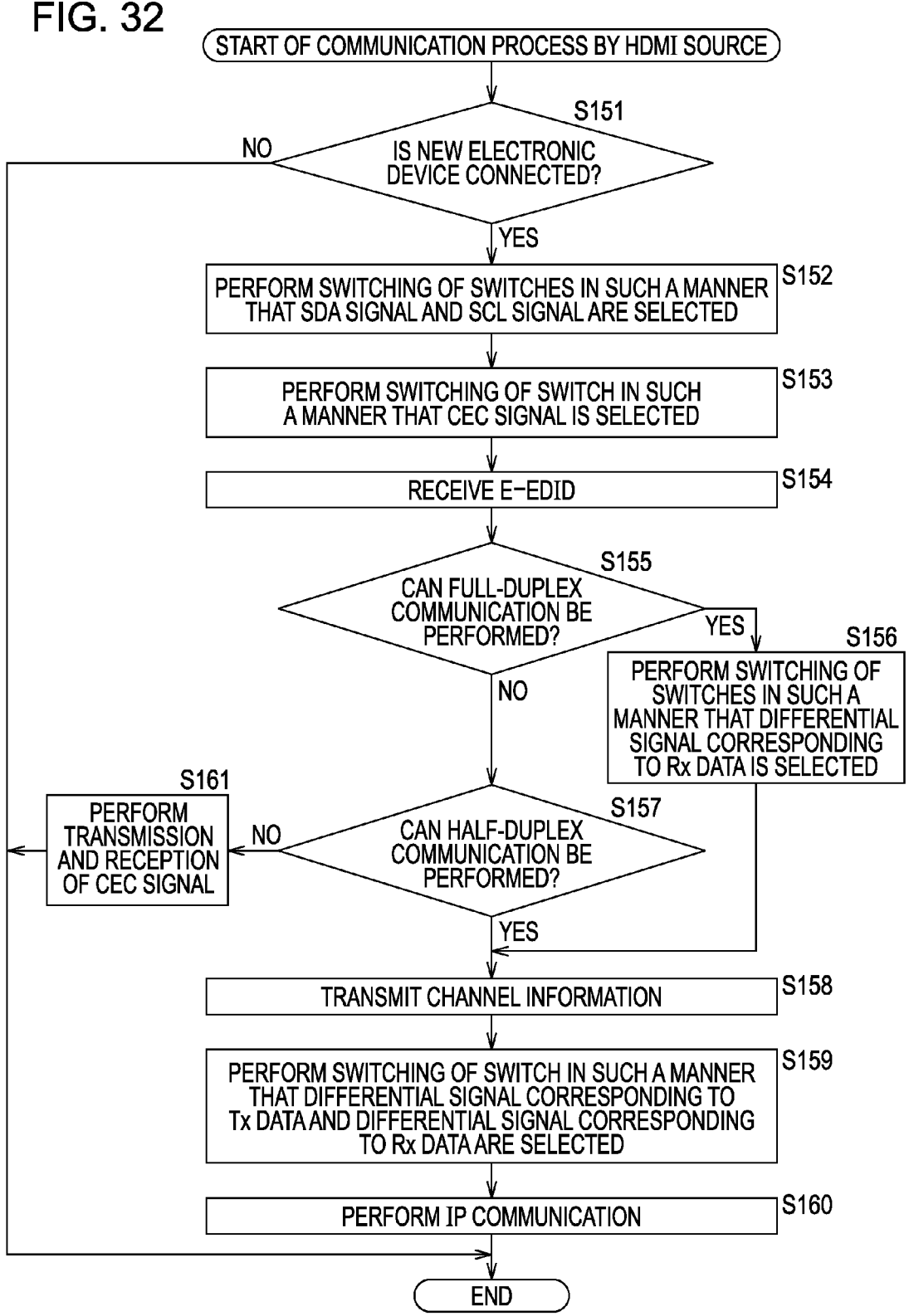
FIG. 32 is a flowchart for explaining a communication process by the source device.

First, a communication process by the source device in FIG. 31 will be explained with reference to a flowchart of FIG. 32. Note that since processing of steps S151 to S154 is similar to the processing of steps S71 to S74 in FIG. 29, respectively, the explanation of the processing of steps S151 to S154 will be omitted.

In step S155, the source device determines whether or not full-duplex communication with the sink device can be performed. That is, by referring to E-EDID received from the sink device, the source device determines whether or not the full-duplex flag "Full Duplex" in FIG. 26 is set.

In a case where it is determined in step S155 that full-duplex communication can be performed, that is, in a case where the sink device shown in FIG. 31 or FIG. 24 is connected to the source device, the switching control unit 171 controls the switch 181 and the switch 182 and performs switching of the switch 181 and the switch 182 in such a manner that a differential signal corresponding to Rx data from the sink device is received at the time of data reception, in step S156.

Meanwhile, in a case where it is determined in step S155 that full-duplex communication cannot be performed, the source device determines whether or not half-duplex communication can be performed, in step S157. That is, by referring to the received E-EDID, the source device determines whether or not the half-duplex flag "Half Duplex" in FIG. 26 is set. In other words, the source device determines whether or not the sink device shown in FIG. 23 is connected to the source device.

In a case where it is determined in step S157 that half-duplex communication can be performed or in a case where switching of the switch 181 and the switch 182 is performed in step S156, the source device transmits channel information through the switch 133 and the CEC line 84 to the sink device, in step S158.

Here, in a case where it is determined in step S155 that full-duplex communication can be performed, since the sink device has the function of performing full-duplex communication, the source device transmits, through the switch 133 and the CEC line 84 to the sink device, a signal indicating that IP communication using the CEC line 84 and the reserved line 88; and the SDA line 191 and the SCL line 192 will be performed, as channel information.

In addition, in a case where it is determined in step S157 that half-duplex communication can be performed, since the sink device does not have the function of performing full-duplex communication but does have the function of performing half-duplex communication, the source device transmits, through the switch 133 and the CEC line 84 to the sink device, a signal indicating that IP communication using the CEC line 84 and the reserved line 88 will be performed, as channel information.

In step S159, the switching control unit 121 controls the switch 133 and performs switching of the switch 133 in such a manner that a differential signal corresponding to Tx data from the conversion unit 131 is selected at the time of data transmission and that a differential signal corresponding to Rx data transmitted from the sink device is selected at the time of data reception. Note that in a case where the source device and the sink device perform full-duplex communication, since a differential signal corresponding to Rx data is not transmitted through the CEC line 84 and the reserved line 88 from the sink device at the time when the source device receives data, the differential signal corresponding to the Rx data is not supplied to the decoding unit 132.

In step S160, the source device performs bidirectional IP communication with the sink device. Then, the communication process ends.

That is, in a case where the source device performs full-duplex communication with the sink device and in a case where the source device performs half-duplex communication with the sink device, at the time of data transmission, the conversion unit 131 converts Tx data supplied from the control unit (CPU) of the source device into a differential signal, transmits, through the switch 133 and the CEC line 84 to the sink device, one partial signal constituting the differential signal obtained by conversion, and transmits the other partial signal through the reserved line 88 to the sink device.

In addition, in a case where the source device performs full-duplex communication with the sink device, at the time of data reception, the decoding unit 183 receives a differential signal corresponding to Rx data transmitted from the sink device, decodes the received differential signal into Rx data, which is the original data, and outputs the Rx data to the control unit (CPU).

Meanwhile, in a case where the source device performs half-duplex communication with the sink device, at the time of data reception, under the control of the timing control unit 122, the decoding unit 132 receives a differential signal corresponding to Rx data transmitted from the sink device, decodes the received differential signal into Rx data, which is the original data, and outputs the Rx data to the control unit (CPU).

Accordingly, the source device transmits and receives various data, such as control data, pixel data, and audio data, to and from the sink device.

Meanwhile, in a case where it is determined in step S157 that half-duplex communication cannot be performed, the source device performs bidirectional communication with the sink device by performing transmission and reception of a CEC signal through the CEC line 84, in step S161. Then, the communication process ends.

Accordingly, the source device refers to the full-duplex flag and the half-duplex flag, and performs full-duplex communication or half-duplex communication in accordance with a function of the sink device with which the source device communicates.

As described above, switching of the switch 133, the switch 181, and the switch 182 is performed, in accordance with a function of a sink device with which communication is performed, in such a manner that data to be transmitted and data to be received are selected, and full-duplex communication or half-duplex communication is performed. Thus, high-speed bidirectional communication can be performed while the compatibility with conventional HDMI is maintained and a more optimal communication method is selected.

Figure 33:
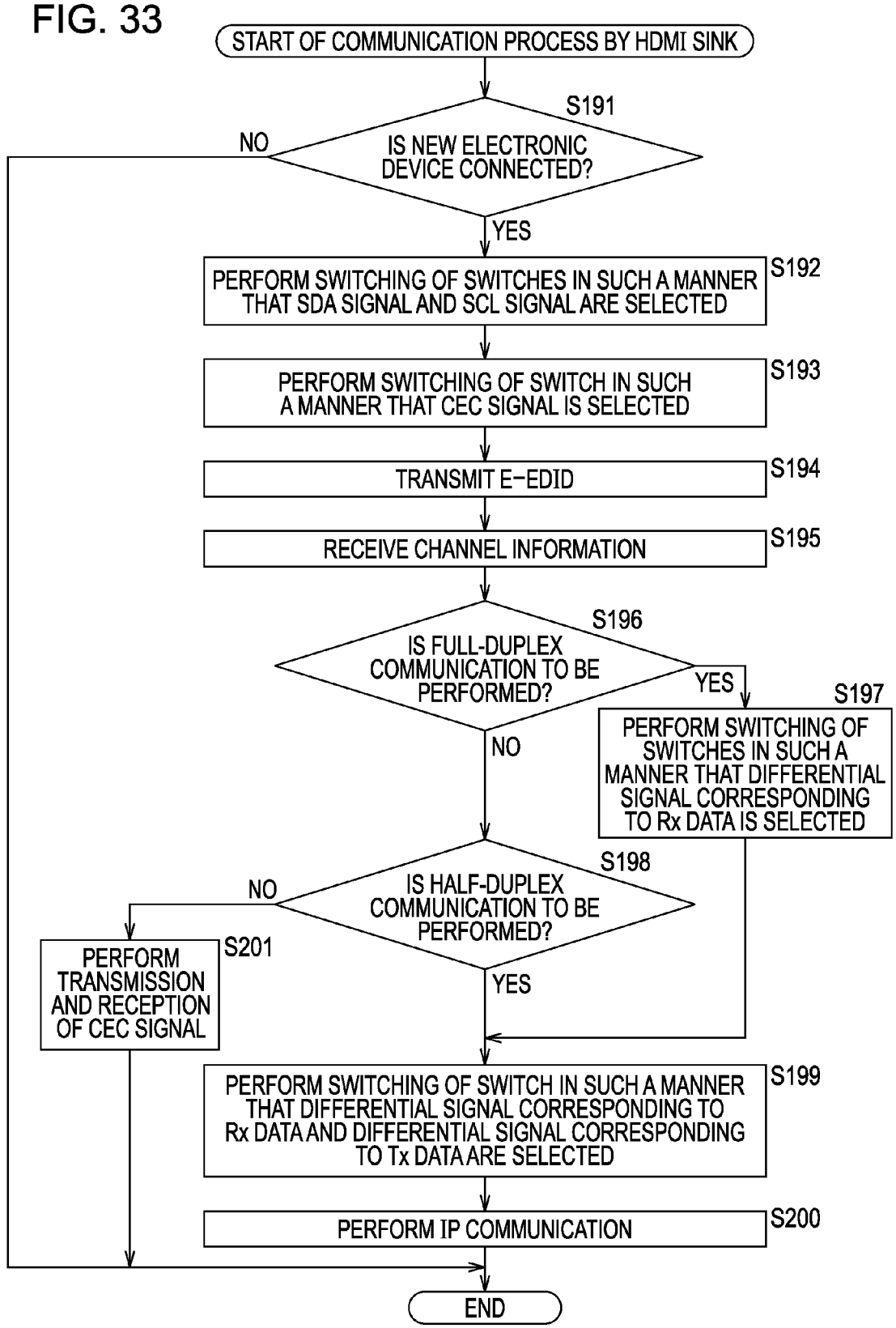
FIG. 33 is a flowchart for explaining a communication process by the sink device.

Next, a communication process by the sink device in FIG. 31 will be explained with reference to a flowchart of FIG. 33. Note that since processing of steps S191 to S194 is similar to the processing of steps S111 to S114 in FIG. 30, respectively, the explanation of the processing of steps S191 to S194 will be omitted.

In step S195, the sink device receives channel information transmitted through the switch 135 and the CEC line 84 from the source device. Note that in a case where the source device connected to the sink device has neither the function of performing full-duplex communication nor the function of performing half-duplex communication, since channel information is not transmitted from the source device to the sink device, the sink device receives no channel information.

In step S196, the sink device determines, in accordance with the received channel information, whether or not to perform full-duplex communication. For example, in a case where channel information indicating that IP communication using the CEC line 84 and the reserved line 88; and the SDA line 191 and the SCL line 192 will be performed is received, the sink device determines that full-duplex communication is to be performed.

In a case where it is determined in step S196 that full-duplex communication is to be performed, the switching control unit 172 controls the switch 185 and the switch 186 and performs switching of the switch 185 and the switch 186 in such a manner that a differential signal corresponding to Rx data from the conversion unit 184 is selected at the time of data transmission, in step S197.

Meanwhile, in a case where it is determined in step S196 that full-duplex communication is not be performed, the sink device determines, in accordance with the received channel information, whether or not to perform half-duplex communication, in step S198. For example, in a case where channel information indicating that IP communication using the CEC line 84 and the reserved line 88 will be performed is received, the sink device determines that half-duplex communication is to be performed.

In a case where it is determined in step S198 that half-duplex communication is to be performed or in a case where switching of the switch 185 and the switch 186 is performed in step S197, the switching control unit 124 controls the switch 135 and performs switching of the switch 135 in such a manner that a differential signal corresponding to Rx data from the conversion unit 134 is selected at the time of data transmission and that a differential signal corresponding to Tx data from the source device is selected at the time of data reception, in step S199.

Note that in a case where the source device and the sink device perform full-duplex communication, since a differential signal corresponding to Rx data is not transmitted from the conversion unit 134 to the transmitter 81 at the time when the sink device transmits data, the differential signal corresponding to the Rx data is not supplied to the switch 135.

In step S200, the sink device performs bidirectional IP communication with the source device. Then, the communication process ends.

That is, in a case where the sink device performs full-duplex communication with the source device, at the time of data transmission, the conversion unit 184 converts Rx data supplied from the control unit (CPU) of the sink device into a differential signal, transmits, through the switch 185 and the SDA line 191 to the source device, one partial signal constituting the differential signal obtained by conversion, and transmits the other partial signal through the switch 186 and the SCL line 192 to the source device.

Meanwhile, in a case where the sink device performs half-duplex communication with the source device, at the time of data transmission, the conversion unit 134 converts Rx data supplied from the control unit (CPU) of the sink device into a differential signal, transmits, through the switch 135 and the CEC line 84 to the transmitter 81, one partial signal constituting the differential signal obtained by conversion, and transmits the other partial signal through the reserved line 88 to the source device.

Furthermore, in a case where the sink device performs full-duplex communication with the source device and in a case where the sink device performs half-duplex communication with the source device, at the time of data reception, the decoding unit 136 receives a differential signal corresponding to Tx data transmitted from the source device, decodes the received differential signal into Tx data, which is the original data, and outputs the Tx data to the control unit (CPU).

In addition, in a case where it is determined in step S198 that half-duplex communication is not to be performed, that is, for example, in a case where no channel information has been transmitted, the sink device performs bidirectional communication with the source device by performing transmission and reception of a CEC signal, in step S201. Then, the communication process ends.

Accordingly, the sink device performs full-duplex communication or half-duplex communication in accordance with received channel information, that is, a function of the source device with which the sink device communicates.

As described above, switching of the switch 135, the switch 185, and the switch 186 is performed, in accordance with a function of a source device with which communication is performed, in such a manner that data to be transmitted and data to be received are selected, and full-duplex communication or half-duplex communication is performed. Thus, high-speed bidirectional communication can be performed while the compatibility with conventional HDMI(R) is maintained and a more optimal communication method is selected.

In addition, by connecting the source device and the sink device through the HDMI cable 1 containing the CEC line 84 and the reserved line 88, which are connected as a differential twisted pair, shielded, and grounded to a ground wire, and the SDA line 191 and the SCL line 192, which are connected as a differential twisted pair, shielded, and grounded to a ground wire, high-speed bidirectional IP communication based on the half-duplex communication method or the full-duplex communication method can be performed while the compatibility with a conventional HDMI cable is maintained.

Next, the series of processes described above can be performed by dedicated hardware or software. In a case where the series of processes are performed by software, a program constituting the software is installed into, for example, a microcomputer or the like that controls the source device and the sink device.

Figure 34:
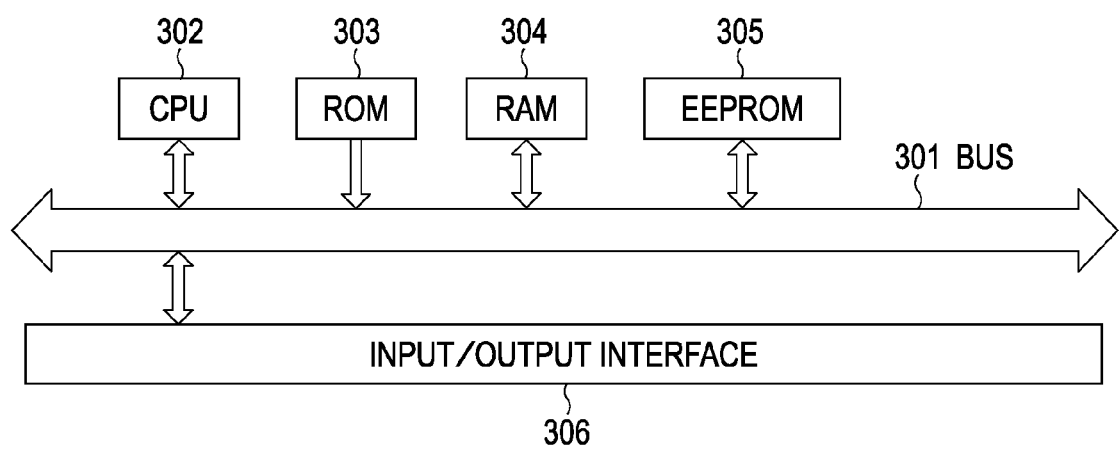
FIG. 34 is a block diagram showing an example of the configuration of a computer to which the present invention is applied.

Now, FIG. 34 shows an example of the configuration of an embodiment of a computer into which a program for performing the series of processes described above is installed.

The program can be recorded in advance in an EEPROM (Electrically Erasable Programmable Read-only Memory) 305 or a ROM 303 as a recording medium contained in the computer.

Alternatively, the program may be temporarily or permanently stored (recorded) in a removable recording medium, such as a flexible disk, a CD-ROM (Compact Disc Read Only Memory), an MO (Magneto Optical) disc, a DVD (Digital Versatile Disc), a magnetic disk, or a semiconductor memory. Such a removable recording medium can be provided as so-called package software.

Here, in addition to being installed from the removable recording medium described above to the computer, the program can be transferred in a wireless manner from a download site through an artificial satellite for digital satellite broadcasting to the computer or transferred in a wired manner through a network such as a LAN or the Internet to the computer, and the computer can receive, via an input/output interface 306 of the computer, the program transferred as described above and install the program into the EEPROM 305 contained in the computer.

The computer contains a CPU (Central Processing Unit) 302. The input/output interface 306 is connected to the CPU 302 through a bus 301. The CPU 302 loads the program stored in the ROM (Read Only Memory) 303 or the EEPROM 305 to a RAM (Random Access Memory) 304 and executes the program. Accordingly, the CPU 302 performs processes based on the flowcharts described above or processes performed in accordance with the configurations of the block diagrams described above.

Here, in this description, processing steps describing a program for causing the computer to perform various processes are not necessarily processed in a time-series manner in accordance with the order described as a flowchart. The processing steps include processes performed in parallel or individually (for example, parallel processes or object-based processes). In addition, the program may be processed by a single computer or processed in a distributed manner by a plurality of computers.

Figure 35:
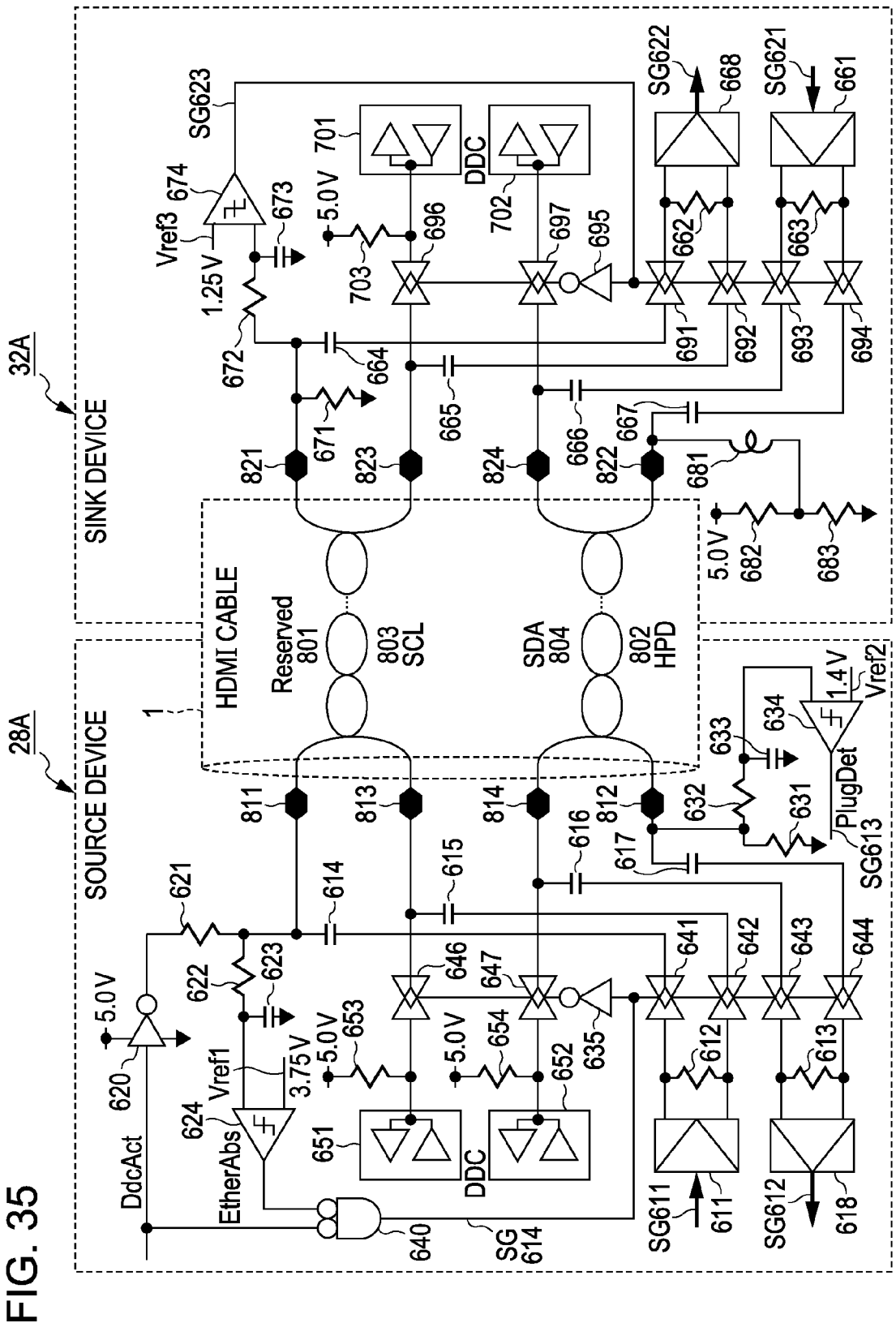
FIG. 35 is a connection diagram showing still another example of the configuration of high-speed data line interfaces of the video camera recorder and the television receiver.

In the configuration example shown in FIG. 19 described above, a circuit for LAN communication can be formed independent of the electrical specification defined for DDC. FIG. 35 shows another configuration example having a similar effect.

This example has a feature in that in an interface implementing transmission of video and audio data, exchange and authentication of connected device information, communication of device control data, and LAN communication by using a single cable, a configuration is provided in which LAN communication is performed as unidirectional communication through two pairs of differential transmission paths and notification of the connection state of the interface is issued in accordance with the DC bias potential of at least one of the transmission paths, and furthermore, at least two transmission paths are used in the communication for exchange and authentication of connected device information, in a time division manner, relative to LAN communication.

The source device includes a LAN signal transmission circuit 611, terminating resistors 612 and 613, AC coupling capacitors 614 to 617, a LAN signal reception circuit 618, an inverter 620, a resistor 621, a resistor 622 and a capacitor 623 forming a low-pass filter, a comparator 624, a pull-down resistor 631, a resistor 632 and a capacitor 633 forming a low-pass filter, a comparator 634, a NOR gate 640, analog switches 641 to 644, an inverter 645, analog switches 646 and 747, DDC transceivers 651 and 652, and pull-up resistors 653 and 654.

In addition, a sink device 602 includes a LAN signal transmission circuit 661, terminating resistors 662 and 663, AC coupling capacitors 664 to 667, a LAN signal reception circuit 668, a pull-down resistor 671, a resistor 672 and a capacitor 673 forming a low-pass filter, a comparator 674, a choke coil 681, resistors 682 and 683 which are serially connected between a power supply potential and a reference potential, analog switches 691 to 694, an inverter 695, analog switches 696 and 697, DDC transceivers 701 and 702, and pull-up resistors 703 and 704.

The HDMI cable 1 contains a differential transmission path formed of a reserved line 801 and an SCL line 803; and a differential transmission path formed of an SDA line 804 and an HPD line 802. Source-side terminals 811 to 814 and sink-side terminals 821 to 824 for those lines are formed.

The reserved line 801 and the SCL line 803; and the SDA line 804 and the HPD line 802 are connected as differential twisted pairs.

In the source device, the terminals 811 and 813 are connected through the AC coupling capacitors 614 and 605 and the analog switches 641 and 642 to the transmission circuit 611, which transmits a LAN transmission signal SG611 to the sink, and the terminating resistor 612. The terminals 814 and 812 are connected through the AC coupling capacitors 616 and 617 and the analog switches 643 and 644 to the reception circuit 618, which receives a LAN signal from the sink device, and the terminating resistor 613.

In the sink device, the terminals 821 to 824 are connected through the AC coupling capacitors 664, 665, 666, and 667 and the analog switches 691 to 694 to the transmission circuit 661, the reception circuit 668, and the terminating resistors 662 and 663. The analog switches 641 to 644 and 691 to 694 are conductive when LAN communication is performed and are opened when DDC communication is performed.

The source device connects the terminal 813 and the terminal 814 to the DDC transceivers 651 and 652 and the pull-up resistors 653 and 654 through the different analog switches 646 and 647.

The sink device connects the terminal 823 and the terminal 824 to the DDC transceivers 701 and 702 and the pull-up resistor 703 through the analog switches 696 and 697. The analog switches 646 and 647 are conductive when DDC communication is performed and are opened when LAN communication is performed.

A mechanism for identifying an e-HDMI compatible device in accordance with the potential of the reserved line 801 is basically similar to that in the example shown in FIG. 19, with the exception that the resistor 62 of the source device 601 is driven by the inverter 620.

When an input to the inverter 620 is HIGH, the resistor 621 serves as a pull-down resistor. Thus, when viewed from the sink device, a O-V state that is the same as a state when an e-HDMI incompatible device is connected is obtained. As a result, a signal SG623 indicating an e-HDMI compatibility identification result of the sink device is LOW. The analog switches 691 to 694 that are controlled in accordance with the signal SG623 are opened, and the analog switches 696 and 697 that are controlled in accordance with a signal obtained by inverting the signal SG623 by the inverter 695 are brought into conduction. As a result, the sink device 602 disconnects the SCL line 803 and the SDA line 804 from a LAN transmitter/receiver, and reaches a state where the sink device 602 is connected to a DDC transmitter/receiver.

Meanwhile, in the source device, the input to the inverter 620 is also input to the NOR gate 640 and an output SG614 of the NOR gate 640 is LOW. The analog switches 641 to 644 that are controlled in accordance with the output signal SG614 of the NOR gate 640 are opened, and the analog switches 646 and 647 that are controlled in accordance with a signal obtained by inverting the signal SG614 by the inverter 645 are brought into conduction. As a result, the source device 601 also disconnects the SCL line 803 and the SDA line 804 from the LAN transmitter/receiver, and reaches a state where the source device 601 is connected to the DDC transmitter/receiver.

On the contrary, when an input to the inverter 620 is LOW, both the source device and the sink device disconnect the SCL line 803 and the SDA line 804 from the DDC transmitter/receiver, and enter states where the source device and the sink device are connected to the LAN transmitter/receiver.

The circuits 631 to 634 and 681 to 683 for checking connection in accordance with the DC bias potential of the HPD line 802 have functions similar to those in the example shown in FIG. 19. That is, in addition to LAN communication described above, through the HPD line 802, the fact that the HDMI cable 1 is connected to the sink device is transmitted to the source device in accordance with the DC bias level. When the cable 1 is connected to the sink device, the resistors 682 and 683 and the choke coil 681 in the sink device cause the HPD line 802 to be biased at about 4 V through the terminal 822.

The source device extracts the DC bias of the HPD line 802 by using the low-pass filter formed by the resistor 632 and the capacitor 633, and compares the DC bias with a reference potential Vref2 (for example, 1.4 V) by using the comparator 634. When the cable 1 is not connected to the sink device, the potential of the terminal 812 is lower than the reference potential Vref2 due to the pull-down resistor 631. When the cable 1 is connected to the sink device, the potential of the terminal 812 is higher than the reference potential Vref2. Thus, a state in which an output signal SG613 of the comparator 634 is HIGH indicates that the cable 1 and the sink device are connected. Meanwhile, a state in which the output signal SG613 of the comparator 634 is LOW indicates that the cable 1 and the sink device are not connected.

As described above, according to the configuration example shown in FIG. 35, in an interface implementing transmission of video and audio data, exchange and authentication of connected device information, communication of device control data, and LAN communication by using a single cable, a configuration is provided in which LAN communication is performed as unidirectional communication through two pairs of differential transmission paths and notification of the connection state of the interface is issued in accordance with the DC bias potential of at least one of the transmission paths, and furthermore, at least two transmission paths are used in the communication for exchange and authentication of connected device information, in a time division manner, relative to LAN communication. Thus, time division is performed in such a manner that the SCL line and the SDA line are allocated, by using switches, to a time period for connection with a LAN communication circuit and a time period for connection with a DDC circuit. By this division, a circuit for LAN communication can be formed independent of the electrical specification defined for DDC. Thus, stable and reliable LAN communication can be realized with low cost.

Note that the resistor 621 shown in FIG. 35 may be provided in the HDMI cable 1, instead of being provided in the source device. In such a case, individual terminals of the resistor 621 are connected to, among lines provided in the HDMI cable 1, the reserved line 801 and a line (signal line) connected to a power source (power supply potential).

Furthermore, the pull-down resistor 671 and the resistor 683 shown in FIG. 35 may be provided in the HDMI cable 1, instead of being provided in the sink device. In such a case, individual terminals of the pull-down resistor 671 are connected to, among lines provided in the HDMI cable 1, the reserved line 801 and a line (ground wire) connected to the ground (reference potential). In addition, individual terminals of the resistor 683 are connected to, among lines provided in the HDMI cable 1, the HPD line 802 and a line (ground wire) connected to the ground (reference potential).

Here, communication is implemented through SDA and SCL with a 1.5 kgΩ pull-up at H and with a low-impedance pull-down at L and communication is also implemented through CEC with a 27 kgΩ pull-up at H and with a low-impedance pull-down at L. Having a LAN function for implementing high-speed data communication in which termination of a transmission line needs to be matched and terminated, while maintaining functions described above in order to realize the compatibility with existing HDMI, may be difficult.

The configuration examples of FIGS. 19 and 35 can avoid such a problem. That is, in the configuration example of FIG. 19, a configuration is provided in which full-duplex communication based on a pair of bidirectional communication operations is performed by using the reserved line and the HPD line as a differential pair, while avoiding the use of the SDA, SCL, and CEC lines. In addition, in the configuration example of FIG. 35, a configuration is provided in which two pairs of full-duplex communication operations are performed in which two differential pairs are formed by a pair of the HPD line and the SDA line and a pair of the SCL line and the reserved line and unidirectional communication is performed by using each of the two differential pairs.

FIGS. 36(A) to (E) show bidirectional communication waveforms in the configuration example of FIG. 19 or FIG. 35.

Figure 36:
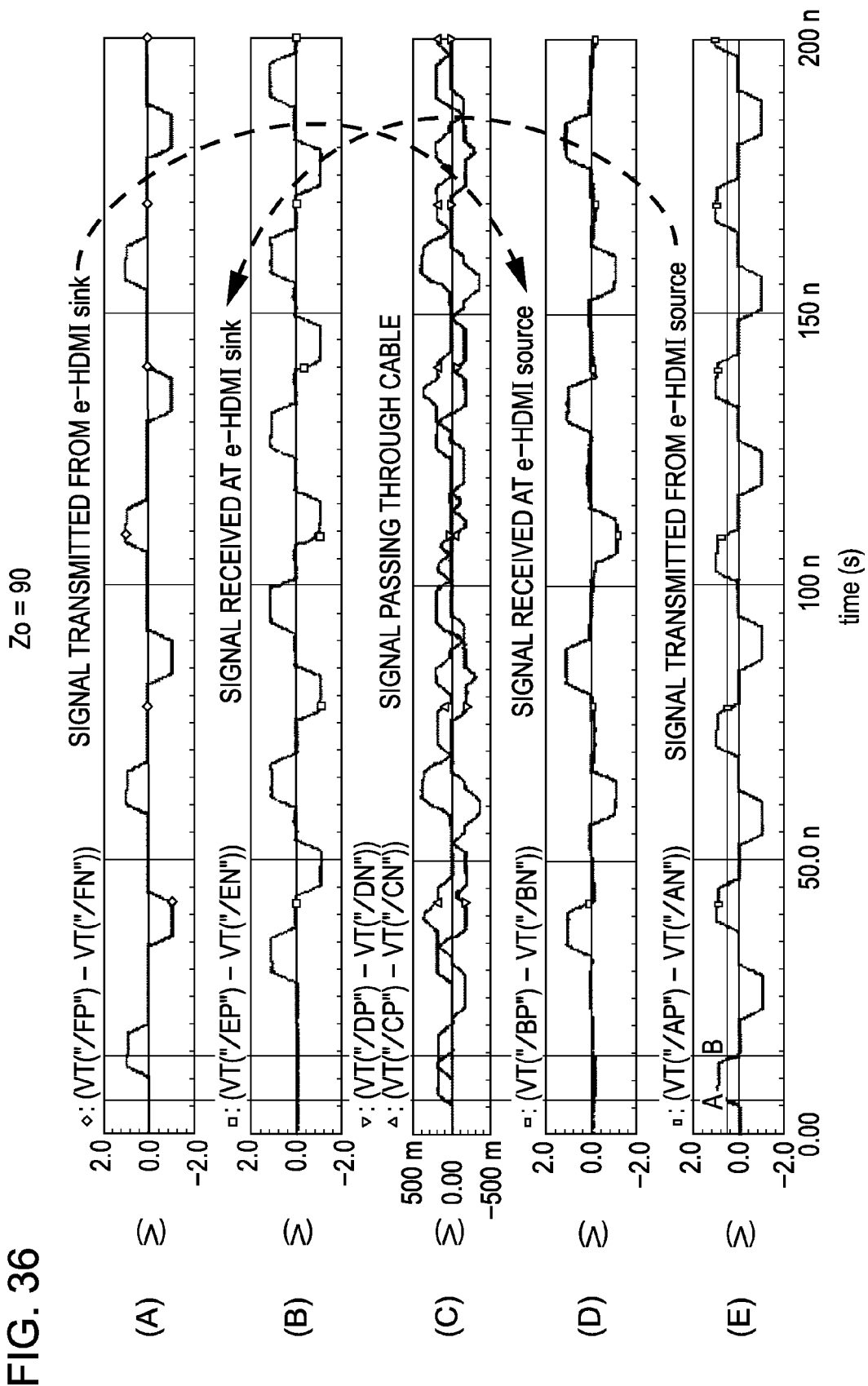
FIG. 36 includes illustrations showing bidirectional communication waveforms.

FIG. 36(A) shows the waveform of a signal transmitted from the source device, FIG. 36(B) shows the waveform of a signal received at the sink device, FIG. 36(C) shows the waveform of a signal passing through a cable, FIG. 36(D) shows a signal received at the source device, and FIG. 36(E) shows the waveform of a signal transmitted from the source device. As is clear from FIG. 36, with the configuration example of FIG. 19 or FIG. 35, excellent bidirectional communication can be realized.

Note that although explanation in the embodiments described above has been provided on the assumption that an interface conforming to HDMI standards is used as a transmission path for connecting the source device and the sink device, other similar transmission standards are also applicable. In addition, although an example in which a video camera recorder is used as a source device and a television receiver is used as a sink device is provided, other transmission device and reception device may be used.

In addition, although bidirectional IP communication is performed between the source device and the sink device in the embodiments described above, bidirectional communication can be performed by using a protocol different from IP. In addition, although a case where electronic devices are connected through an HDMI cable has been shown in the embodiments described above, the present invention is similarly applicable to a case where connection between electronic devices is performed in a wireless manner.

INDUSTRIAL APPLICABILITY

The present invention allows additional information on individual video signals to be smoothly displayed on an external device side and improves the performance of a selecting operation on a video signal by a user. The present invention is applicable, for example, to an AV system or the like that connects a video camera recorder and a television receiver through an HDMI interface.

The invention claimed is:

1. A transmission device characterized by comprising:
a first transmission unit that unidirectionally transmits a first differential signal which is an uncompressed video signal, the first differential signal being transmitted to an external device through a high definition multimedia interface (HDMI) cable using a plurality of channels;
a second transmission unit that transmits a second differential signal and receives a third differential signal, the second differential signal being transmitted through the HDMI cable via a reserved line and a hot plug detect line included in an HDMI interface, and the third differential signal being received through the HDMI cable via the reserved line and the hot plug detect line;
a subtracting unit that subtracts the second differential signal from the third differential signal;
a header block transmission unit that transmits to the external device, through the HDMI cable via a consumer electronics control (CEC) line included in the HDMI interface, a data packet having a header block including logical addresses set in accordance with types of individual devices, in which sixteen types of address values from "0" to "15" are set for the types of individual devices, in which at least one data block is arranged subsequent the header block in the data packet; and
wherein in a 0th block of the data packet is arranged a vender specific tag code for indicating a data region and information indicating length of vender specific data.

2. The transmission device of claim 1, wherein the header block is arranged subsequent a start bit in the data packet.

* * * * *